United States Patent
Hada et al.

(10) Patent No.: US 11,950,303 B2
(45) Date of Patent: Apr. 2, 2024

(54) COMMUNICATION SYSTEM USING WIRELESS COMMUNICATION, COMMUNICATION APPARATUS, AND CONTROL METHOD

(71) Applicant: CANON KABUSHIKI KAISHA, Tokyo (JP)

(72) Inventors: Manabu Hada, Tokyo (JP); Tsunahito Nakashita, Chiba (JP); Motoki Koshigaya, Saitama (JP); Koichi Ito, Tokyo (JP); Tatsuya Ogawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 17/675,971

(22) Filed: Feb. 18, 2022

(65) Prior Publication Data

US 2022/0174765 A1    Jun. 2, 2022

Related U.S. Application Data

(63) Continuation of application No. 17/137,200, filed on Dec. 29, 2020, now Pat. No. 11,284,460.

(30) Foreign Application Priority Data

| Jan. 10, 2020 | (JP) | ................................ 2020-003099 |
| Jan. 10, 2020 | (JP) | ................................ 2020-003100 |
| Oct. 21, 2020 | (JP) | ................................ 2020-176783 |

(51) Int. Cl.
*H04W 4/80* (2018.01)
*H04W 76/14* (2018.01)

(52) U.S. Cl.
CPC ............. *H04W 76/14* (2018.02); *H04W 4/80* (2018.02)

(58) Field of Classification Search
CPC . A61B 5/0006; A61B 5/14551; A61B 5/6833; A61B 5/742; A61B 5/01;
(Continued)

(56) References Cited

U.S. PATENT DOCUMENTS

| 2012/0178471 A1* | 7/2012 | Kainulainen | ......... H04W 64/00 |
| | | | 455/456.1 |
| 2012/0258669 A1* | 10/2012 | Honkanen | ................. G01S 3/46 |
| | | | 455/67.11 |

(Continued)

*Primary Examiner* — Md K Talukder
(74) *Attorney, Agent, or Firm* — Canon U.S.A., Inc. IP Division

(57) ABSTRACT

A communication system includes a communication apparatus and a communication terminal configured to wirelessly communicate with each other, wherein the communication terminal includes a first wireless communication interface configured to support a Bluetooth® standard and include a single antenna, and wherein the communication apparatus includes a second wireless communication interface configured to support the Bluetooth® standard and include a plurality of antennas, and includes one or more controllers configured to function as a unit configured to obtain angle information and field intensity information based on a result of reception of radio waves, by the plurality of antennas, transmitted from the single antenna; and a unit configured to transmit an establishment request for wireless communication based on the Bluetooth® standard to the first wireless communication interface via the second wireless communication interface based on a fact that the angle information and the field intensity information satisfy a predetermined condition.

19 Claims, 31 Drawing Sheets

(58) Field of Classification Search
CPC ............ A61B 5/02055; A61B 5/02455; A61B 2560/0209; A61B 5/02438; H04W 8/005; H04W 76/14; H04W 76/30; H04W 12/50; H04W 4/70; H04W 48/10; G16H 40/63; G16H 40/67; G16H 40/20; H04L 67/12; A61M 2205/3553; A61M 2205/3561; A61M 2205/3584; A61M 5/142
See application file for complete search history.

(56) References Cited

U.S. PATENT DOCUMENTS

| | | | |
|---|---|---|---|
| 2013/0040567 A1* | 2/2013 | Matsubara | G06F 3/0482 455/41.1 |
| 2013/0250354 A1* | 9/2013 | Kato | H04N 1/00225 358/1.15 |
| 2014/0118769 A1* | 5/2014 | Adachi | H04N 1/00342 358/1.13 |
| 2014/0159980 A1* | 6/2014 | Finegold | H01Q 7/00 343/833 |
| 2015/0334527 A1* | 11/2015 | Chang | H04B 17/27 455/456.1 |
| 2017/0118321 A1* | 4/2017 | Buttolo | H04W 12/08 |
| 2018/0176776 A1* | 6/2018 | Knaappila | H04W 4/80 |
| 2022/0295206 A1* | 9/2022 | Park | H04N 5/60 |
| 2022/0374185 A1* | 11/2022 | Oosthoek | G06F 3/147 |

* cited by examiner

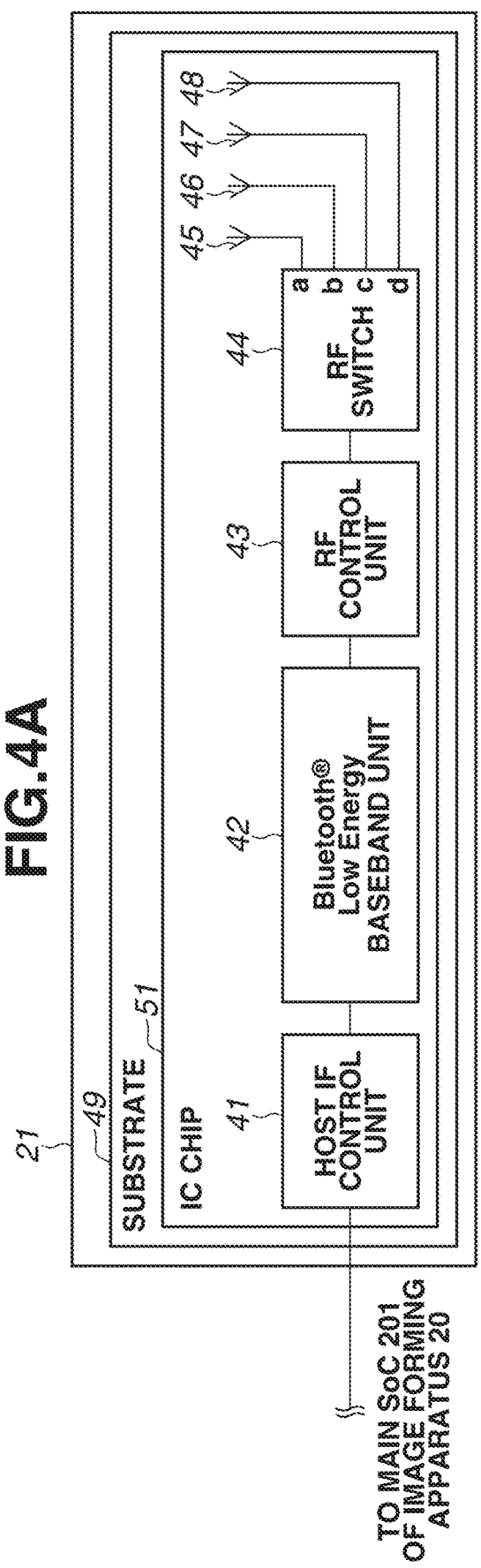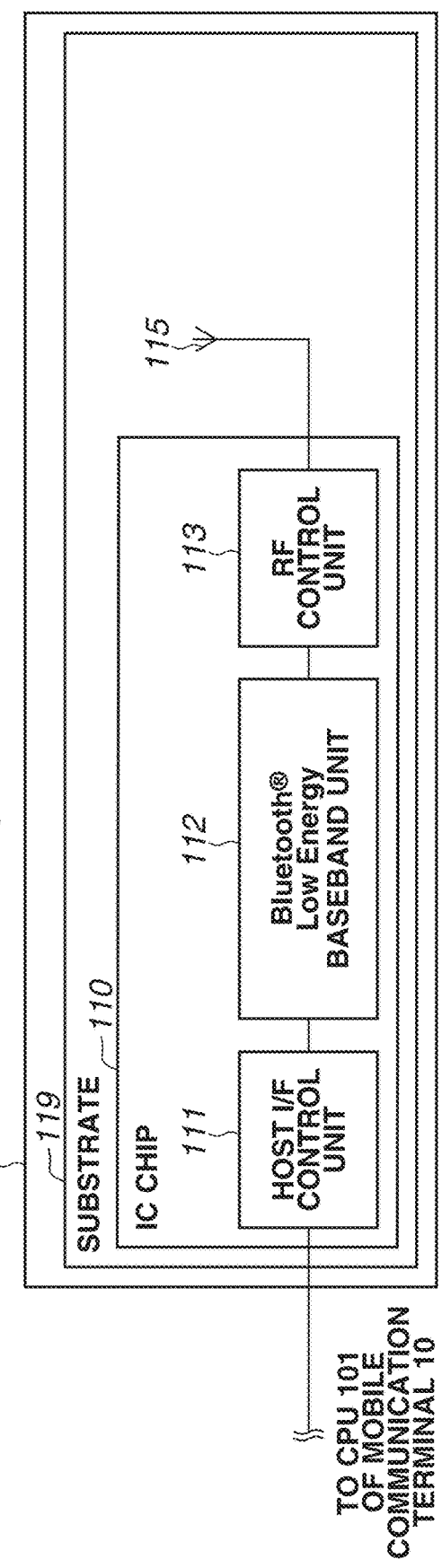

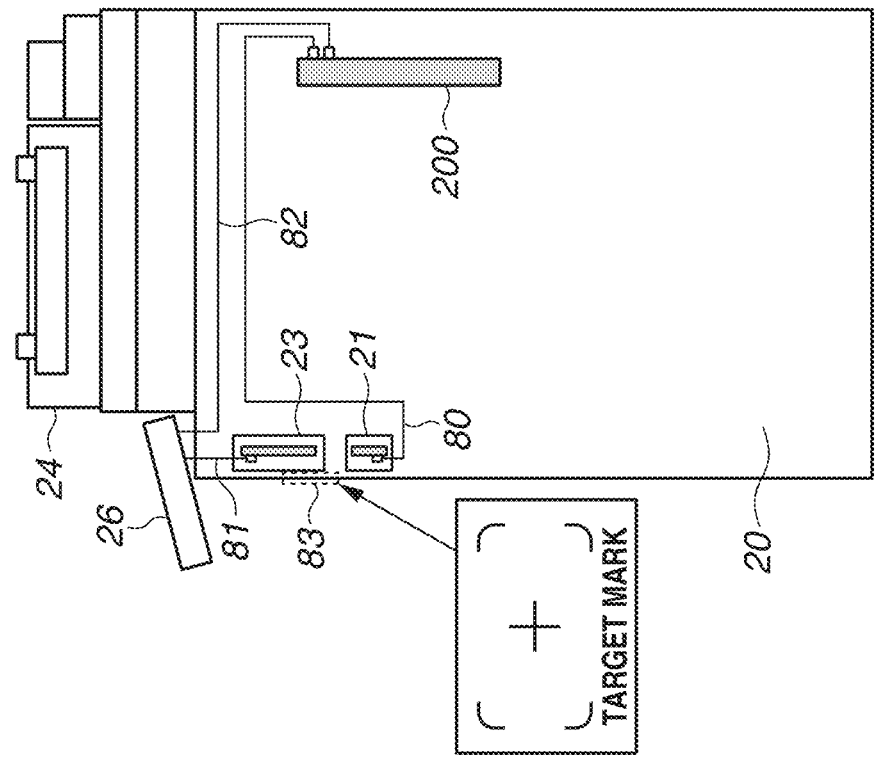
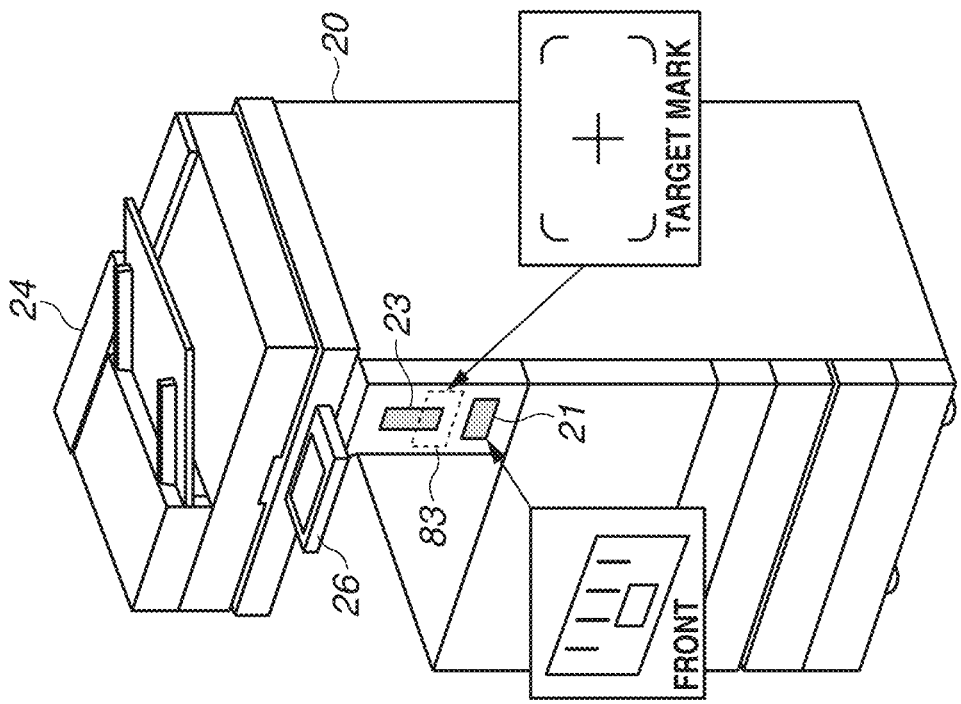

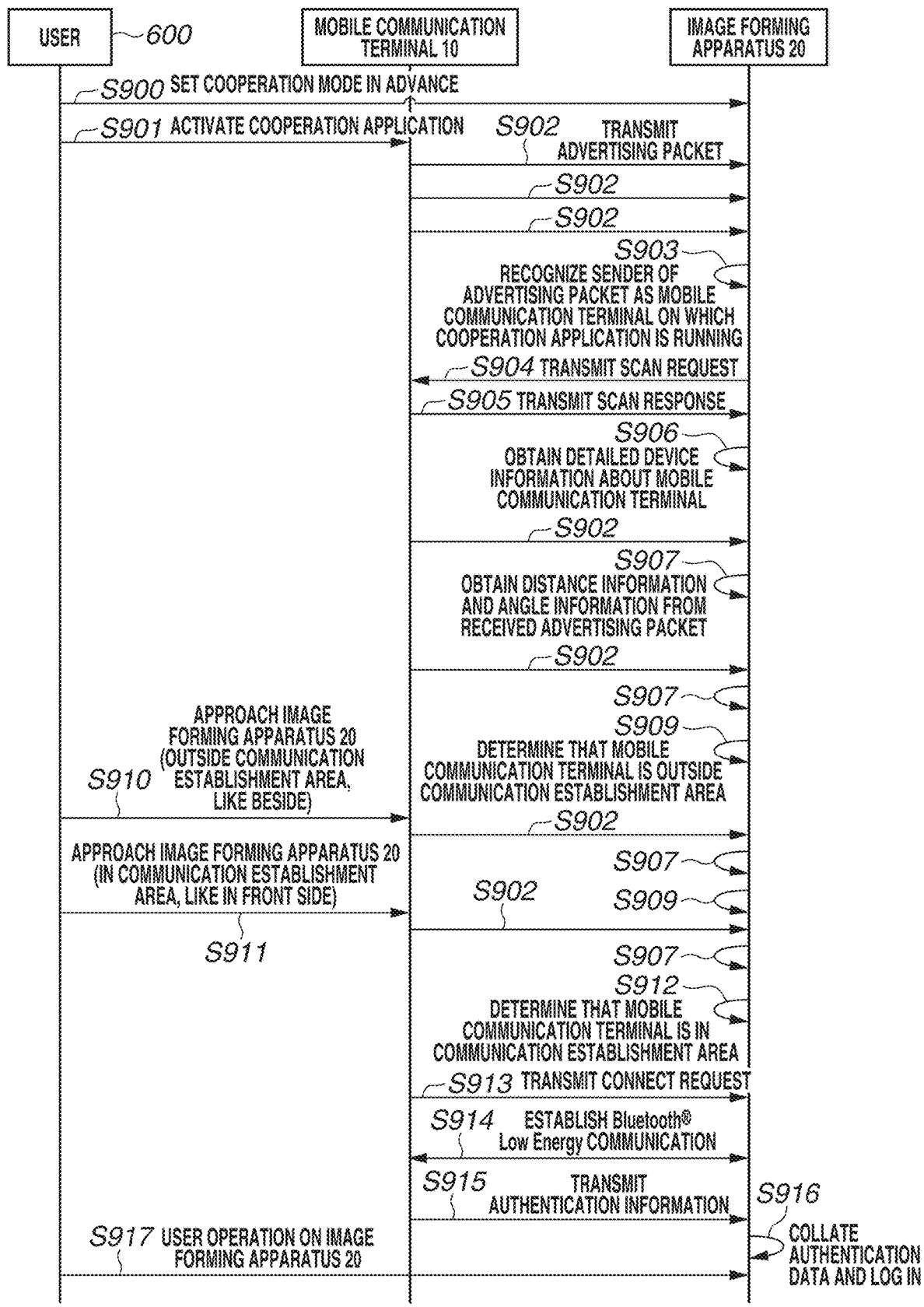

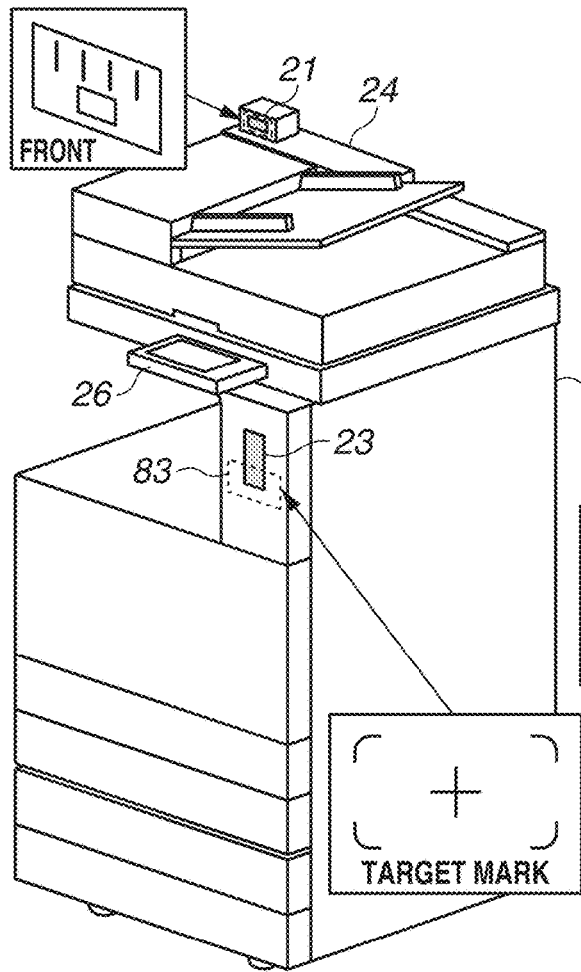
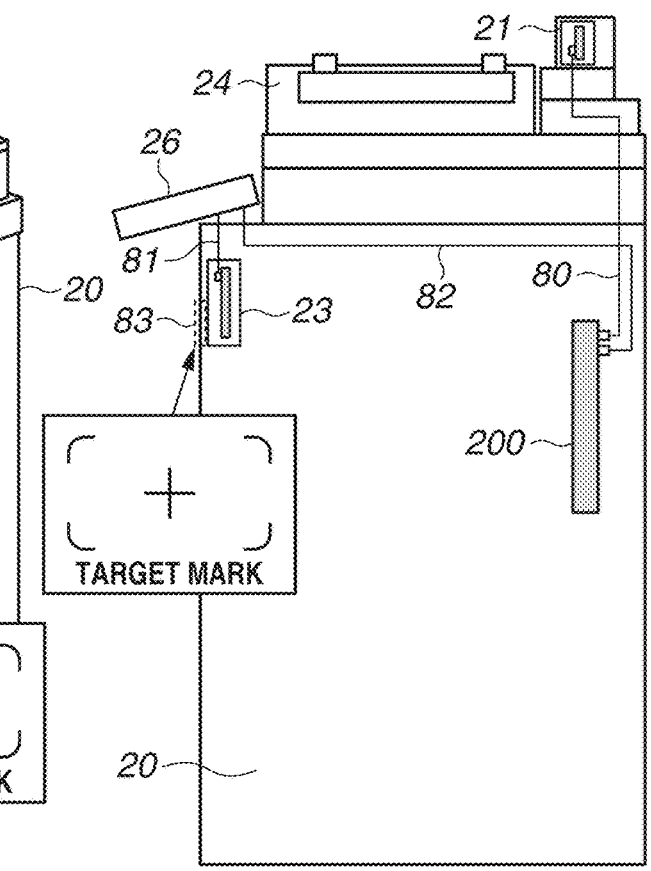
FIG.14A
FIG.14B
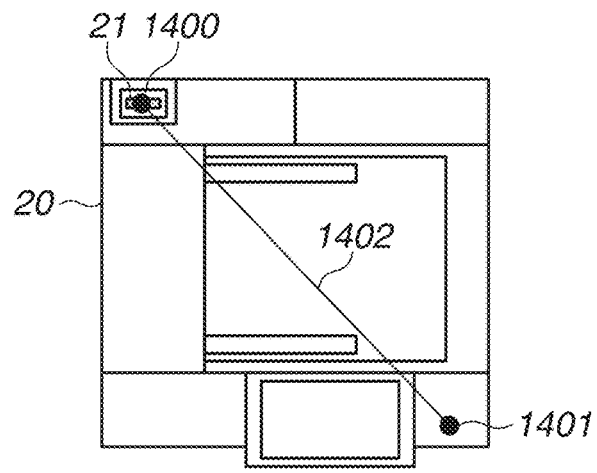
FIG.14C

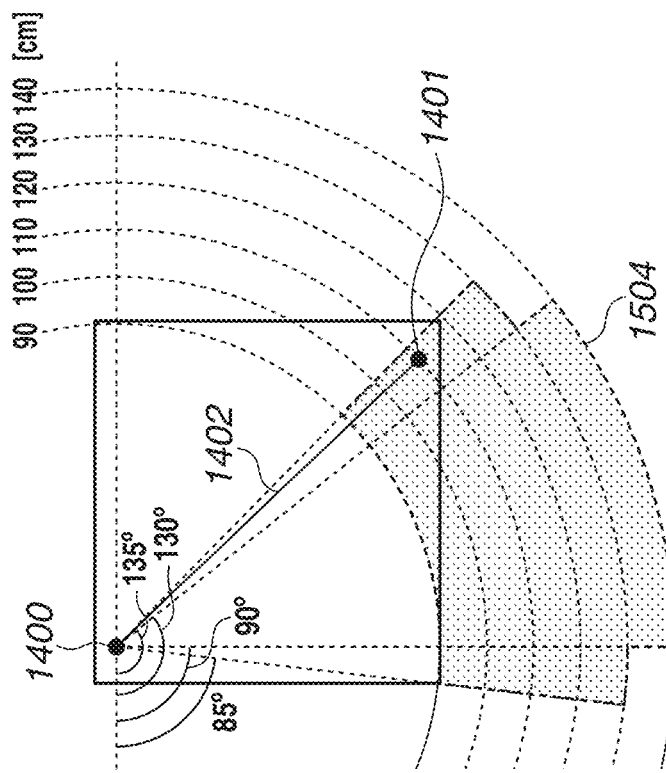
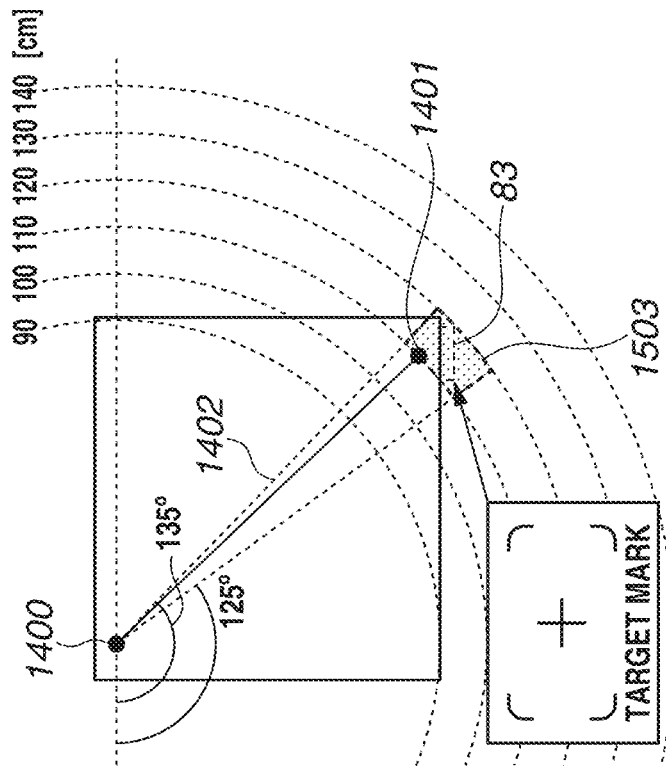

< POSITION C >
R = 100 cm
θ = 60°

⇒ < POSITION C' >
R' = 127 cm
θ' = 3°

< POSITION A >
R = 135 cm
θ = 90°

⇒ < POSITION A' >
R' = 98 cm
θ' = 33°

< IF $0° \leq θ < 90°$ >

$R' = \sqrt{R^2 + c^2 - 2*R*c*\cos(90°-θ+B)}$ $θ' = \arcsin\left(\dfrac{R*\sinθ - a}{\sqrt{R^2 + c^2 - 2*R*c*\cos(90°-θ+B)}}\right)$ < IF $90° \leq θ \leq 180°$ >

$R' = \sqrt{R^2 + c^2 - 2*R*c*\cos(B-θ-90°)}$ $θ' = \arcsin\left(\dfrac{R*\cos(θ-90°) - a}{\sqrt{R^2 + c^2 - 2*R*c*\cos(B-θ-90°)}}\right)$ < IF 0° ≤ θ < 90° >
R*cos(θ) ≤ 100 cm
AND
R*sin(θ) ≤ 70 cm < IF 90° ≤ θ ≤ 180° >
R*cos(180°-θ) ≤ 25 cm
AND
R*sin(180°-θ) ≤ 70 cm

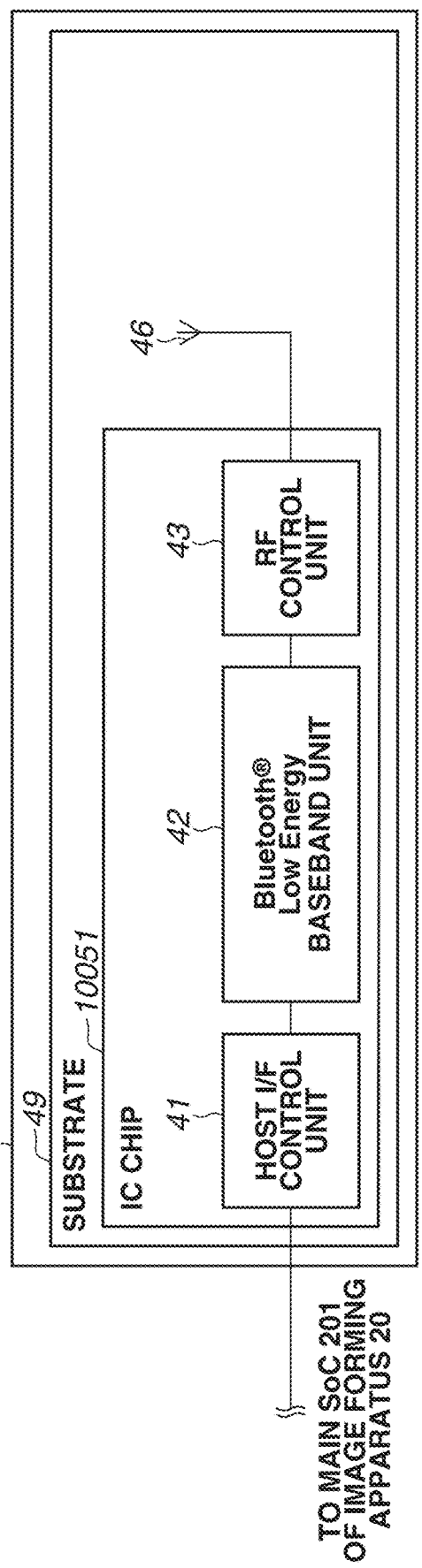
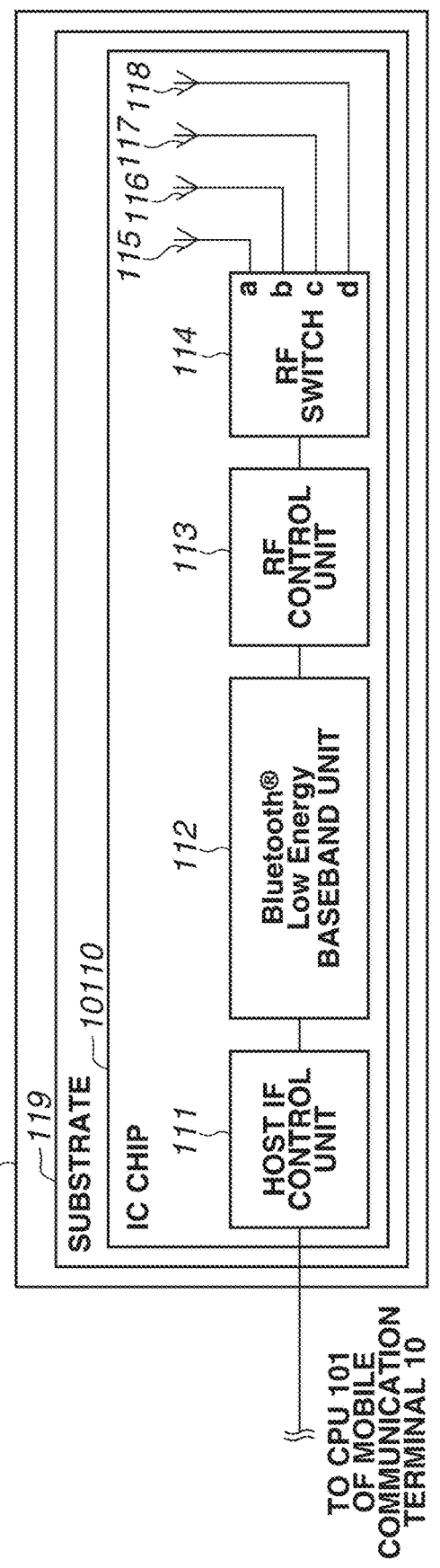

COMMUNICATION SYSTEM USING WIRELESS COMMUNICATION, COMMUNICATION APPARATUS, AND CONTROL METHOD

CROSS-REFERENCE TO RELATED APPLICATIONS

The present application is a continuation of U.S. patent application Ser. No. 17/137,200, filed on Dec. 29, 2020, which claims priority from Japanese Patent Applications No. 2020-003100, filed Jan. 10, 2020, No. 2020-003099, filed Jan. 10, 2020, and No. 2020-176783, filed Oct. 21, 2020, which are hereby incorporated by reference herein in their entireties.

BACKGROUND OF THE INVENTION

Field of the Invention

The present invention relates to a communication apparatus capable of communicating wirelessly with a terminal such as a mobile communication terminal. Such a communication apparatus can be used as a business machine such as a printer, a scanner, a facsimile (FAX) machine, a copying machine, and a multifunctional peripheral, as well as a general-purpose information processing apparatus such as a personal computer (PC).

Description of the Related Art

The use of mobile communication terminals such as a smartphone and a tablet terminal for business purposes has been increasing. Improvement and expansion of cooperation functions with mobile communication terminals have thus been desired in business machines (information processing apparatuses) including printers (image forming apparatuses).

As an example of the cooperation functions, there is a function of implementing cooperation using Bluetooth® communication, or Bluetooth® Low Energy in particular. Bluetooth® Low Energy is one of the Bluetooth® standards, and a standard for proximity wireless communication with low power consumption compared to conventional Bluetooth® communications.

Japanese Patent Application Laid-Open No. 2017-173189 discusses a system in which a distance between an image forming apparatus and a mobile terminal (external apparatus) is identified by using the radio field intensity of a Bluetooth® Low Energy beacon emitted from the image forming apparatus. If the distance is sufficiently small, the two apparatuses are determined to be ones to cooperate with each other and communication for cooperation is started.

However, the system discussed in Japanese Patent Application Laid-Open No. 2017-173189 has room for improvement in terms of how to determine the apparatuses to cooperate. The reason is that the system discussed in Japanese Patent Application Laid-Open No. 2017-173189 uses only the distance between the two apparatuses in determining the apparatuses to cooperate, and thus apparatuses lying at a close distance but not to cooperate with can be brought into cooperation. For example, suppose that in the system discussed in Japanese Patent Application Laid-Open No. 2017-173189, a distance for cooperation is determined so that the image forming apparatus can cooperate with a mobile terminal approaching the front side of the image forming apparatus. In such a case, the image forming apparatus can start to cooperate even with a mobile terminal located behind or beside the image forming apparatus if the mobile terminal lies within the distance. Accordingly, cooperation can be undesirably started even if a user holding a mobile terminal merely passes behind or beside the image forming apparatus.

SUMMARY OF THE INVENTION

The present invention is directed to a communication system that can prevent a situation where a communication terminal and a communication apparatus cooperate undesirably via wireless communication. In particular, the present invention is directed to a communication system that can prevent a situation where a communication terminal and a communication apparatus cooperate undesirably in implementing cooperation via Bluetooth® wireless communication using information about a distance between the communication terminal and the communication apparatus.

According to an aspect of the present invention, a communication system includes a communication apparatus and a communication terminal configured to wirelessly communicate with each other, wherein the communication terminal includes a first wireless communication interface configured to support a Bluetooth® standard and include a single antenna, and wherein the communication apparatus includes a second wireless communication interface configured to support the Bluetooth® standard and include a plurality of antennas, and includes one or more controllers configured to function as a unit configured to obtain angle information and field intensity information based on a result of reception of radio waves, by the plurality of antennas, transmitted from the single antenna; and a unit configured to transmit an establishment request for wireless communication based on the Bluetooth® standard to the first wireless communication interface via the second wireless communication interface based on a fact that the angle information and the field intensity information satisfy a predetermined condition.

Further features of the present invention will become apparent from the following description of exemplary embodiments with reference to the attached drawings.

BRIEF DESCRIPTION OF THE DRAWINGS

FIGS. 4A and 4B are block diagrams respectively illustrating configurations of Bluetooth® circuits included in the image forming apparatus and the mobile communication terminal.

FIGS. 8A and 8B are diagrams respectively illustrating an image forming apparatus according to a first exemplary embodiment seen diagonally from the front right and the image forming apparatus according to the first exemplary embodiment seen from the right side.

FIG. 9 is a sequence diagram illustrating an overall procedure of operations of a user, a mobile communication terminal, and an image forming apparatus according to the first exemplary embodiment.

FIGS. 14A, 14B, and 14C are diagrams respectively illustrating an image forming apparatus according to second and third exemplary embodiments seen diagonally from the front right, the image forming apparatus according to the second and third exemplary embodiments seen from the right side, and the image forming apparatus according to the second and third exemplary embodiments seen from above.

FIGS. 15A and 15B are diagrams respectively illustrating a communication establishment area according to the second exemplary embodiment and a communication establishment area according to a modified example of the second exemplary embodiment.

FIGS. 24A and 24B are diagrams respectively illustrating a configuration of a Bluetooth® circuit included in an image forming apparatus and a configuration of a Bluetooth® circuit included in a mobile communication terminal.

DESCRIPTION OF THE EMBODIMENTS

Exemplary embodiments of the present invention will be described in detail below using a plurality of specific examples and with reference to the drawings. Configurations for implementing the exemplary embodiments are not limited to those described below. Part of the described configurations may be omitted or replaced with equivalents thereof as far as similar effects are obtained.

In a first exemplary embodiment, a configuration is described where a reception angle (angle of arrival (AoA)) method is used to determine a relative positional relationship between an image forming apparatus and a mobile communication terminal. More specifically, a configuration will be described in which a plurality of radio waves transmitted from a single antenna of the mobile communication terminal is received by a plurality of antennas of the image forming apparatus, and the relative positional relationship is determined by using the received plurality of radio waves. In particular, in the first exemplary embodiment, a configuration will be described in which a Bluetooth® circuit 21 is located on a front side of an image forming apparatus 20 and a detection area of limited angles and distances about the Bluetooth® circuit 21 is used.

<System Configuration>

Figure 1:
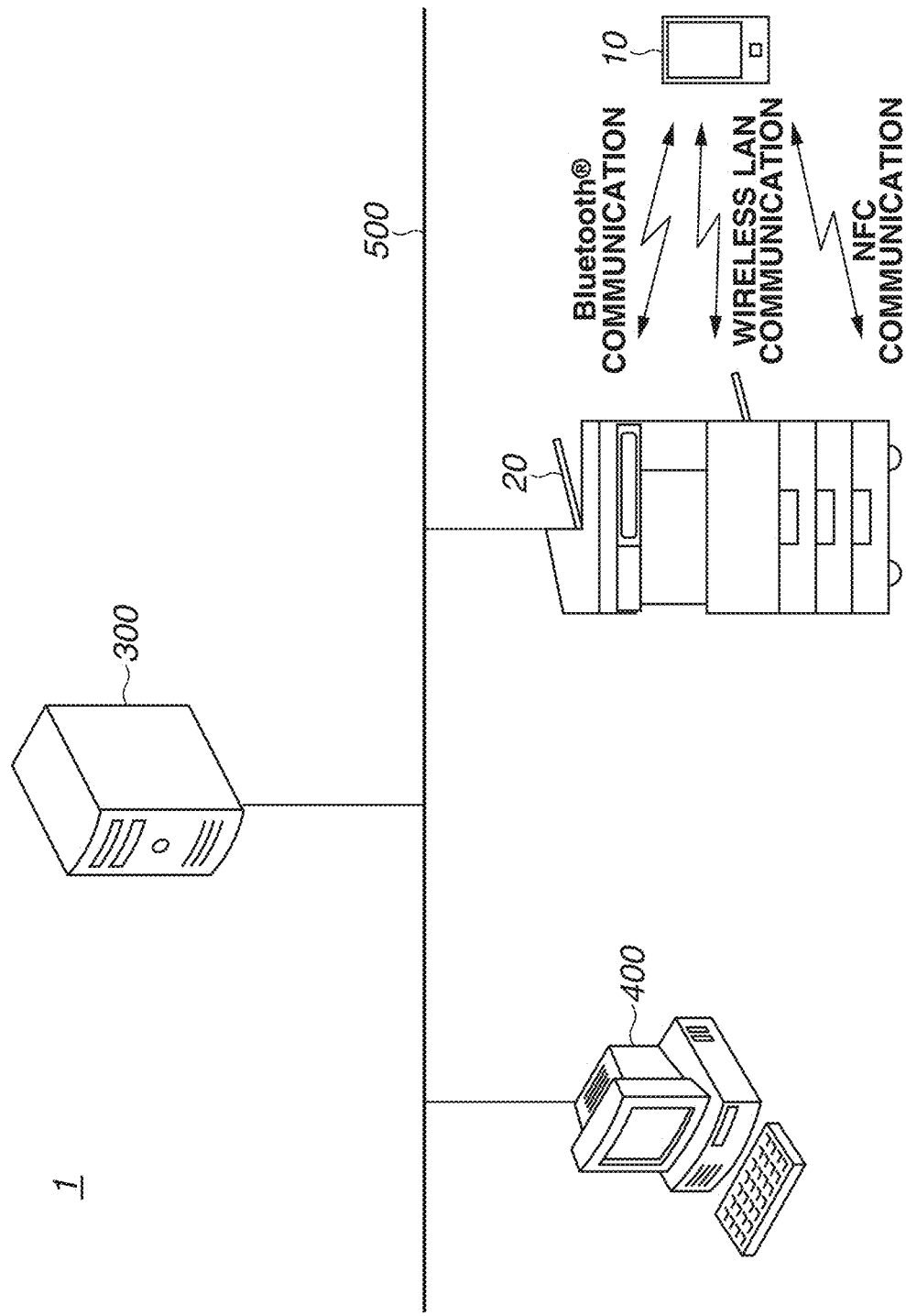
FIG. 1 is a diagram illustrating a configuration of an image processing system.

FIG. 1 is a diagram illustrating a configuration of an image processing system. As illustrated in FIG. 1, an image processing system 1 (communication system) includes a mobile communication terminal 10, an image forming apparatus 20, a client terminal 400, and a server 300. The image forming apparatus 20, the client terminal 400, and the server 300 are communicably connected to each other via a network 500.

Examples of the image forming apparatus 20 include a multifunction peripheral (MFP) having a plurality of functions such as a copy function, a scan function, a print function, a facsimile (FAX) function, and an email sending function, and a printer having a single function (single function printer (SFP)), and a communication apparatus such as a scanner. In the image processing system 1 according to the present exemplary embodiment, the image forming apparatus 20 will be described as a color laser beam MFP.

The client terminal 400 is an information processing apparatus such as a personal computer (PC) used by a user. The client terminal 400 issues a print job to print an electronic file stored in a storage of the client terminal 400 or an external server (not illustrated) by the image forming apparatus 20. The client terminal 400 also receives image data scanned by the image forming apparatus 20.

The server 300 is an information processing apparatus that provides various network services for the image forming apparatus 20.

For example, the server 300 provides a service of downloading and storing print data that the image forming apparatus 20 can print. For example, the server 300 provides a service of accepting and storing an image read and uploaded by the image forming apparatus 20. For example, the server 300 provides an email service of transmitting an email output from the image forming apparatus 20 to a destination apparatus, and transmitting an email sent from an external apparatus to the image forming apparatus 20 to the image forming apparatus 20. For example, the server 300 provides a user authentication service for managing users who operate the image forming apparatus 20 by using user identifiers (IDs) or group IDs.

A job refers to a unit of a series of image processes (e.g., copy, scan, and print) that the image forming apparatus 20 implements by using a scanner 24 and/or a printer 25.

The network 500 is the Internet or other information communication network such as a local area network (LAN) and a wide area network (WAN).

Examples of the mobile communication terminal 10 include mobile phones such as a smartphone, and communication apparatuses such as a tablet PC, a notebook PC, and a personal digital assistant (PDA). The mobile communication terminal 10 can communicate wirelessly with the image forming apparatus 20 via Bluetooth® communication, wireless LAN communication, and near-field communication (NFC), and has a cooperation function of cooperating with the image forming apparatus 20 using wireless communication. Examples of the cooperation function include an authentication function (login function) of performing a user authentication procedure with the image forming apparatus 20 and imposing or lifting restrictions on the functions of the image forming apparatus 20. Another example of the cooperation function is a print function of transmitting print data to be printed by the image forming apparatus 20 from the mobile communication terminal 10. Another example of the cooperation function is a transmission function of transmitting an image read from a document by the image forming apparatus 20 to the mobile communication terminal 10. Another example of the cooperation function is a checking function where the mobile communication terminal 10 obtains status information, setting information, and/or screen information about the image forming apparatus 20 and checks the information.

<Mobile Communication Terminal>

Figure 2:
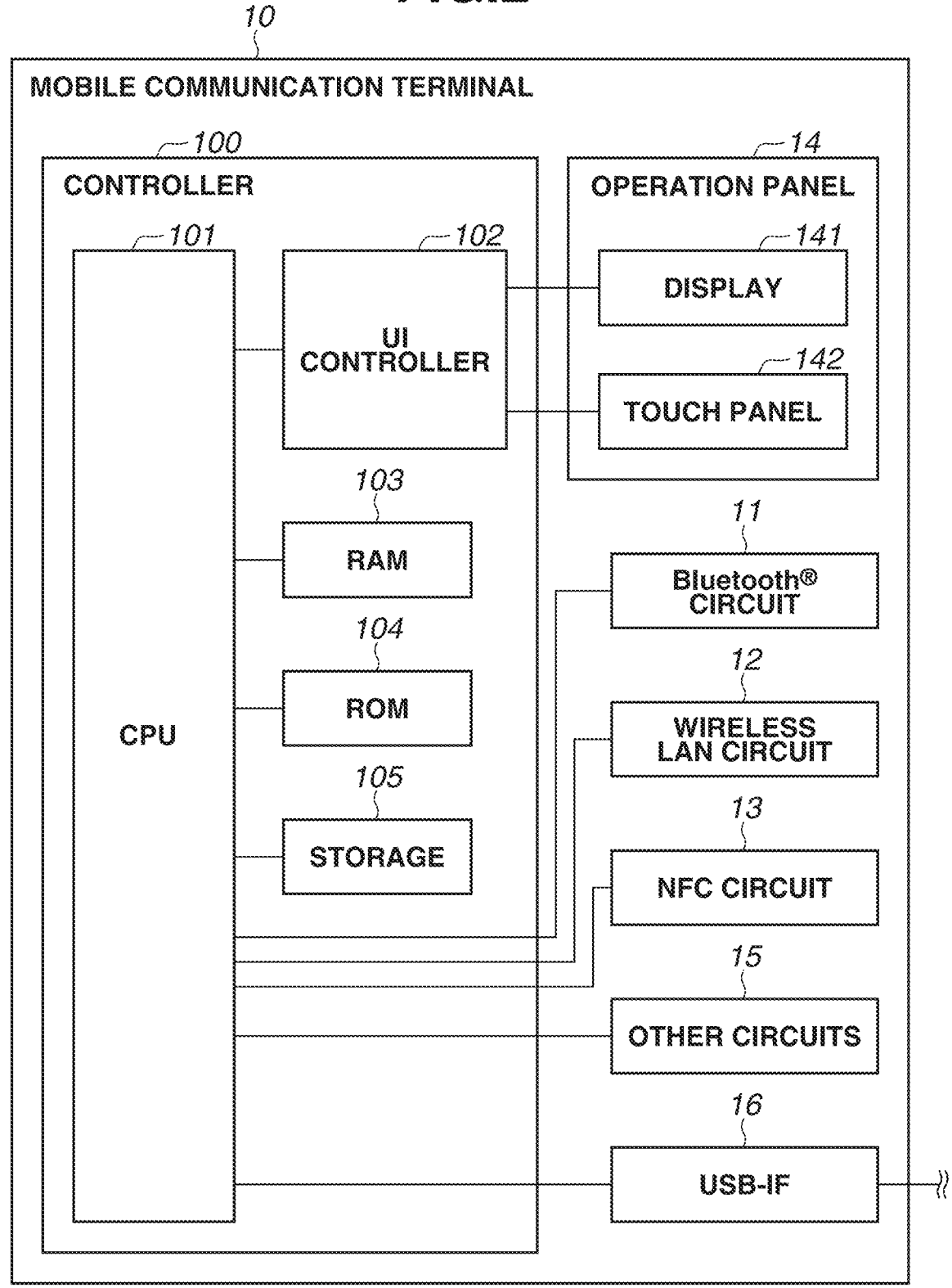
FIG. 2 is a block diagram illustrating a hardware configuration of a mobile communication terminal.

FIG. 2 is a block diagram illustrating a hardware configuration of the mobile communication terminal 10. As illustrated in FIG. 2, the mobile communication terminal 10 includes a controller 100, an operation panel 14 a Bluetooth® circuit 11, a wireless LAN circuit 12, an NFC circuit 13, other circuits 15, and a Universal Serial Bus interface (USB-IF) 16. The operation panel 14, the Bluetooth® circuit 11, the wireless LAN circuit 12, the NFC circuit 13, the other circuits 15, and the USB-IF 16 are communicably connected to the controller 100 via communication paths such as a bus.

The wireless circuits (Bluetooth®, wireless LAN, and NFC circuits 11, 12, and 13) included in the mobile communication terminal 10 can establish wireless communication connections and exchange data with respective wireless circuits included in the image forming apparatus 20.

The Bluetooth® circuit 11 is an antenna module unit (wireless communication IF) including a controller based on the Bluetooth® standards. As employed herein, the Bluetooth® circuit 11 performs communication based on the Institute of Electrical and Electronics Engineers (IEEE) 802.15 standards (Bluetooth®). More specifically, the Bluetooth® circuit 11 performs wireless communication using low-power-consumption Bluetooth® Low Energy that is a part of the Bluetooth® standards, using 2.4-GHz industrial, scientific and medical (ISM) bands. The Bluetooth® circuit 11 supports the Bluetooth® Low Energy communication method according to Bluetooth® 5.1, and supports a function of detecting the direction of the mobile communication terminal 10 by the Bluetooth® Low Energy communication. A specific technique for angle detection will be described below with reference to FIG. 6.

The wireless LAN circuit 12 is an antenna module unit (wireless communication IF) including a controller based on wireless LAN standards (Wi-Fi standards, or IEEE 802.11 standards).

The NFC circuit 13 is an antenna module unit (wireless communication IF) including a controller based on NFC standards such as type A, type B, and type F.

The operation panel 14 is a user IF unit capable of displaying and inputting information. The operation panel 14 includes a display 141 functioning as a display unit that displays information, and a touch panel 142 functioning as an input unit (acceptance unit) that accepts input of information.

The other circuits 15 include other circuits constituting the mobile communication terminal 10, such as a functional module for mobile phone radio waves, and a functional module for the Global Positioning System (GPS). Since the configuration of the other circuits 15 varies from one product to another, a detailed description thereof will be omitted.

The USB-IF 16 is an IF for connecting to an information processing apparatus such as a PC, and transmitting and receiving data by communication based on USB standards.

The controller 100 is a control unit for performing various controls on the mobile communication terminal 10. The controller 100 includes a central processing unit (CPU) 101, a user interface (UI) controller 102, a random access memory (RAM) 103, a read-only memory (ROM) 104, and a storage 105.

The CPU 101 controls the entire mobile communication terminal 10. The CPU 101 implements the functions of the mobile communication terminal 10 by connecting to and controlling various functional units.

The UI controller 102 is a UI control unit that controls the display 141 and the touch panel 142 in cooperation with the CPU 101. The UI controller 102 performs processing for recognizing an operation accepted from the user through the touch panel 142. The UI controller 102 also performs processing for changing the display contents of the display 141 based on an operating status of the mobile communication terminal 10 and an operation status of the touch panel 142. The user can operate an application to be described below by using the operation panel 14.

The RAM 103 is a work memory for the CPU 101 to operate. Calculation data of the CPU 101 and various programs are stored in the RAM 103.

The ROM 104 stores programs and image data to be used by the CPU 101 of the mobile communication terminal 10, and an application that operates in cooperation with the image forming apparatus 20.

The storage 105 is a nonvolatile secondary storage device for storing large-sized programs and data. The stored programs and data can be used when loaded into the RAM 103. Examples of the storage 105 include a memory device (storage unit) such as a Secure Digital (SD) card, an embedded MultiMediaCard (eMMC), and a solid state drive (SSD). The ROM 104 may take charge of some of the functions of the storage 105.

<Image Forming Apparatus>

Figure 3:
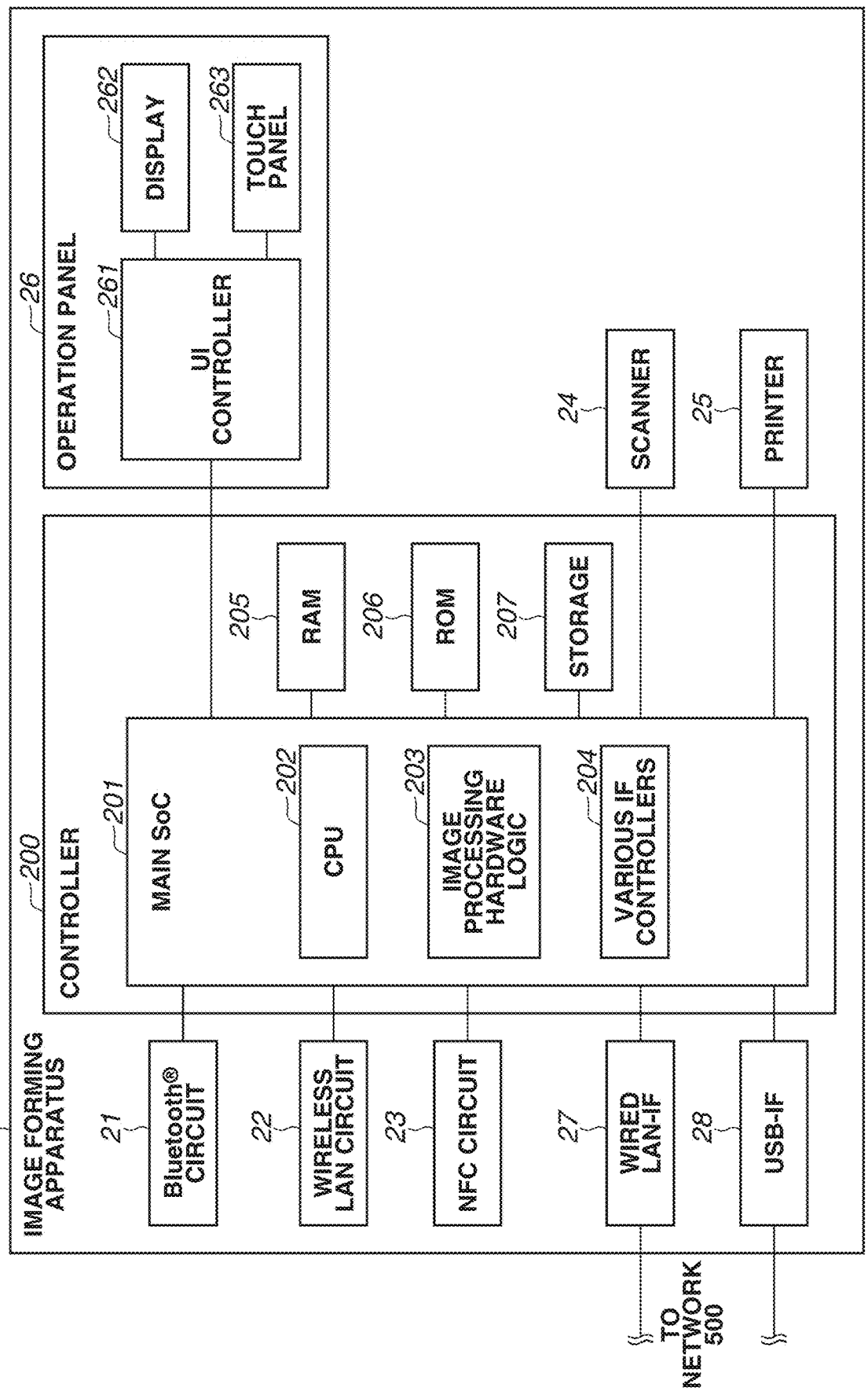
FIG. 3 is a block diagram illustrating a hardware configuration of an image forming apparatus.

FIG. 3 is a block diagram illustrating a hardware configuration of the image forming apparatus 20. The image forming apparatus 20 includes a controller 200, the scanner 24, the printer 25, an operation panel 26, a Bluetooth® circuit 21, a wireless LAN circuit 22, an NFC circuit 23 (NFC unit), a wired LAN-IF 27, and a USB-IF 28. Such functional units operate in a cooperative manner to implement functions such as a print, scan, and copy functions. The wireless circuits (Bluetooth®, wireless LAN, and NFC circuits 21, 22, and 23) can establish wireless communication connections and exchange data with the respective wireless circuits included in the mobile communication terminal 10.

The Bluetooth® circuit 21 is an antenna module unit (wireless communication IF) including a controller based on the Bluetooth® standards. Like the mobile communication terminal 10, the Bluetooth® circuit 21 performs communication based on the IEEE 802.15 standards, and supports the Bluetooth® Low Energy communication method according to Bluetooth® 5.1. To recognize the reception angle of radio waves transmitted from the Bluetooth® circuit 11 of the mobile communication terminal 10 by the image forming apparatus 20, the Bluetooth® circuit 21 includes a plurality of antennas. A specific configuration and a specific technique for angle detection will be described below.

The wireless LAN circuit 22 is an antenna module unit (wireless communication IF) including a controller based on the wireless LAN standards (Wi-Fi standards, or IEEE 802.11 standards).

The NFC circuit 23 is an antenna module unit (wireless communication IF) including a controller based on the NFC standards such as type A, type B, and type F.

The scanner 24 is a unit (reading unit or reading device) that reads images and/or characters on a document with a charge-coupled device (CCD) sensor or a contact image sensor (CIS), and converts the read images and/or characters into image data. The document to be read may be a document placed on a glass platen or a document conveyed by an automatic document feeder (ADF).

The printer 25 is a printer engine (image forming unit or image forming device) that prints image data on a sheet. For example, the printer 25 is an electrophotographic printer, and includes a laser scanner unit, a photosensitive drum, and a sheet conveyance unit. Inkjet and other types of printer engines may be employed.

The operation panel 26 is a UI unit that the user uses to operate the image forming apparatus 20. The operation panel 26 is a UI unit capable of displaying and inputting information. The operation panel 26 includes a display 262 functioning as a display unit that displays information, a touch panel 263 functioning as an input unit (acceptance unit) that accepts input of information, and a UI controller 261 that controls the display 262 and the touch panel 263. The UI controller 261 controls the display 262 and the touch panel 263 in cooperation with a main system on a chip (SoC) 201. The UI controller 261 performs processing of recognizing an operation accepted from the user by the touch panel 263. The UI controller 261 also performs processing of changing the display contents of the display 262 based on an operating status of the image forming apparatus 20 and an operation status of the touch panel 263.

The wired LAN-IF 27 is an IF for performing network communication via a LAN connector.

The USB-IF 28 is an IF for connecting to a PC and transmitting and receiving data by communication based on the USB standards.

The controller 200 is electrically connected to and controls the Bluetooth® circuit 21, the wireless LAN circuit 22, the NFC circuit 23, the scanner 24, the printer 25, and the operation panel 26. The controller 200 includes a RAM 205, a ROM 206, and a storage 207 in addition to the main SoC 201.

The main SoC 201 is an integrated circuit part, and includes a CPU 202, image processing hardware logic 203, and various IF controllers 204.

The CPU 202 controls the entire image forming apparatus 20. The CPU 202 implements various functions of the image forming apparatus 20 by connecting to and controlling various functional units.

The image processing hardware logic 203 performs image processing such as correction, modification, and editing on image data received from the scanner 24 or the wired LAN-IF 27. The image processing hardware logic 203 also performs processing such as color conversion, filter processing, and resolution conversion on image data to be output to the printer 25.

The various IF controllers 204 are IF controllers used in connecting to the Bluetooth® circuit 21, the wireless LAN circuit 22, the NFC circuit 23, the RAM 205, the ROM 206, and the storage 207. Examples of IF types include a USB IF, a Serial Advanced Technology Attachment (SATA) IF, and a low voltage digital signaling (LVDS) IF. System buses used for such connections are included in the main SoC 201.

The RAM 205 is a system work memory for the CPU 202 to operate. Calculation data of the CPU 202 and various programs are stored in the RAM 205. The RAM 205 is also used as an image memory for storing image data to which various types of image processing are applied by the image processing hardware logic 203 during scanning or during printing.

The ROM 206 is a boot ROM and stores a boot program of the controller 200.

The storage 207 is a nonvolatile secondary storage device for storing large-sized programs and data. The stored programs and data are loaded into the RAM 205 for use. Examples of the storage 207 include memory devices (storage units) such as a hard disk drive (HDD) and an SSD. The ROM 206 may take charge of some of the functions of the storage 207.

<Configuration of Bluetooth® Circuit>

A configuration of the Bluetooth® circuits 21 and 11 will be described in detail with reference to FIGS. 4A and 4B. FIG. 4A is a diagram illustrating the configuration of the Bluetooth® circuit 21 included in the image forming apparatus 20. The Bluetooth® circuit 21 is mounted on the image forming apparatus 20 and performs wireless communication according to the Bluetooth® standards (mainly related to Bluetooth® Low Energy) with the mobile communication terminal 10 to control input and output of data to and from the main SoC 201. As described above, the Bluetooth® circuit 21 supports the Bluetooth® Low Energy communication method according to Bluetooth® 5.1. The Bluetooth® circuit 21 includes an integrated circuit (IC) chip 51 and Bluetooth® Low Energy antennas 45 to 48, which are located on a substrate 49. In FIG. 4A, the Bluetooth® Low Energy antennas 45 to 48 are illustrated as three-pronged shape. However, such a representation is employed for the sake of convenience in distinguishing the Bluetooth® Low Energy antennas 45 to 48 from the solid lines in the diagram, and the Bluetooth® Low Energy antennas 45 to 48 do not need to actually have a three-pronged shape. The functions of a host IF control unit 41, a Bluetooth® Low Energy baseband unit 42, a radio frequency (RF) control unit 43, and an RF switch 44 are integrated on the IC chip 51.

The host IF control unit 41 inputs and outputs data to and from the main SoC 201 of FIG. 3 via a wired IF. Examples of the IF include an IF connectable by a cable 80 (see FIG. 8) supporting a serial communication method such as USB. The Bluetooth® Low Energy baseband unit 42 performs baseband signal processing to perform digital signal processing in the Bluetooth® Low Energy communication. The RF control unit 43 performs radio wave modulation and demodulation processing for RF communication in performing the Bluetooth® Low Energy communication with the mobile communication terminal 10. The RF switch 44 performs switching control to switch and connect each of the Bluetooth® Low Energy antennas 45 to 48 connected thereto to the RF control unit 43. The RF switch 44 is a four-contact switch including contact a, contact b, contact c, and contact d. The Bluetooth® Low Energy antenna 45 is an antenna formed to perform wireless communication. The image forming apparatus 20 can communicate with the mobile communication terminal 10 by using the Bluetooth® Low Energy antenna 45. The Bluetooth® Low Energy antenna 45 is a pattern antenna patterned on the substrate 49, and adjusted to have antenna characteristics to perform 2.4-GHz band the Bluetooth® Low Energy communication. The Bluetooth® Low Energy antennas 46 to 48 are antennas formed like the Bluetooth® Low Energy antenna 45.

The Bluetooth® Low Energy antennas 45 to 48 do not need to be pattern antennas formed on the substrate 49. For example, antenna parts (chip antennas) having equivalent characteristics may be mounted and arranged on the substrate 49. Such antennas do not need to be directly arranged on the substrate 49. For example, terminal connectors may be provided on antenna terminals a, b, c, and d of the IC chip 51, and external antennas connectable to the terminal connectors may be used.

The Bluetooth® Low Energy antennas 46 to 48 are adjusted to have antenna characteristics equivalent to those of the Bluetooth® Low Energy antenna 45. In other words, four Bluetooth® Low Energy antennas 45 to 48 having equivalent characteristics are uniformly arranged on the substrate 49. The Bluetooth® Low Energy antenna 45 is connected to contact a of the RF switch 44. Similarly, the Bluetooth® Low Energy antennas 46, 47, and 48 are connected to contacts b, c, and d of the RF switch 44, respectively. In this way, which of the four Bluetooth® Low Energy antennas 45 to 48 is connected to the RF control unit 43 can be switched by the RF switch 44.

FIG. 4B is a block diagram illustrating the configuration of the Bluetooth® circuit 11 included in the mobile communication terminal 10. The Bluetooth® circuit 11 is mounted on the mobile communication terminal 10 and performs wireless communication according to the Bluetooth® standards (mainly related to Bluetooth® Low Energy) with the image forming apparatus 20 to control input and output of data to and from the CPU 101. While the Bluetooth® circuit 21 includes a plurality of antennas, the Bluetooth® circuit 11 includes a single antenna. The Bluetooth® circuit 11 includes an IC chip 110 and a Bluetooth® Low Energy antenna 115, which are arranged on a substrate 119. The functions of a host IF control unit 111, a Bluetooth® Low Energy baseband unit 112, and an RF control unit 113 are integrated on the IC chip 110.

The host IF control unit 111 inputs and outputs data to and from the CPU 101 via a wired IF.

The Bluetooth® Low Energy baseband unit 112 performs baseband signal processing to perform digital signal processing in communication.

The RF control unit 113 performs radio wave modulation and demodulation processing for RF communication in performing the Bluetooth® Low Energy communication with the image forming apparatus 20.

The Bluetooth® Low Energy antenna 115 is an antenna formed to perform wireless communication. The mobile communication terminal 10 can communicate with the image forming apparatus 20 by using the Bluetooth® Low Energy antenna 115. The Bluetooth® Low Energy antenna 115 is a pattern antenna patterned on the substrate 119, and adjusted to have antenna characteristics for 2.4-GHz band the Bluetooth® Low Energy communication.

To enable detection of the direction of the mobile communication terminal 10 by the image forming apparatus 20, the Bluetooth® circuit 11 including a single antenna is configured to support the Bluetooth® Low Energy communication method according to Bluetooth® 5.1. Like the Bluetooth® circuit 21, the Bluetooth® circuit 11 may include a plurality of antennas.

<Antennas and Shield>

Next, a relationship between the antennas and a shield of the Bluetooth® circuit 21 will be described. As described above, the Bluetooth® circuit 21 includes a plurality of antennas. As illustrated in FIG. 5A, the Bluetooth® Low Energy antennas 45 to 48 are formed of a wiring pattern on the substrate 49. FIG. 5A is a diagram illustrating the surface of the Bluetooth® circuit substrate (substrate 49). The provision of the plurality of antennas enables angle detection according to the Bluetooth® standards (details will be described below). The Bluetooth® Low Energy antennas 45 to 48 are connected to the IC chip 51. More specifically, the Bluetooth® Low Energy antennas 45, 46, 47, and 48 are connected to contacts a, b, c, and d of the RF switch 44, respectively. To establish an IF connection with the controller 200, a connector 52 to which the cable 80 (see FIG. 8) can be connected is disposed on the substrate 49 of the Bluetooth® circuit 21. The connector 52 is connected to the host IF control unit 41 of the IC chip 51.

The substrate 49 has a screw hole 53 and is electrically connected to the ground (GND) of electrical circuits. In general, the antenna characteristics of wireless communication circuits using Bluetooth® Low Energy or other high frequency band radio waves can be maximized by the provision of electrically stable GND. The substrate 49 is therefore desirably fixed to a metal plate of the image forming apparatus 20, which is the electrically stable GND.

A method for fixing the substrate 49 will be described with reference to FIG. 5B. FIG. 5B is a diagram illustrating the upper surface of the Bluetooth® circuit substrate. A metal plate 55 is a plate to which the substrate 49 is attached. The metal plate 55 serves as the GND of the electric circuits in the main body of the image forming apparatus 20 and is grounded via a GND line. A metal spacer 56 is a spacer for fixing the substrate 49 to the metal plate 55. The metal spacer 56 physically connects the substrate 49 and the metal plate 55, and connects the substrate 49 and the metal plate 55 in terms of the GND of the electrical circuits. A screw 57 is a metal screw for fixing the substrate 49 to the metal spacer 56. The screw 57 is passed through the screw hole 53 of the substrate 49 and fastened. A resin spacer 58 is made of plastic resin. The resin spacer 58 is a spacer for fixing the substrate 49 to the metal plate 55, and is fixed to the metal plate 55.

The metal plate 55 also functions as a shield member for shielding the Bluetooth® Low Energy antennas 45 to 48 from incoming radio waves.

Figure 5C:
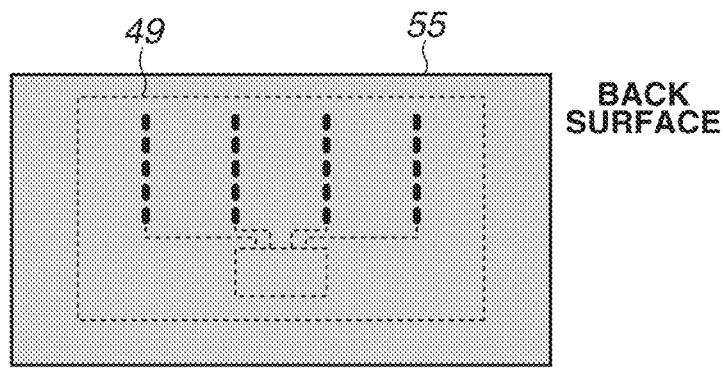
FIGS. 5A, 5B, 5C, and 5D are diagrams respectively illustrating a surface of a Bluetooth® circuit substrate, a top surface of the Bluetooth® circuit substrate, a back surface of the Bluetooth® circuit substrate, and a relationship between radio waves and a shield.
Figure 5B:
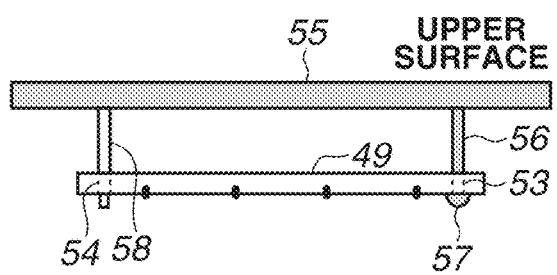
Figure 5D:
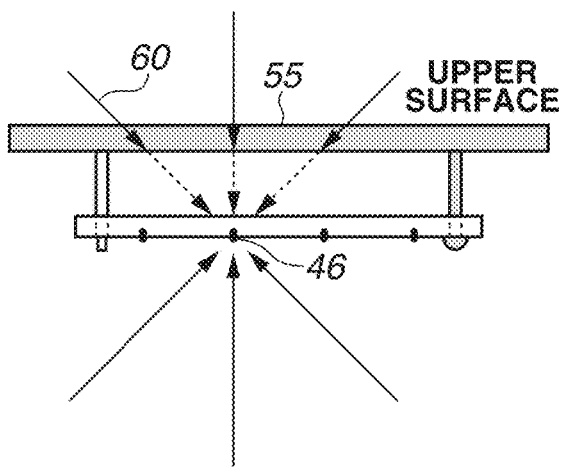
Figure 5A:
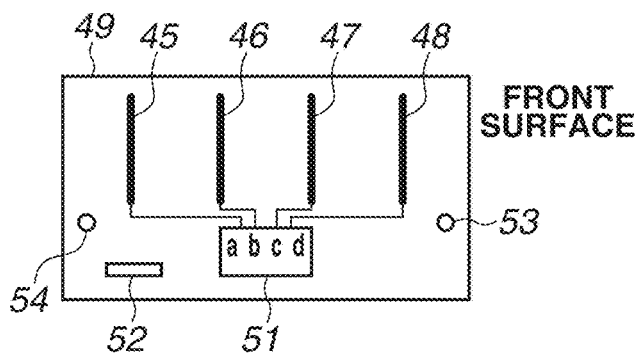

FIG. 5C is a diagram illustrating the back surface of the Bluetooth® circuit substrate. As illustrated in FIG. 5C, the entire backside of the substrate 49 including the area where the Bluetooth® Low Energy antennas 45 to 48 are arranged is shielded with the metal plate 55. The metal plate 55 in such a relationship affects the range of radio waves for the Bluetooth® Low Energy antennas 45 to 48 to receive. FIG. 5D is a diagram illustrating a relationship between the radio waves and the shield (shield member, i.e., metal plate 55). Like FIG. 5B, FIG. 5D illustrates the Bluetooth® circuit 21 seen from the upper side. FIG. 5D also illustrates the state of radio waves incoming to the Bluetooth® Low Energy antenna 46 as a representative of the Bluetooth® Low Energy antennas 45 to 48. As can be seen from 5D, the metal plate 55 is arranged on the back side of the substrate 49. Thus, of the radio waves incoming to the Bluetooth® Low Energy antenna 46, the radio waves incoming from the back side of the substrate 49 are blocked by the metal plate 55. Since the blocked radio waves are reflected or absorbed, the radio waves at the positions designated by the arrows 60 do not reach the Bluetooth® Low Energy antenna 46. Strictly speaking, there can be multipath propagation of diffracted waves and reflected waves in some areas, but such radio waves can be regarded as not affecting distance detection or angle detection to be described below since the radio field intensity is greatly attenuated.

Using such a characteristic, the propagation area of the radio waves incoming to the Bluetooth® Low Energy antennas 45 to 48 is limited to a semicircular area, not a concentric area. This can prevent cooperation with a mobile communication terminal 10 approaching the image forming apparatus 20 from the back side, while enabling appropriate cooperation with a mobile communication terminal 10 approaching the image forming apparatus 20 from the front side.

<Communication Establishment Processing>

Figure 7:
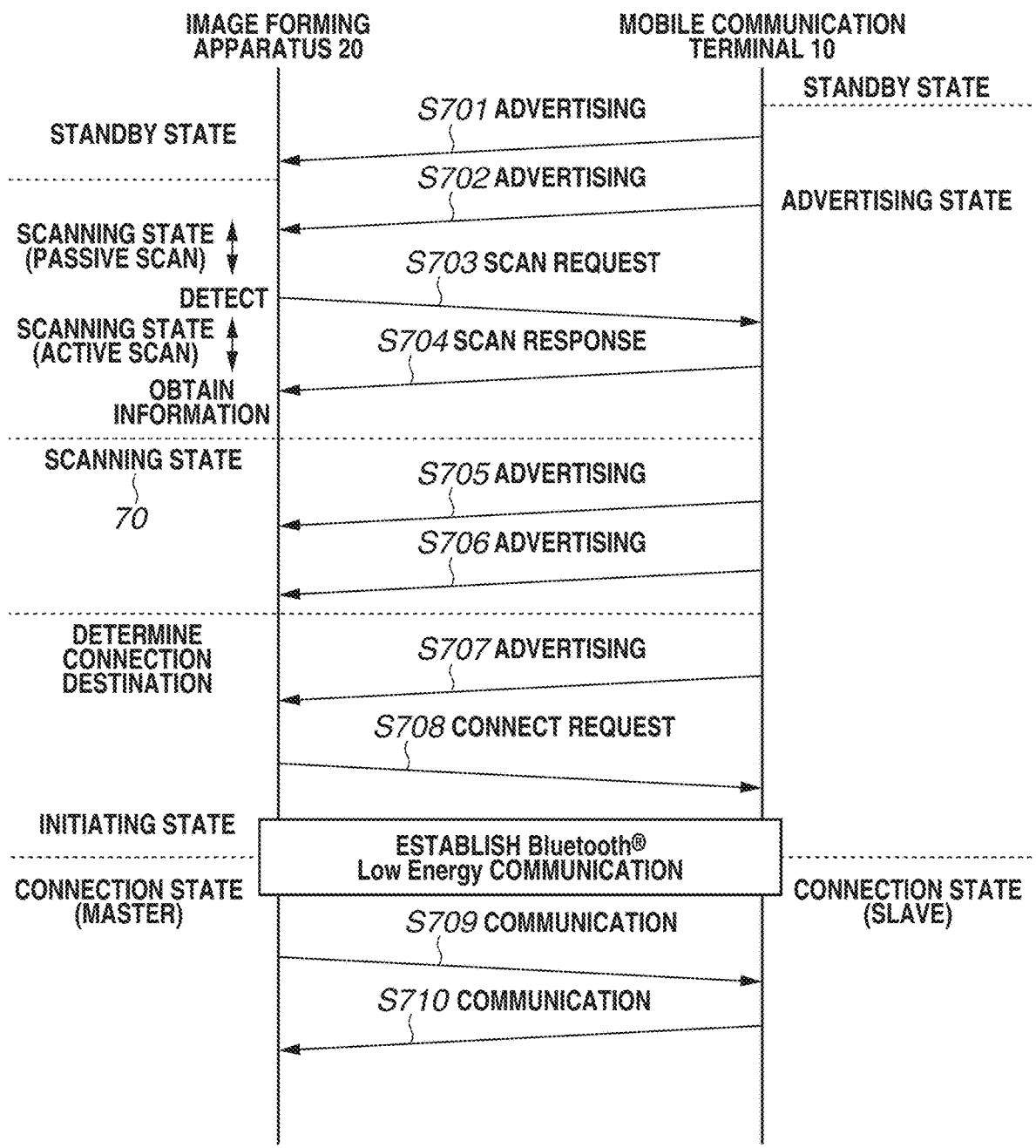
FIG. 7 is a sequence diagram illustrating a procedure for establishing communication between the mobile communication terminal and the image forming apparatus by using the Bluetooth® Low Energy.

Next, the establishment of the Bluetooth® Low Energy communication (communication establishment processing from discovery to connection) will be described. FIG. 7 is a sequence diagram illustrating an angle detection by Bluetooth® Low Energy. State transitions from the discovery of the mobile communication terminal 10 by the image forming apparatus 20 to the establishment of the Bluetooth® Low Energy communication connection are as follows.

As illustrated in FIG. 7, the link layers of both the image forming apparatus 20 and the mobile communication terminal 10 are initially in a standby state. The standby state refers to a state where no transmission or reception is being performed. If the mobile communication terminal 10 executes a program (cooperation application), then in step S701, the mobile communication terminal 10 transitions to an advertising state and transmits an advertising packet at regular intervals. The processing performed in step S701 represents a set of processes where the Bluetooth® Low Energy antennas 45 to 48 each receive an advertising packet (total of four advertising packets). The same applies to steps S702, S705, S706, and S707 to be described below.

The advertising packet is broadcast, i.e., not destination-designated radio wave transmission. The type of packet (Protocol Data Unit Type) here is ADV_IND since a connection request returned from the image forming apparatus 20 is expected. For example, the advertising packet includes information such as a device name, a universally unique identifier (UUID) indicating a device function, and a Tx Power Level.

As the processing of the program proceeds, the image forming apparatus 20 transitions to a scanning state. In the scanning state, the image forming apparatus 20 receives advertising packets from the mobile communication terminal 10. Such a scan state of receiving advertising packets will be referred to as passive scan. Depending on the processing step of the program, the image forming apparatus 20 may not be in the scan state. In such a case, the image forming apparatus 20 does not enter the passive scan and accept a broadcast packet from the mobile communication terminal 10. As employed herein, if the image forming apparatus 20 is activated and a Bluetooth® function of the image forming apparatus 20 is enabled, the image forming apparatus 20 is handled as being in the scan state.

In step S702, if an advertising packet from the mobile communication terminal 10 (advertiser) reaches the image forming apparatus 20 in the passive scan state, the processing of the program proceeds. In step S703, the image forming apparatus 20 transmits a scan request (SCAN_REQ) to the mobile communication terminal 10, attempting to obtain additional information. Such a scan state of obtaining information will be referred to as an active scan. In step S704, if the image forming apparatus 20 receives a scan response, the image forming apparatus 20 stores information obtained by the scanning into its own storage. Examples of the information obtained here include device information about the mobile communication terminal 10 as well as information for implementing the Bluetooth® 5.1 angle detection function, such as the wavelength λ of the radio waves. In steps S705 and S706, the image forming apparatus 20 continues to receive advertising packets from the mobile communication terminal 10 at regular intervals. In a scanning state 70, the image forming apparatus 20 can obtain a reception angle θ from the advertising packets issued by the mobile communication terminal 10. The image forming apparatus 20 can also obtain a distance from the radio field intensity of the received radio waves. The mobile communication terminal 10 may obtain a radiation angle θ calculated by the image forming apparatus 20 through communication.

In step S707, the image forming apparatus 20 receives an advertising packet from the mobile communication terminal 10. If the angle information and distance information obtained thereby show that the mobile communication terminal 10 is in a specific detection area, the image forming apparatus 20 transitions to an initiating state. In step S708, the image forming apparatus 20 transmits a connect request (CONNET_REQ) to perform negotiation, and transitions to a connection state. If the connection of the Bluetooth® Low Energy communication is completed, then in steps S709 and S710, the image forming apparatus 20 can serve as a master and the mobile communication terminal 10 as a slave to transmit and receive data. A series of processes for establishing the Bluetooth® Low Energy communication has been described above.

<Angle Detection>

Figure 6:
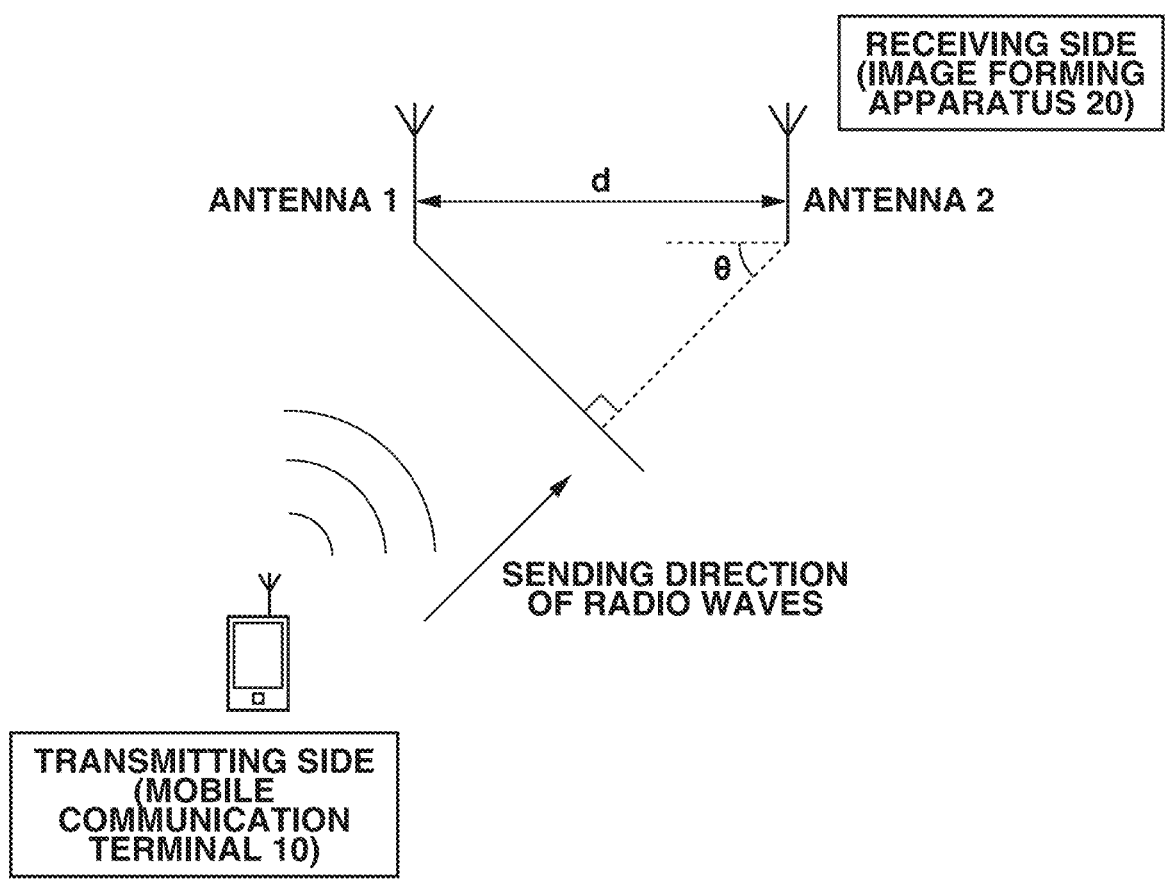
FIG. 6 is a diagram illustrating an angle detection by Bluetooth® Low Energy.

Next, a method for angle detection using a plurality of antennas will be described. A method for transmitting the Bluetooth® Low Energy communication radio waves from a transmitting side with a single antenna and receiving the radio waves with a plurality of antennas to detect direction will be described with reference to FIG. 6. FIG. 6 is a diagram illustrating angle detection by Bluetooth® Low Energy. In FIG. 6, the receiving side of the radio waves corresponds to the Bluetooth® circuit 21 of the image forming apparatus 20, and the transmitting side of the radio waves corresponds to the mobile communication terminal 10. This method is a reception angle detection method called AoA or Direction of Arrival (DoA). The positional relationship between the two apparatuses is expressed by a reception angle θ. While the Bluetooth® circuit 21 uses four antennas, the following description will be given by using two antennas 1 and 2 for ease of description.

Suppose initially that the mobile communication terminal 10 that is the transmitting side transmits an advertising packet (advertisement packet) at regular intervals. in this case, the image forming apparatus 20 that is the receiving side receives the advertising packet by using antennas 1 and 2. In this case, two types of radio waves, i.e., radio waves arriving at antenna 1 and radio waves arriving at antenna 2 are delivered to the image forming apparatus 20 that is the receiving side. Since antennas 1 and 2 are arranged at a distance from each other, the distance between antenna 1 and the mobile communication terminal 10 is different from that between antenna 2 and the mobile communication terminal 10. This causes a slight difference between the time for the radio waves transmitted from the mobile communication terminal 10 to arrive at antenna 1 and the time for the radio waves transmitted from the mobile communication terminal 10 to arrive at antenna 2. The slight difference in time can be detected as a phase difference when the image forming apparatus 20 receives the radio waves. Assume that the distance between antennas 1 and 2 is d, the reception angle (incoming angle) of the radio waves received by antennas 1 and 2 is θ, and the wavelength of the radio waves is λ. In this case, the following relationship holds:

$$\psi = (2\pi d * \cos(\theta))/\lambda,$$

where ψ is the phase difference described above.

The reception angle θ of the radio waves is thus expressed as follows:

$$\theta = \arccos((\psi\lambda)/(2\pi d)).$$

The positional relationship between the transmitting side and the receiving side of the radio waves can be determined as the reception angle θ if the radio waves transmitted from the single antenna are received by the plurality of antennas and the phase difference between the received plurality of types of radio waves can be accurately detected. To determine an accurate phase difference, the antennas 1 and 2 desirably have equivalent radio wave characteristics. For such a reason, the Bluetooth® Low Energy antennas 45 to 48 are configured to have equivalent radio wave characteristics as described above. To determine an accurate phase difference, the radio waves received by the antenna 1 and those received by the antenna 2 are desirably direct waves arriving at the plurality of antennas of the receiving side straight through the same propagation path. Whether the plurality of types of radio waves received by the Bluetooth® Low Energy antennas 45 to 48 have propagated through the same propagation path (are direct waves) can be determined, for example, by comparing the reception intensities of the radio waves.

To perform above-described calculation, the distance d between antennas 1 and 2 of the receiving side and the wavelength λ of the radio waves are required. Thus, if the image forming apparatus 20 calculates the reception angle θ, a parameter indicating the distance d may be stored in the image forming apparatus 20 in advance. The information about the wavelength λ may be obtained from the advertising packet (or response to a scan request) transmitted from the mobile communication terminal 10.

The following description will be given on the assumption that the reception angle θ can be obtained. Assume also that the reception angle θ is calculated by the RF control unit 43 in the IC chip 51 based on the specifications of the Bluetooth® standards. Accordingly, the controller 200 can simply obtain reception angle information output from the Bluetooth® circuit 21. Alternatively, the reception angle θ may be calculated by the controller 200.

<Distance Detection>

Figure 12:
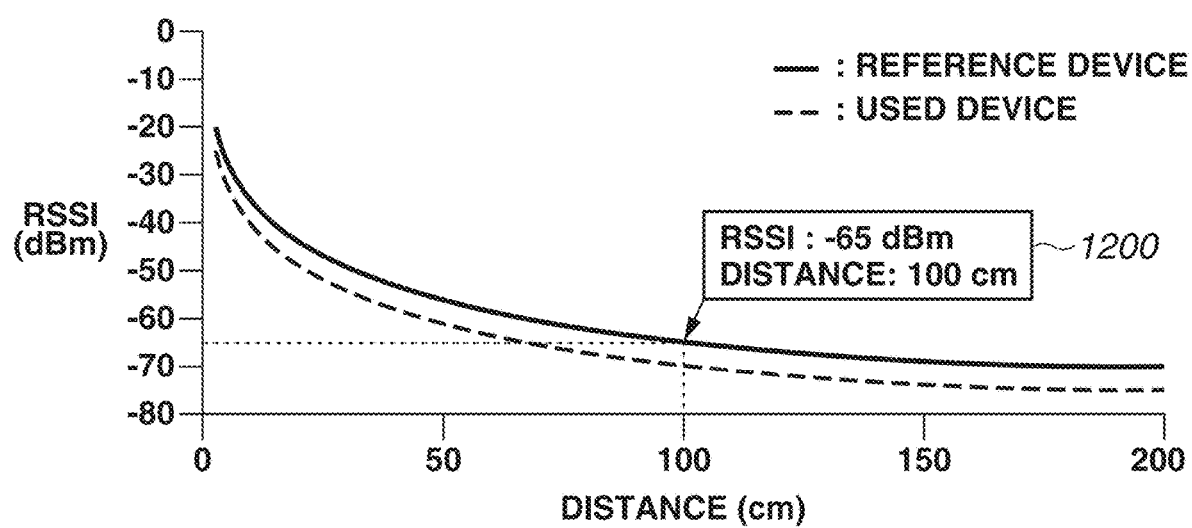
FIG. 12 is a chart illustrating a relationship between a radio field intensity and a distance in a look-up table (LUT) used for conversion.

Next, distance detection using the radio field intensity will be described. FIG. 12 is a chart illustrating a relationship between the radio field intensity and the distance in a look-up table (LUT) used for conversion. The distance between the transmitting side and the receiving side of radio waves can be estimated based on information indicating how much the radio waves are attenuated from when the radio waves are transmitted to when the radio waves are received. The attenuation of the radio waves can be calculated based on output field intensity (first field intensity information) when the transmitting side transmits the radio waves and reception field intensity (measured field intensity, second field intensity information) when the receiving side receives the radio waves.

A typical calculation formula for calculating a propagation loss L of radio waves in a free space is expressed by the following formula (1).

$$L = P - \text{RSSI}, \quad (1)$$

where L is the propagation loss, P is the output field intensity, and RSSI is the measured field intensity.

The distance is calculated from the propagation loss L. For example, the calculation of the propagation loss L is defined by the following formula (2).

$$L = (4\pi R/\lambda)^2, \quad (2)$$

where R is the distance between the transmitting side and the receiving side, λ is the wavelength of the radio waves, and π is circle ratio (Pi). Formula (2) can be transformed into formula (3) for determining the distance R.

$$R = (\lambda(\sqrt{L}))/(4\pi) \quad (3)$$

In this way, the distance R can be calculated if the wavelength λ of the radio waves, the output field intensity P, and the reception field intensity RSSI are known. If the image forming apparatus 20 calculates the distance R, the reception field intensity RSSI is measured in receiving the radio waves. The wavelength λ of the radio waves and the output field intensity P can be obtained from the advertising packet (or response to a scan request).

However, the value obtained by the above-described calculation is a calculated value under an ideal environment. There can be an error in the distance value because of differences in various use environments, including individual differences in the layout of the antennas and the shape of the image forming apparatus 20. Thus, a table (LUT) may be generated from a relationship between the distance and the reception field intensity obtained in designing the image forming apparatus 20, and used to determine a communication establishment area. With this method, the field intensity characteristics specific to the model of the image forming apparatus 20 can be reflected without expressing the field intensity characteristics in terms of coefficients for a calculation formula.

FIG. 12 is the chart illustrating the relationship between the reception field intensity RSSI and the distance R in the conversion table used in the image forming apparatus 20. As illustrated by a conversion example 1200 in FIG. 12, the conversion table used in the image forming apparatus 20 outputs a distance of 100 cm if an RSSI value of −65 dBm is input. As can be seen from FIG. 12, if an RSSI value greater than −65 dBm is input, a distance smaller than 100 cm is output. On the other hand, if an RSSI value smaller than −65 dBm is input, a distance greater than 100 cm is output. Moreover, as can be seen from FIG. 12, the greater the distance is, the smaller the amount of change in the radio field intensity tends to be. This means that the farther the position is, the more difficult the distance is to determine. In this reason, to accurately determine distances at far locations, the output field intensity P of the mobile communication terminal 10 may be desirably set to a higher value. If the output field intensity P is adjusted, the adjusted value may be desirably included in the advertising packet as Tx Power information. Using the Tx Power information, the image forming apparatus 20 can calculate and convert the distance R based on the Tx Power (output field intensity P). For example, if the Tx Power is adjusted, the image forming apparatus 20 switches or corrects the LUT to be used.

The above-described conversion table is generated on the assumption that an ideal mobile communication terminal 10 (reference device) is used. If the mobile communication terminal 10 in the user environment (used device) having model-specific field intensity characteristics is used, the output distance information may shift from the actual distance. For example, as illustrated by a broken line in FIG. 12, the used device may have characteristics of outputting small RSSI values (by −5 dBm or so), compared to the reference device. Thus, for accurate distance detection, such characteristic information (individual value information) is desirably stored to correct RSSI values before the conversion using the above-described conversion table. This characteristic information (calibration information) can be obtained by calibration processing. The calibration processing is performed by arranging the used device at a specific position with respect to the image forming apparatus 20 and measuring the reception field intensity of the radio waves received in this state. Examples of the specific position include a position 0 cm from a touch mark on the image forming apparatus 20 and a position 100 cm from the touch mark. The calibration processing does not necessarily need to be performed. The calibration processing is desirably performed at a position suitable for the use purpose. The calibration processing may be performed at a plurality of positions to enable more accurate corrections. The reception field intensity may vary depending on the obtaining timing. Reception field intensities may desirably be obtained at a plurality of timings and averaged for use.

<Antenna Layout>

The first exemplary embodiment is characterized in that the Bluetooth® circuit 21 is arranged on the front side of the image forming apparatus 20, and that a detection area of limited angles and distances with respect to the Bluetooth® circuit 21 is used.

FIG. 8A is a diagram illustrating the image forming apparatus 20 according to the first exemplary embodiment seen diagonally from the front right. The user who uses the image forming apparatus 20 is likely to approach the operation panel 26, in a cases of using the scanner 24 and picking up printed sheets output by the printer 25. In this reason, in the present exemplary embodiment, the Bluetooth® circuit 21 is located in the front area near the operation panel 26 to improve the accuracy of detection of the mobile communication terminal 10.

For the same reason, the NFC circuit 23 is arranged near the Bluetooth® circuit 21. Further, target mark 83 is arranged near the NFC circuit 23.

The target mark 83 is a mark for guiding the user to bring the mobile communication terminal 10 close to (into contact with) this position in starting communication between the NFC circuits 23 and 13. The target mark 83 is also used as a guide when the user holding the mobile communication terminal 10 approaches the detection area near the Bluetooth® circuit 21.

FIG. 8B is a diagram illustrating the image forming apparatus 20 according to the first exemplary embodiment seen from the right side. As illustrated in FIG. 8B, the NFC circuit 23 is connected to the operation panel 26 by a cable 81. The operation panel 26 is electrically connected to the controller 200 by a cable 82. The Bluetooth® circuit 21 is electrically connected to the controller 200 by the cable 80. These circuits are controlled by a program executed by the controller 200 and thereby implement various functions.

<Detection Area>

Figure 13A:
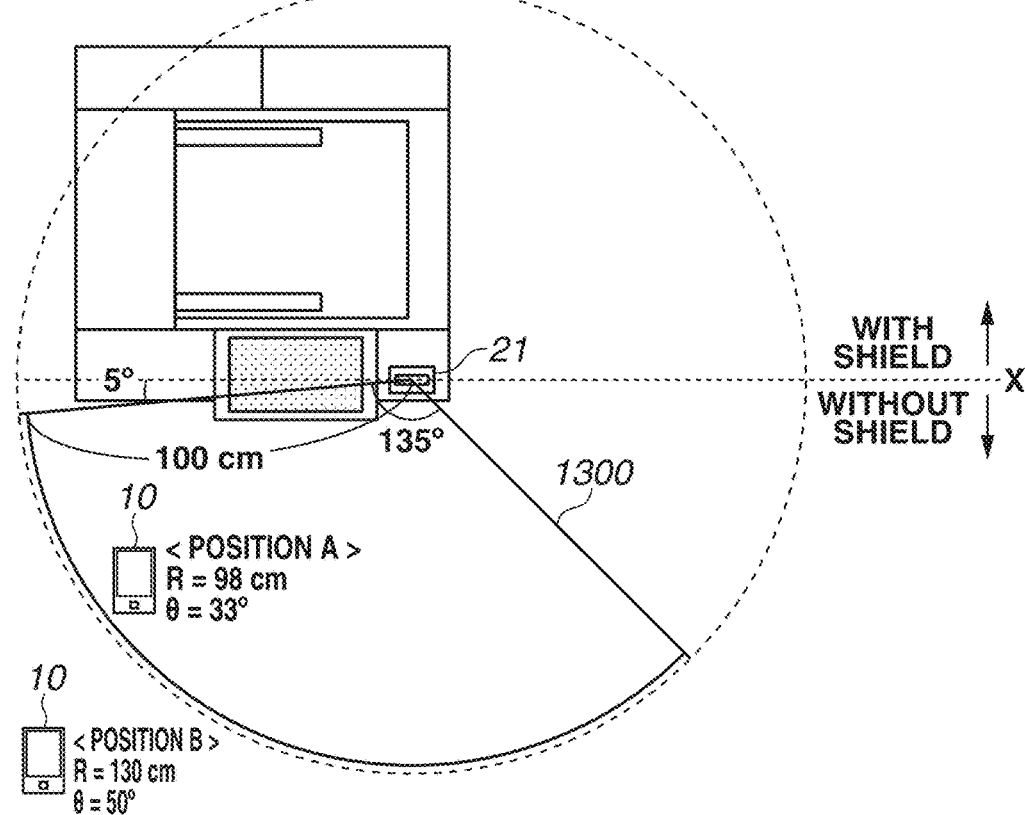
FIGS. 13A and 13B are diagram respectively illustrating a communication establishment area according to the first exemplary embodiment and communication establishment areas in a mirror-imaged state.

The detection area (communication establishment area) according to the present exemplary embodiment will be described. FIG. 13A is a diagram illustrating the communication establishment area according to the first exemplary embodiment. If the communication establishment area is defined in a conventional manner by using only the distance information based on the radio field intensity, the communication establishment area is a circular range around the Bluetooth® circuit 21. The circle illustrated by a broken line in FIG. 13A represents the circular range. The circle illustrated by the broken line is formed approximately 100 cm away from the Bluetooth® circuit 21. By contrast, a communication establishment area 1300 according to the present exemplary embodiment is the sectorial area surrounded by the solid line. The thresholds of this range are expressed as: The thresholds are registered, for example, in the image forming apparatus 20 in advance.

$$R \leq 100 \text{ cm, and } 5° \leq \theta \leq 135°.$$

In other words, in the present exemplary embodiment, the communication establishment area is narrowed down to specific directions by using not only the distance information based on the radio field intensity but also the angle information obtained based on the radio waves received by the plurality of Bluetooth® Low Energy antennas 45 to 48. In this way, the occurrence of unintended communication establishment can be prevented by limiting the communication establishment area.

<Use Sequence>

First, a use procedure of the image processing system 1 described in the first exemplary embodiment will be described. FIG. 9 is a sequence diagram illustrating an overall procedure of operations of a user 600, the mobile communication terminal 10, and the image forming apparatus 20 according to the first exemplary embodiment. The overall procedure will be described here, and details of the processing will be described below with reference to the processing flowcharts of FIGS. 10A, 10B, and FIG. 11. FIG. 9 illustrates a case where "approach to log in" is set.

Figure 23:
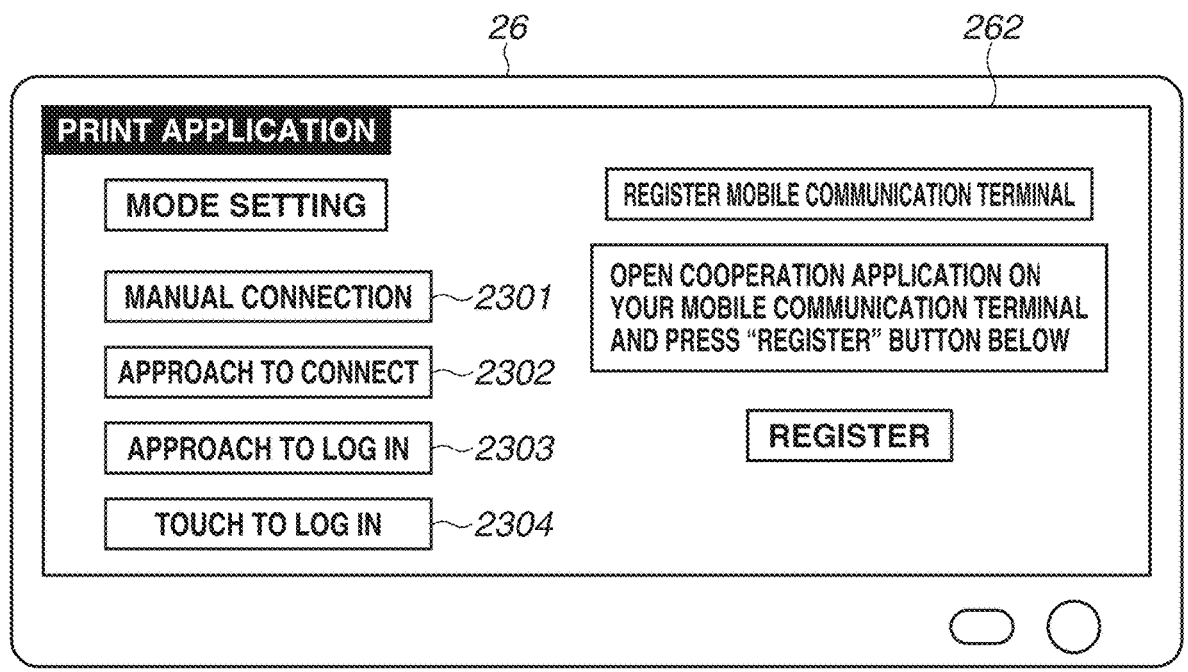
FIG. 23 is a diagram illustrating a screen example of the image forming apparatus.

In step S900, the user 600 sets a cooperation mode with the mobile communication terminal 10 in advance on the operation panel 26 of the image forming apparatus 20. FIG. 23 illustrates a setting screen where the setting is made. FIG. 23 illustrates an example of the display on the operation panel 26 included in the image forming apparatus 20. This setting screen is a screen for setting which operation the image forming apparatus 20 makes when receiving an advertising packet.

"Manual connection" 2301 refers to a function of displaying a screen where a device to establish Bluetooth® Low Energy connection with can be displayed on the operation panel 26. After the Bluetooth® Low Energy connection, wireless LAN communication (Wi-Fi Direct communication) can be established by exchanging connection information about the wireless LAN via the Bluetooth® communication.

"Touch to log in" button 2304 refers to start a function where the mobile communication terminal 10 is brought into touch with (close to) the target mark 83 on the image forming apparatus 20 to perform a Bluetooth® communication establishment procedure and exchange user authentication information via the Bluetooth® communication. The user can thereby log in to the image forming apparatus 20.

"Approach to connect" 2302 refers to a function where the mobile communication terminal 10 is brought close to the image forming apparatus 20 within a distance of 100 cm or so to perform a Bluetooth® communication establishment procedure and exchange the connection information about the wireless LAN via the Bluetooth® communication. The wireless LAN communication (Wi-Fi Direct communication) can thereby be established.

"Approach to log in" 2303 refers to a function where the mobile communication terminal 10 is brought close to the image forming apparatus 20 within a distance of 100 cm or so to perform a Bluetooth® communication establishment procedure and exchange user authentication information via the Bluetooth® communication. The user thereby logs in to the image forming apparatus 20.

If such a setting is made in advance, information about the LUT and thresholds corresponding to the cooperation mode is loaded into the image forming apparatus 20.

Suppose that the user 600 holding the mobile communication terminal 10 then stands at a distance from the image forming apparatus 20. In such a state, in step S901, the user 600 who wants the image forming apparatus 20 and the mobile communication terminal 10 to cooperate operates the mobile communication terminal 10 and gives an instruction to activate the cooperation application. In response to the instruction, the mobile communication terminal 10 activates the cooperation application. In step S902, the activated cooperation application continues to transmit an advertising packet at regular intervals until the Bluetooth® Low Energy communication is established (communication establishment).

Figure 21A:
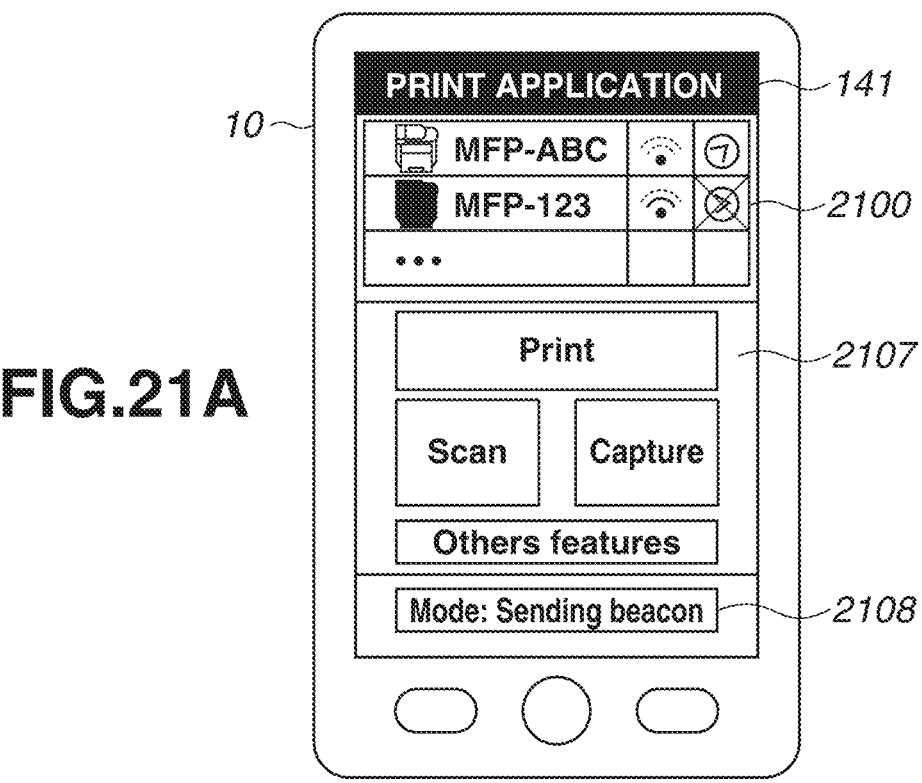
FIGS. 21A to 21F are diagrams illustrating screen examples of the mobile communication terminal.

In a state where the cooperation application activated, the cooperation application screen is displayed on the display 141 of the mobile communication terminal 10. FIGS. 21A to 21F are diagrams illustrating screen examples of the mobile communication terminal 10. FIG. 21A illustrates a top screen of the cooperation application. The top screen displays information indicating that beacons are being sent like a notification 2108, and the names and statuses of printers nearby like a list 2100. An area 2107 is grayed out to indicate that the print function, scan function, and capture function are not available.

In this state, the image forming apparatus 20 receives an advertising packet from the mobile communication terminal 10. In step S903, the image forming apparatus 20 recognizes the advertising packet as the advertising packet from an apparatus to cooperate with (apparatus on which the cooperation application is running). In step S904, the image forming apparatus 20 transmits a scan request to the mobile communication terminal 10. In step S905, the image forming apparatus 20 receives a scan response from the mobile communication terminal 10. As a result, in step S906, the image forming apparatus 20 obtains detailed device information about the mobile communication terminal 10. Then, in step S902, the image forming apparatus 20 receives an advertising packet. In step S907, the image forming apparatus 20 obtains the radio field intensity and the reception angle θ from the received advertising packet, and changes the radio field intensity and the reception angle θ into distance information and angle information.

If "approach to log in" is set in advance as the cooperation mode of the mobile communication terminal 10 and the image forming apparatus 20, the image forming apparatus 20 determines the position of the mobile communication terminal 10 based on the distance information and angle information calculated from the advertising packet.

For example, suppose that the user 600 is located sufficiently away from the image forming apparatus 20. In such a case, in step S909, the mobile communication terminal 10 is determined to be outside the communication establishment area. The communication establishment area refers to, for example, the area 1300 represented by the solid-lined sectorial frame in FIG. 13A. If, in step S910, the user 600 moves to the side of the image forming apparatus 20, then in step S909, the mobile communication terminal 10 is determined to be outside the communication establishment area. If, in step S911, the user 600 approaches the front side of the image forming apparatus 20, then in step S912, the mobile communication terminal 10 is determined to be in the detection area (in the communication establishment area). In step S913, the image forming apparatus 20 transmits a connect request packet to the mobile communication terminal 10. As a result, in step S914, the two apparatuses perform the Bluetooth® Low Energy communication establishment procedure therebetween. After the establishment of the Bluetooth® Low Energy communication, in step S915, the mobile communication terminal 10 transmits authentication information for "approach to log in" as optional data information. In step S916, the image forming apparatus 20 collates authentication data, and if ok, performs a login procedure. In step S917, the login user 600 is permitted to operate the image forming apparatus 20 based on the authentication authority. The overall procedure according to the present exemplary embodiment has been described above.

<Control Procedure of Mobile Communication Terminal>

Figure 11:
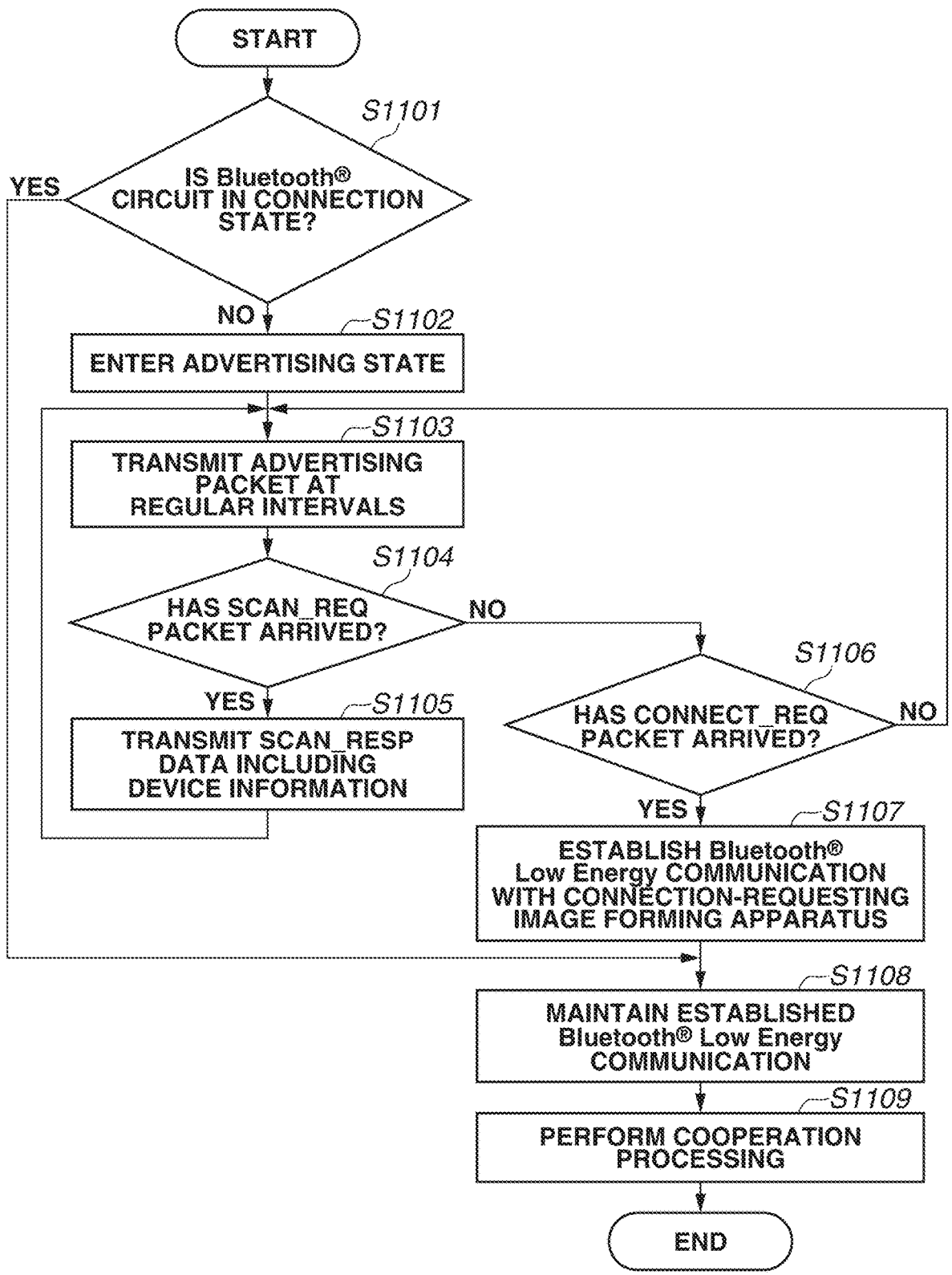
FIG. 11 is a flowchart illustrating processing performed by the mobile communication terminal according to the first exemplary embodiment.

To implement the above-described overall procedure, the mobile communication terminal 10 performs control illustrated in the flowchart of FIG. 11. FIG. 11 is a flowchart illustrating the processing of the mobile communication terminal 10. The control illustrated in the flowchart is performed by the controller 100. More specifically, the above-described control is implemented by the CPU 101 loading a program stored in the ROM 104 into the RAM 103 and executing the program.

In step S1101, the controller 100 initially determines whether the Bluetooth® circuit 11 of the mobile communication terminal 10 is in the connection state. If the mobile communication terminal 10 has already been in Bluetooth® Low Energy connection (YES in step S1101), the processing proceeds to step S1108 without transmitting an advertising packet. In step S1108, the controller 100 maintains the Bluetooth® Low Energy connection state. In the present exemplary embodiment, the mobile communication terminal 10 is connected as a slave. Thus, no advertising packet is to be transmitted here. On the other hand, if the mobile communication terminal 10 is not in Bluetooth® Low Energy connection (NO in step S1101), the processing proceeds to step S1102.

In step S1102, the Bluetooth® circuit 11 enters a state called advertising state. The advertising state refers to a standby state where the Bluetooth® circuit 11 waits for a connection request from the image forming apparatus 20. In step S1103, the Bluetooth® circuit 11 in the advertising state continually transmits an advertising packet from the Bluetooth® Low Energy antenna 115 at regular intervals.

In step S1104, the controller 100 determines whether a SCAN_REQ packet has arrived as a response to the advertising packet. If a SCAN_REQ packet has arrived (YES in step S1104), the processing proceeds to step S1105. If no SCAN_REQ packet has arrived (NO in step S1104), the processing proceeds to step S1106.

In step S1105, the controller 100 transmits SCAN_RESP data in response to the SCAN_REQ packet. The SCAN_RESP data includes device information such as a model name and sensor information. The SCAN_RESP data also includes information about the wavelength λ of the radio waves as information for implementing the Bluetooth® 5.1 angle detection function.

In step S1106, the controller 100 determines whether a CONNECT_REQ packet has arrived. If no CONNECT_REQ packet has been returned (NO in step S1106), the processing returns to step S1103 to continue transmitting an advertising packet. If a CONNECT_REQ packet has been returned (YES in step S1106), the processing proceeds to step S1107.

In step S1107, the controller 100 performs negotiation processing with the connection-requesting image forming apparatus 20. Then, the controller 100 transitions to the connection state and establishes the Bluetooth® Low Energy communication to complete the communication establishment.

In step S1108, the controller 100 maintains the established the Bluetooth® Low Energy communication. In step S1109, the controller 100 performs cooperation processing with the image forming apparatus 20 by using the Bluetooth® communication. Then, the series of processes ends.

<Control Procedure of Image Forming Apparatus>

Figure 10A:
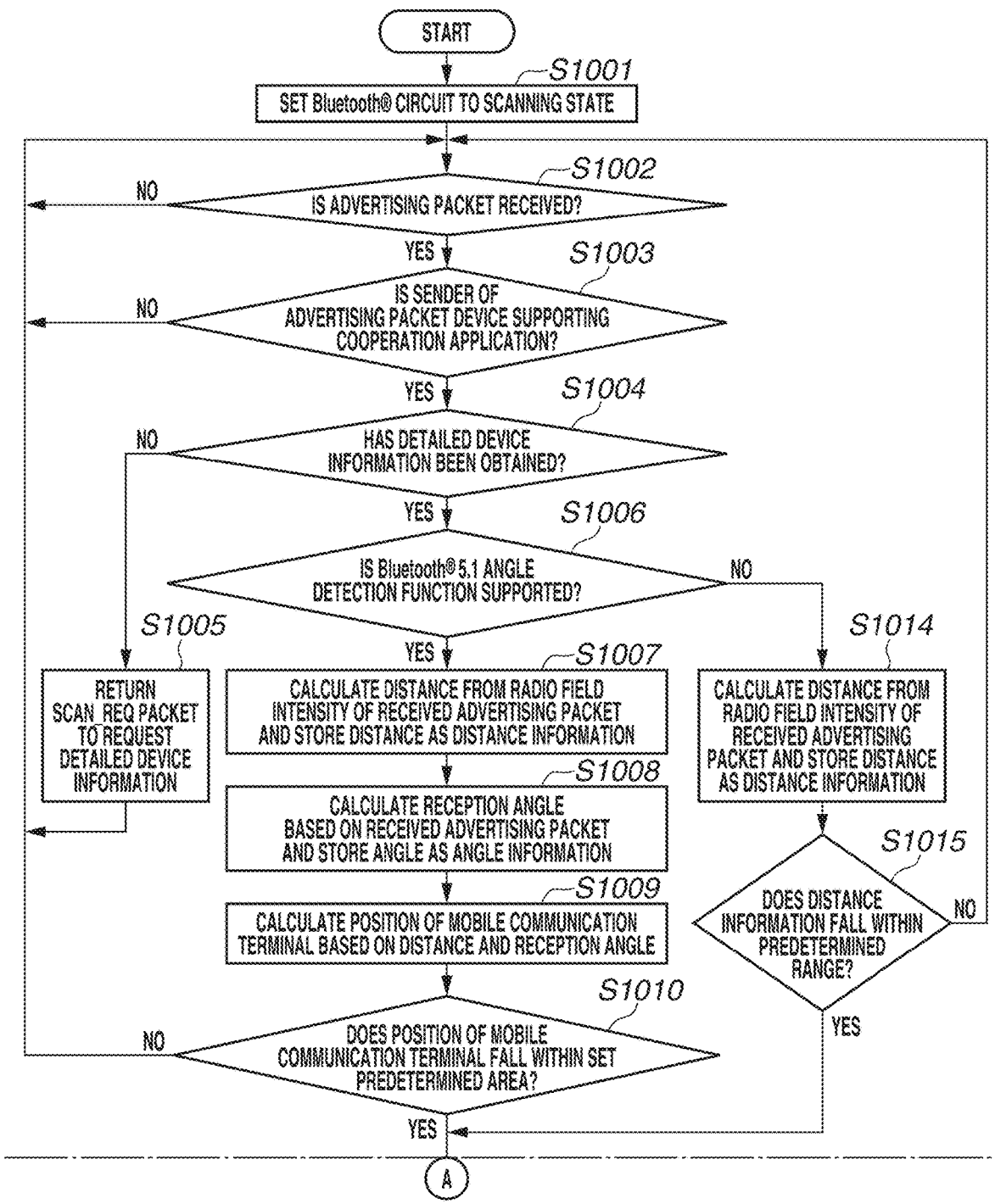
FIGS. 10A and 10B are a flowchart illustrating processing performed by the image forming apparatus according to the first exemplary embodiment.
Figure 10B:
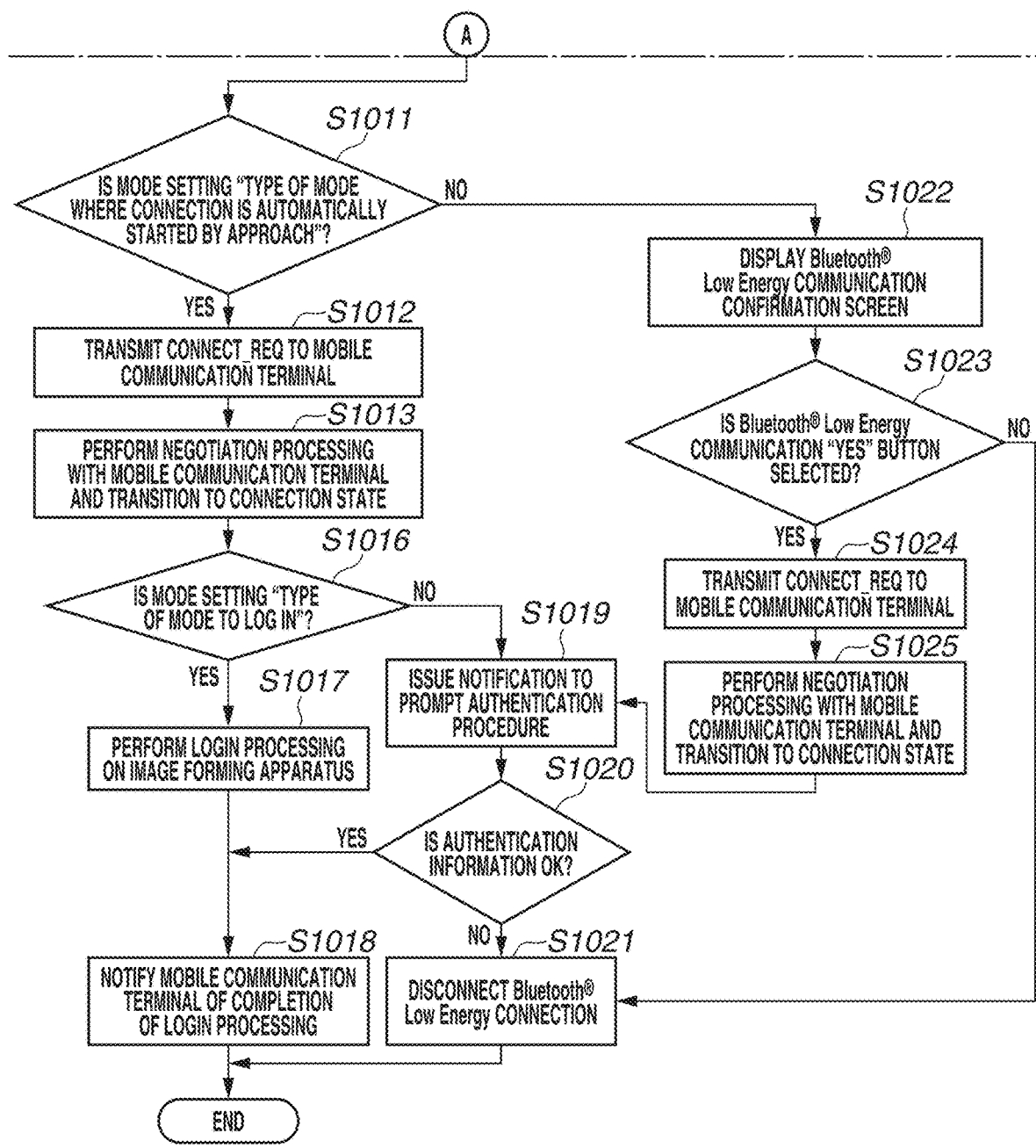

To implement the above-described overall procedure, the image forming apparatus 20 performs control illustrated in the flowchart of FIGS. 10A and 10B. FIGS. 10A and 10B are a flowchart illustrating the processing of the image forming apparatus 20 according to the first exemplary embodiment. The control illustrated in the flowchart is performed by the controller 200. More specifically, the above-described control is implemented by the CPU 202 loading a program stored in the ROM 206 into the RAM 205 and executing the program.

If the program is activated, then in step S1001, the controller 200 sets the Bluetooth® circuit 21 to the scanning state.

In step S1002, the controller 200 waits until the Bluetooth® circuit 21 in the scanning state receives an advertising packet transmitted from another Bluetooth® Low Energy-supporting device. As illustrated in FIG. 7, an advertising packet is being issued from the mobile communication terminal 10. If the advertising packet is received (YES in step S1002), the processing proceeds to step S1003.

In step S1003, the controller 200 determines the transmission source of the received advertising packet is a device supporting the cooperation application. Advertising packets are radio waves according to the standard usable in various devices, and can thus be delivered from a device not supporting the cooperation application. Thus, the processing for identifying the transmission source of the advertising packet is desirable.

The transmission source is identified by using data included in the advertising packet. Examples of the data included in the advertising packet include an address for identifying the advertiser, a UUID, and an ID embedded as optional data. In the present exemplary embodiment, the ID of the cooperation application is used as the optional data. Using the data, the image forming apparatus 20 can identify the mobile communication terminal 10 that is a device capable of cooperation.

In step S1004, the controller 200 determines whether detailed device information has been obtained from the transmission source of the advertising packet. If the device information has not been obtained (NO in step S1004), the processing proceeds to step S1005. If the device information has been obtained (YES in step S1004), the processing proceeds to step S1006.

In step S1005, the controller 200 returns a SCAN_REQ packet in response to the received advertising packet, thereby requesting more detailed device information about the mobile communication terminal 10. Thus, the controller 200 obtains SCAN_RESP data returned in response to the SCAN_REQ packet. The SCAN_RESP data includes the device information about the mobile communication terminal 10. The device information includes information about the function and status of the wavelength λ of the radio waves as well as the mobile communication terminal 10. Such information is optional data in a coded format, for example. The obtained device information is stored in the RAM 205 of the image forming apparatus 20, and used in calculating the reception angle of the Bluetooth® Low Energy communication from the mobile communication terminal 10. The device information may be stored in the storage 207 so that the device information can be called afterward.

The code to be embedded as optional data may be generated by any method as long as the mobile communication terminal 10 and the image forming apparatus 20 can consistently handle the code. If the target code is added as optional data due to an increase of new models, the target code may be made identifiable by program update. A network server-based collation mechanism may be incorporated.

In step S1006, the controller 200 obtains a determination result about whether the Bluetooth® 5.1 angle detection function is supported, from the obtained device information. The controller 200 may obtain the determination result from a result of collation of the device information. The Bluetooth® circuit 21 may determine the supported Bluetooth® version included in the advertising packet, and the controller 200 may obtain the determination result. If the angle detection function can be used (YES in step S1006), the processing proceeds to step S1007. If the angle detection function is unable to be used (NO in step S1006), the processing proceeds to step S1014.

In step S1007, the controller 200 calculates the distance R from the radio field intensity of the received advertising packet and stores the distance R as distance information. More specifically, the controller 200 obtains the value of the reception field intensity RSSI (dBm) in receiving the advertising packet as field intensity information, and obtains distance information (distance R) (cm) by inputting the value into a conversion table (LUT) for converting the value into an actual distance. The obtained distance information is stored in the RAM 205 of the image forming apparatus 20 and used in calculating the position information about the mobile communication terminal 10.

In step S1008, the controller 200 calculates the reception angle θ by the method described with reference to FIG. 6, based on the received advertising packet. The controller 200 stores the reception angle θ of the radio waves from the mobile communication terminal 10 as angle information. The obtained angle information is stored in the RAM 205 of the image forming apparatus 20 and used in calculating the position information about the mobile communication terminal 10.

In step S1009, the controller 200 calculates the position of the mobile communication terminal 10 executing the cooperation application with respect to the image forming apparatus 20 based on the distance R and the reception angle θ. In step S1010, the controller 200 determines whether the position indicated by the distance R and the reception angle θ falls within a set predetermined area. For example, suppose that the mobile communication terminal 10 is located at a position A illustrated in FIG. 13A. In such a case, the position expressed by the distance R and the reception angle θ is R=98 cm and θ=33°. Since this position falls within the thresholds (YES in step S1010), the processing proceeds to step S1011 to establish communication. In a case of position B illustrated in FIG. 13A, the position expressed by the distance R and the reception angle θ is R=130 cm and θ=50°. Since this position is outside the thresholds (NO in step S1010), the processing returns to step S1002 without establishing communication.

If, in step S1006, the Bluetooth® 5.1 angle detection function is determined not to be supported (NO in step S1006), the processing proceeds to step S1014. As describe above, if both the image forming apparatus 20 and the mobile communication terminal 10 support the Bluetooth® 5.1 angle detection function, the position information can be determined based on the angle information in addition to the distance information. On the other hand, if communication of a version not supporting the Bluetooth® 5.1 specifications is used, the position information combining the distance information and the angle information is unable to be obtained. In such a case, conventional detection using only the distance information is performed.

In step S1014, similar to step S1007, the controller 200 calculates the distance R from the radio field intensity of the received advertising packet and stores the distance R as distance information. Since angle information is unavailable in such a case, the following processing is performed by using the concentric distance information around the Bluetooth® circuit 21 of the image forming apparatus 20. In step S1015, the controller 200 determines whether the distance information falls within a predetermined range. If the distance information does not fall within the predetermined range (NO in step S1015), the processing returns to step S1002 and the controller 200 continues the scanning state. If the distance information falls within the predetermined range (YES in step S1015), the processing proceeds to step S1011.

The processing of step S1011 and the subsequent steps is to be performed after the mobile communication terminal 10 approaches the image forming apparatus 20 and the Bluetooth® Low Energy communication can be established. As employed herein, establishing the Bluetooth® Low Energy communication refers to establishing a Bluetooth® Low Energy connection. One of the plurality of cooperation modes including "manual connection" 2301, "approach to connect" 2302, "approach to log in" 2303, and "touch to log in" 2304 can be preset in the image forming apparatus 20. The image forming apparatus 20 performs processing based on the mode setting.

In step S1011, the controller 200 determines whether the mode setting is a "type of mode where connection is automatically started by approach". The "type of mode where connection is automatically started by approach" corresponds to the cooperation modes "approach to connect" 2302, "approach to log in" 2303, and "touch to log in" 2304. If the controller 200 determines that any one of the above-described cooperation modes is set (YES in step S1011), the processing proceeds to step S1012. If a cooperation mode different from any of the above-described, i.e., "manual connection" 2301 is determined to be set (NO in step S1011), the processing proceeds to step S1022.

In step S1012, the controller 200 transmits a connect request (CONNECT_REQ) to the target mobile communication terminal 10 by using the Bluetooth® circuit 21. Then, in step S1013, the controller 200 performs negotiation processing with the mobile communication terminal 10, and transitions to the connection state. This enables the Bluetooth® Low Energy communication and the communication establishment is completed.

After the completion of the communication establishment, in step S1016, the controller 200 determines whether the mode setting is a "type of mode to log in". The "type of mode to log in" corresponds to the cooperation modes "approach to log in" (2303) and "touch to log in" (2304). If the controller 200 determines that either one of the above-described cooperation modes is set (YES in step S1016), the processing proceeds to step S1017. If the controller 200 determines that a cooperation mode different from either of the above-described, i.e., "approach to connect" (2302) is set (NO in step S1016), the processing proceeds to step S1019.

In step S1017, the controller 200 performs login processing on the image forming apparatus 20. Then, the processing proceeds to step S1018.

Figure 21B:
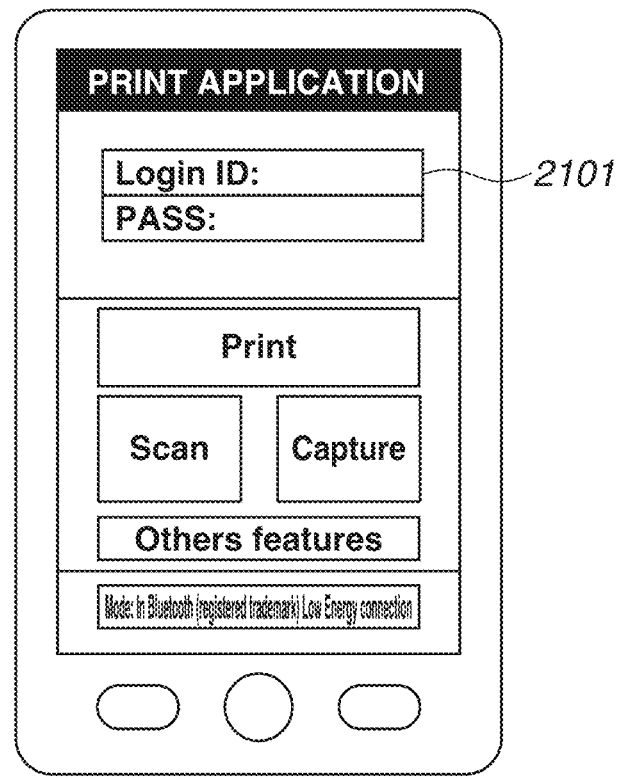
Figure 21C:
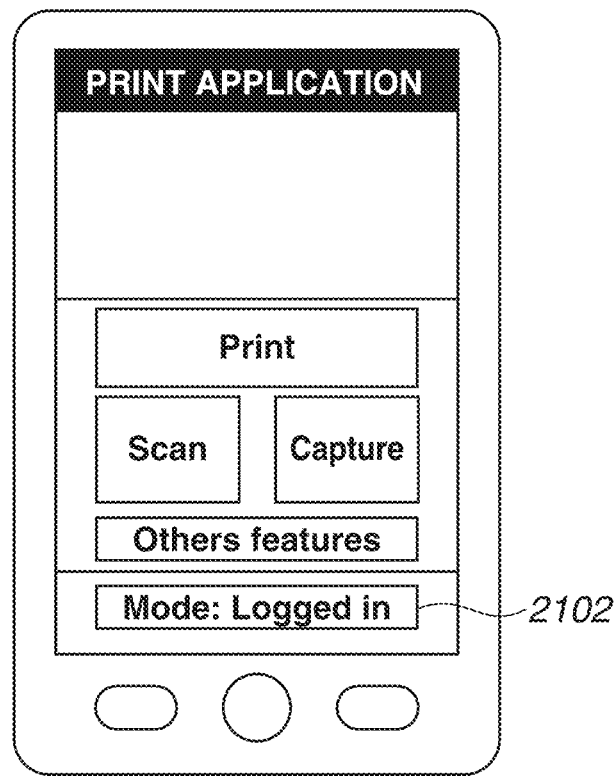
Figure 21D:
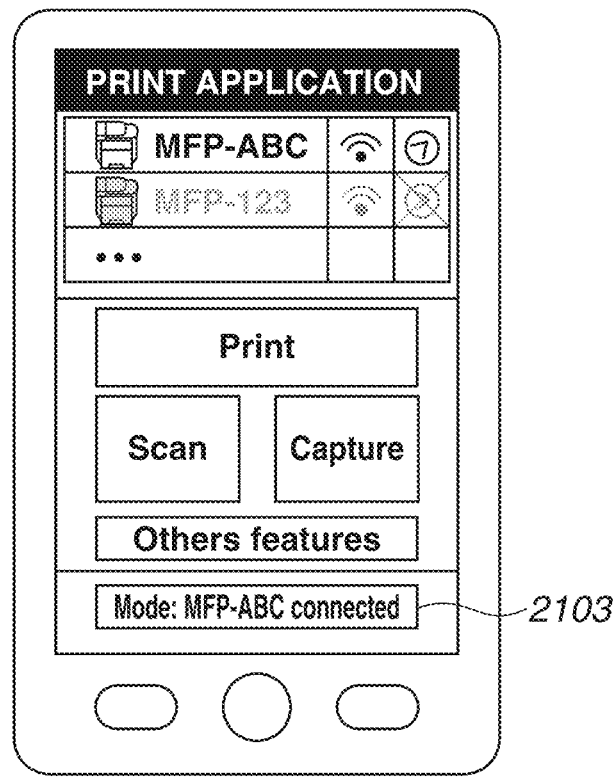

In step S1018, the controller 200 notifies the mobile communication terminal 10 of the completion of the login processing. Then, the series of processes ends. At this time, the mobile communication terminal 10 notified of the completion of the login processing displays a function setting screen such as a screen illustrated in FIG. 21C on the display 141. The function setting screen includes a notification 2102 indicating that the user is currently logged in, in addition to buttons for starting to use the print, scan, and capture functions, respectively. While the function setting screen illustrated in FIG. 21C provides only the notification that the user is currently logged in, a notification 2103 from which the name of the connected image forming apparatus 20 can be identified may be displayed as illustrated in FIG. 21D.

In step S1019, the controller 200 issues a notification to prompt an authentication procedure. Based on the notification, the mobile communication terminal 10 displays a screen for user notification such as the screen illustrated in FIG. 21B on the display 141. This screen includes an input form where authentication information (ID and password) can be input. The authentication information input from the screen of FIG. 21B is notified to the image forming apparatus 20.

In step S1020, the controller 200 collates the authentication information notified from the mobile communication terminal 10. If the authentication information is valid (OK) (YES in step S1020), the processing proceeds to step S1018. If the authentication information is invalid (NG) (NO in step S1020), the processing proceeds to step S1021.

In step S1021, the controller 200 instructs the Bluetooth® circuit 21 to disconnect the Bluetooth® Low Energy connection with the mobile communication terminal 10. Then, the series of processes ends.

In step S1011, if "manual connection" 2301 is set (NO in step S1011), the processing proceeds to step S1022.

In step S1022, the controller 200 displays the Bluetooth® Low Energy communication confirmation screen (not illustrated) on the display 262. This confirmation screen include a the Bluetooth® Low Energy communication "yes" button and the Bluetooth® Low Energy communication "no" button, either one of which can be selected by the user. In step S1023, if the user selects the "no" button (NO in step S1023), the processing proceeds to step S1021. If the user selects the "yes" button (YES in step S1023), the processing proceeds to step S1024.

In step S1024, the controller 200 transmits a connect request (CONNECT_REQ) to the target mobile communication terminal 10 by using the Bluetooth® circuit 21. In step S1025, the controller 200 performs negotiation processing with the mobile communication terminal 10 and transitions to the connection state. This enables the Bluetooth® Low Energy communication, and the communication establishment is completed. Then, the processing proceeds to step S1019.

As described above, if both the mobile communication terminal 10 and the image forming apparatus 20 support the Bluetooth® 5.1 angle detection function, the Bluetooth® Low Energy communication can be established by the entry to the specific area.

<Cooperation Processing>

The cooperation processing between the image forming apparatus 20 and the mobile communication terminal 10 in step S1109 will be described. As illustrated in FIG. 21A, the mobile communication terminal 10 can use various cooperation functions by using the cooperation application.

A common function among various functions is a power recovery function of the image forming apparatus 20. If there is no user operation or execution job for a predetermined time in a normal power state (standby state), the image forming apparatus 20 enters a power saving state (sleep state). The power saving state is a state where the power consumption is lower than in the normal power state. In the power saving state, a part or all of power supply to the operation panel 26 is stopped. For example, the back light of the display 262 is turned off. In the power saving state, the power supply to the Bluetooth® circuit 21 and the CPU 202 is not stopped. If the establishment of the Bluetooth® Low Energy communication is completed with the image forming apparatus 20 in the power saving state, the image forming apparatus 20 shifts (recovers) from the power saving state to the normal power state.

If the "approach to log in" or "touch to log in" function among the various functions is used, authentication information is exchanged via the Bluetooth® Low Energy communication. More specifically, the mobile communication terminal 10 transmits authentication information (user ID and password) about the previously registered user to the image forming apparatus 20 via the Bluetooth® Low Energy communication. The image forming apparatus 20 checks registration information corresponding to the received authentication information, manages user information linked with the registration information as login user information, and enables use of part or all of the functions of the image forming apparatus 20 based on the login user information. For example, if the user has successfully logged in, the login screen transitions to a menu screen. This enables operations on the menu screen. Alternatively, the authentication processing may be performed by the server 300.

If the "print", "scan", or "approach to connect" function among the various functions is used, wireless LAN connection information is exchanged via the Bluetooth® Low Energy communication, and then processing for switching wireless communication from the Bluetooth® Low Energy communication to the wireless LAN communication (handover processing) is performed. In establishing the Bluetooth® Low Energy communication, a notification to approach the image forming apparatus 20 is issued. This notification may be issued before or after the acceptance of execution instructions for various functions.

More specifically, the mobile communication terminal 10 initially transmits a handover request (wireless communication switching request) to the image forming apparatus 20 by the Bluetooth® Low Energy communication. Upon receiving the request, the image forming apparatus 20 transmits to the mobile communication terminal 10 connection information (Internet Protocol (IP) address, a service set identifier (SSID), and password) for connecting to the wireless LAN circuit 22. Upon receiving the connection information, the mobile communication terminal 10 switches settings based on the connection information, and the wireless LAN circuit 12 transmits a connection establishment request to the wireless LAN circuit 22. In response thereto, the wireless LAN circuit 22 performs a procedure, whereby wireless LAN communication is established.

After the establishment of the wireless LAN communication, for example, the print function (printing function) of transmitting print data to be printed by the image forming apparatus 20 from the mobile communication terminal 10 is performed. The print function may include a function where the mobile communication terminal 10 gives an instruction to start printing print data that is transmitted from the client terminal 400 to the image forming apparatus 20 and stored in the image forming apparatus 20. The print function may include a function where the mobile communication terminal 10 gives an instruction to start processing for downloading print data stored in the server 300 into the image forming apparatus 20 and printing the downloaded print data.

After the establishment of the wireless LAN communication, for example, a scan function (reading function) of transmitting an image read from a document by the image forming apparatus 20 to the mobile communication terminal 10 is performed. The scan function may include a function where the mobile communication terminal 10 gives an instruction to start processing for uploading an image read from a document by the image forming apparatus 20 to the server 300 or the client terminal 400.

After the establishment of the wireless LAN communication, for example, a checking function of the mobile communication terminal 10 of obtaining status information (remaining toner amount information, error information, print count information, and power information), setting information (print settings and scan settings), and screen information about the image forming apparatus 20, and of checking the obtained information is performed. The checking function may be implemented by accessing a web server provided by the image forming apparatus 20 to obtain web page information and displaying the web page information by using a browser function of the cooperation application. Alternatively, the checking function may be implemented by notifying such information to a browser application of the mobile communication terminal 10. In such a case, the mobile communication terminal 10 perform processing for obtaining Uniform Resource Locator (URL) information about the web server provided by the image forming apparatus 20 in any of the steps during the Bluetooth® Low Energy communication or wireless LAN communication.

<Notes>

As described above, in the present exemplary embodiment, the timing when the mobile communication terminal 10 and the image forming apparatus 20 start establishing the Bluetooth® Low Energy communication is determined based on the reception angle and the radio field intensity of an advertising packet received by the image forming apparatus 20. The use of the reception angle and the radio field intensity enables the procedure for communication establishment (Bluetooth® Low Energy communication establishment) with a mobile communication terminal 10 entering a specific area such as the communication establishment area 1300 to automatically proceed.

In particular, in the present exemplary embodiment, the area to start communication establishment is narrowed by using the reception angle of the advertising packet. This enables a distinction between the areas where communication is to be established and where not, even at the same distance from the antennas. This can prevent accidental communication establishment with the mobile communication terminal of a user who approaches the image forming apparatus 20 from the side of the image forming apparatus 20 or from back side of the image forming apparatus 20.

While FIG. 9 is described by using "approach to log in" as an example, "approach to log in" may be rephrased with "approach to connect" or "touch to log in".

Since accidental communication establishment with the image forming apparatus 20 can be prevented, a situation where the image forming apparatus 20 unintendedly recovers from the power saving state to waste power can be avoided.

Since accidental communication establishment with the image forming apparatus 20 can be prevented, a situation where the number of simultaneous Bluetooth® Low Energy communications or the number of simultaneous wireless direct communications unintendedly reaches its limit can be avoided.

Since accidental login to the image forming apparatus 20 can be prevented, a situation where another user unintendedly logs in to the image forming apparatus 20 and causes an operation error while one user is operating the image forming apparatus 20, can be avoided.

A second exemplary embodiment is characterized in that a Bluetooth® circuit 21 is arranged on the rear side (side opposite to the front) of an image forming apparatus 20, and that a detection area (communication establishment area) of limited angles and distances near a specific position on the front side of the image forming apparatus 20 is used. In other words, the second exemplary embodiment describes a method where the Bluetooth® circuit 21 does not need to be arranged near a position where the detection area is determined.

The configuration and processing according to the second exemplary embodiment are in part common with those described in the first exemplary embodiment. A similar configuration and processing are thus denoted by the same reference numerals. A detailed description thereof will be omitted.

<Antenna Layout>

The Bluetooth® circuit 21 is desirably arranged at an optimum position to satisfy the use conditions of the functions to be implemented, by taking into account radio wave characteristics. Considering various conditions, the optimum position is not necessarily near the operation panel 26 on the front side of the image forming apparatus 20 as in the first exemplary embodiment.

In the present exemplary embodiment, the Bluetooth® circuit 21 is arranged at the position illustrated in FIGS. 14A, 14B, and 14C, where radio wave characteristics are favorable. FIG. 14A is a diagram illustrating an image forming apparatus 20 according to the second exemplary embodiment and a third exemplary embodiment seen diagonally from the front right. FIG. 14B is a diagram illustrating the image forming apparatus 20 according to the second and third exemplary embodiments from the right side. FIG. 14C is a diagram illustrating the image forming apparatus 20 according to the second and third exemplary embodiments seen from above. As illustrated in FIG. 14C, the Bluetooth® circuit 21 is arranged at a position on the rear side of the image forming apparatus 20. Such a position will be referred to as a physical position 1400. In the present exemplary embodiment, the specific area to establish the Bluetooth® Low Energy communication is controlled so that its center is located on the front side of the image forming apparatus 20. Such a position will be referred to as a virtual position 1401. The physical position 1400 and the virtual position 1401 are located with a diagonal distance 1402 from each other. The NFC circuit 23 is arranged at the same position as in FIGS. 8A and 8B. The target mark 83 is also arranged at the same position.

<Detection Area>

Like the first exemplary embodiment, the present exemplary embodiment uses the distance R detected from the radio field intensity and the reception angle θ detected by angle detection. The distance R and the reception angle θ are calculated with the physical position 1400 of the Bluetooth® circuit 21 of the image forming apparatus 20 at the center. In the present exemplary embodiment, whether to establish communication is determined by using a LUT and threshold information corresponding to the communication establishment area near the virtual position 1401 in addition to the distance R and the reception angle θ.

In the present exemplary embodiment, if "touch to log in" is selected, an area 1503 illustrated in FIG. 15A serves as the communication establishment area. In FIG. 15A, the broken-lined circles schematically indicate distances with the Bluetooth® circuit 21 as a center, calculated from radio field intensities. The communication establishment area 1503 satisfies an area where the calculated distance R and reception angle θ are 110 cm≤R≤120 cm and 125°≤θ≤135°. Such an area is defined with reference to the virtual position 1401. More specifically, the communication establishment area 1503 is defined as an area of "+0 cm to +10 cm" and "−8° to +2°" with reference to the virtual position 1401. The communication establishment area 1503 falls on the area illustrated in FIG. 15A because the distance from the physical position 1400 to the virtual position 1401 is 110 cm and the angle of the virtual position 1401 with respect to the physical position 1400 is 133°. FIG. 15A is a diagram illustrating the communication establishment area 1503 according to the second exemplary embodiment. If the mobile communication terminal 10 enters this area, the Bluetooth® Low Energy communication is established. Since the communication establishment area 1503 overlaps the position of the target mark 83, the Bluetooth® Low Energy communication is established if the user brings the mobile communication terminal 10 close to the position of the target mark 83 to touch. Thus the touch position can be shared with the target mark 83 of the NFC circuit 13 by thus limiting the specific area to near the target mark 83, using the distance information R and the angle information (reception angle) θ. This enables the user to use the mobile communication terminal 10 and the image forming apparatus 20 with the same usability regardless of which wireless communication standard of Bluetooth® Low Energy or NFC is used.

In the present exemplary embodiment, if "approach to log in" is selected, an area 1504 illustrated in FIG. 15B serves as the communication establishment area. In FIG. 15B, the broken-lined circles schematically indicate distances with the Bluetooth® circuit 21 as a center, calculated from radio field intensities. The communication establishment area 1504 includes an area where the calculated distance R and reception angle θ are 90 cm≤R≤130 cm and 85°≤θ≤135°, and an area where the calculated distance R and reception angle θ are 130 cm<R≤140 cm and 90°≤θ≤130°. Such an area is defined with reference to the virtual position 1401.

More specifically, the communication establishment area 1504 is defined to include an area of "−20 cm to +20 cm" and "−48° to +2°" and an area of "+20 cm to +30 cm" and "−43° to −3°" with reference to the virtual position 1401. The information about the areas with reference to the virtual position 1401 is stored in the image forming apparatus 20 in advance. The communication establishment area 1504 falls on the area illustrated in FIG. 15B since the distance from the physical position 1400 to the virtual position 1401 is 110 cm and the angle of the virtual position 1401 with respect to the physical position 1400 is 133°. FIG. 15B is a diagram illustrating the communication establishment area 1504 according to a modified example of the second exemplary embodiment.

If the mobile communication terminal 10 enters this area, the Bluetooth® Low Energy communication is established. Since the communication establishment area 1504 overlaps the position of the target mark 83, the Bluetooth® Low Energy communication is established if the user holding the mobile communication terminal 10 approaches the target mark 83.

In this way, the target mark 83 of the NFC circuit 13 can be used as a guide indicating the Bluetooth® Low Energy communication establishment position by limiting the specific area to near the target mark 83, using the distance information R and the angle information θ.

Figure 21E:
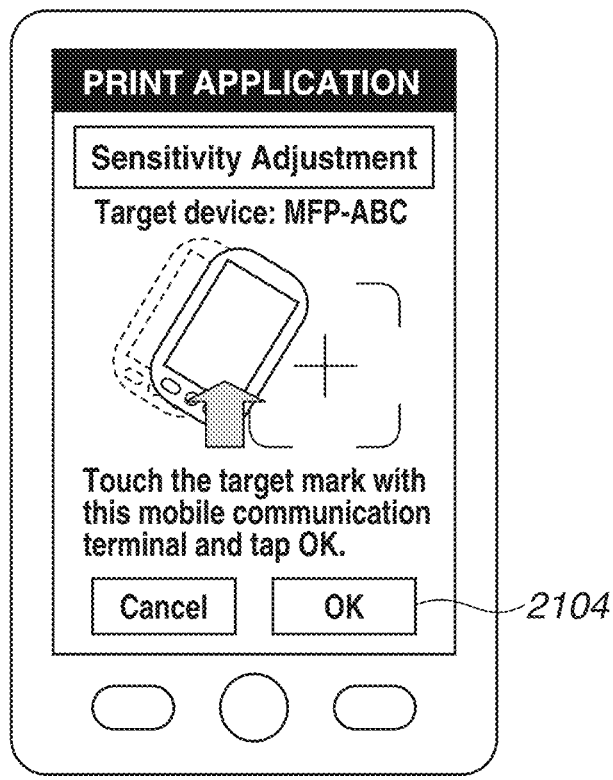
Figure 21F:
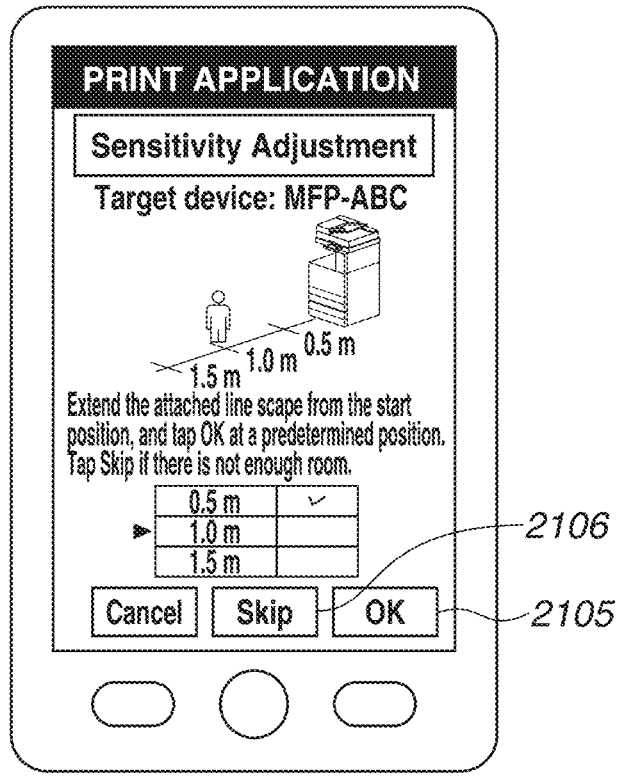

As described with reference to FIG. 12, the mobile communication terminal 10 used in the user environment can have individual differences in the radio wave characteristics. Thus, if the communication establishment area is defined with reference to the information about the predetermined virtual position (a radio field intensity corresponding to a distance of 110 cm, and an angle of 133°), the mobile communication terminal 10 brought close to the target mark 83 can fail to be normally detected. In view of such situations, the cooperation application may be configured so that the communication establishment area can be corrected by calibration processing. FIG. 21E illustrates an example of a screen for correcting the "touch to log in" distance. In this calibration, the user is prompted to bring the mobile communication terminal 10 close to the target mark 83 near the virtual position 1401 and to press an OK button 2104, whereby the radio field intensity and the reception angle at that position are measured. If there is a difference from the information about the predetermined virtual position 1401 (the radio field intensity corresponding to the distance of 110 cm, and the angle of 133°), the difference information (calibration information) is stored in the image forming apparatus 20. This difference information is used to correct an error during position measurement. The information itself about the virtual position 1401 obtained by the calibration may be stored and used for position measurement. In the present exemplary embodiment, the information obtained by the calibration includes the angle information in addition to the information about the radio field intensity.

In the case of "approach to log in", calibration may be performed not only at the reference position but at predetermined positions as well. For such calibration, an accessory line scale is attached to the main body of the image forming apparatus 20, and the user is prompted to press an OK button 2105 at predetermined distances to measure the radio field intensities at the respective positions. Depending on the installation space of the image forming apparatus 20, there may not be enough room for measurement. In such a case, the radio field intensity only needs to be measured in accessible areas by the user. For this reason, a skip button 2106 is provided to skip unavailable measurements. If there is a difference from the LUT used for conversion between the distance and reception field intensity, the difference information is stored in the image forming apparatus 20. The difference information is used to correct an error during position measurement. The information itself about the virtual position 1401 obtained by the calibration may be stored and used for position measurement.

<Differences in Use Sequence and Control Procedure>

Figure 16:
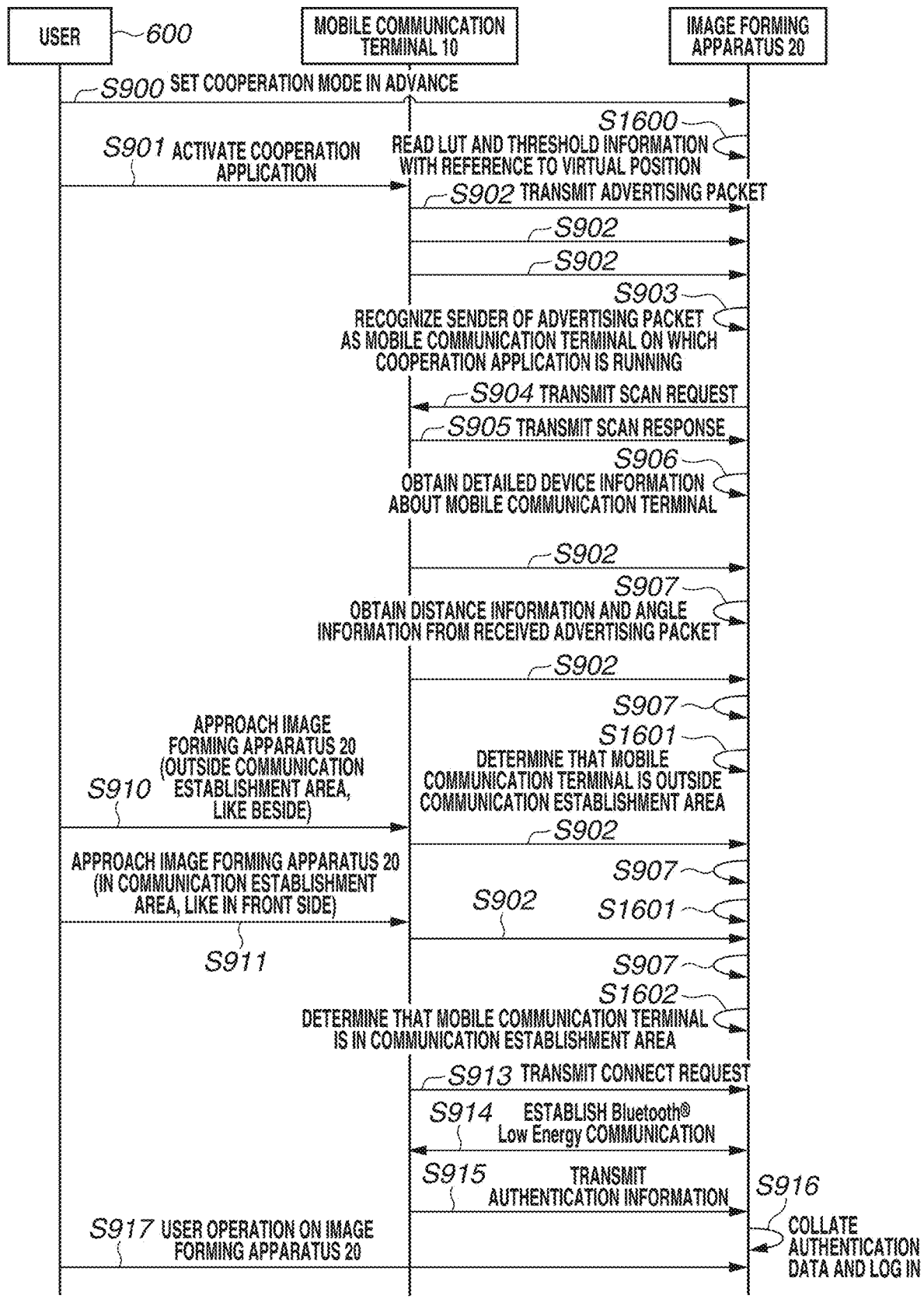
FIG. 16 is a sequence diagram illustrating an overall procedure of operations of the user, the mobile communication terminal, and the image forming apparatus according to the second exemplary embodiment.

The use sequence according to the second exemplary embodiment and the control procedure of the image forming apparatus 20 and the mobile communication terminal 10 are similar to those of the first exemplary embodiment except in characteristic portions. Thus, only differences will be described here in detail. A detailed description of other redundant portions will be omitted. FIG. 16 is a sequence diagram illustrating an overall procedure of operations of the user 600, the mobile communication terminal 10, and the image forming apparatus 20 according to the second exemplary embodiment.

In step S900, the user 600 sets a cooperation mode for the case where the mobile communication terminal 10 enters the specific area in advance on the operation panel 26 of the image forming apparatus 20. In step S1600, the image forming apparatus 20 reads an LUT and threshold information with reference to the virtual position from the ROM 206 based on the set cooperation mode. For example, if the set cooperation mode is "touched to log in", the LUT with reference to the virtual position illustrated in FIG. 15A is read out. If the set cooperation mode is "approach to log in", the LUT with reference to the virtual position illustrated in FIG. 15B is read out.

Suppose that the user 600 holding the mobile communication terminal 10 then stands at a distance from the image forming apparatus 20. In such a state, in step S901, the user 600, who wants the image forming apparatus 20 and the mobile communication terminal 10 to cooperate, operates the mobile communication terminal 10 and gives an instruction to activate the cooperation application. In response to the instruction, the mobile communication terminal 10 activates the cooperation application. In step S902, the activated cooperation application continues to transmit an advertising packet at regular intervals until the Bluetooth® Low Energy communication is established (communication establishment). In such a state, the image forming apparatus 20 receives an advertising packet from the mobile communication terminal 10. In step S903, the image forming apparatus 20 recognizes the advertising packet as a packet from a cooperation target apparatus (apparatus on which the cooperation application is running). In step S904, the image forming apparatus 20 transmits a scan request to the mobile communication terminal 10. In step S905, the image forming apparatus 20 receives a scan response from the mobile communication terminal 10. As a result, in step S906, the image forming apparatus 20 obtains detailed device information about the mobile communication terminal 10. Then, in step S902, the image forming apparatus 20 receives an advertising packet. In step S907, the image forming apparatus 20 obtains the radio field intensity and the reception angle θ from the received advertising packet, and handles the radio field intensity and the reception angle θ as distance information and angle information.

In steps S1601 and S1602, the image forming apparatus 20 determines whether the mobile communication terminal 10 is in the communication establishment area by using the distance information, the angle information, and the LUT with reference to the virtual position.

Figure 17A:
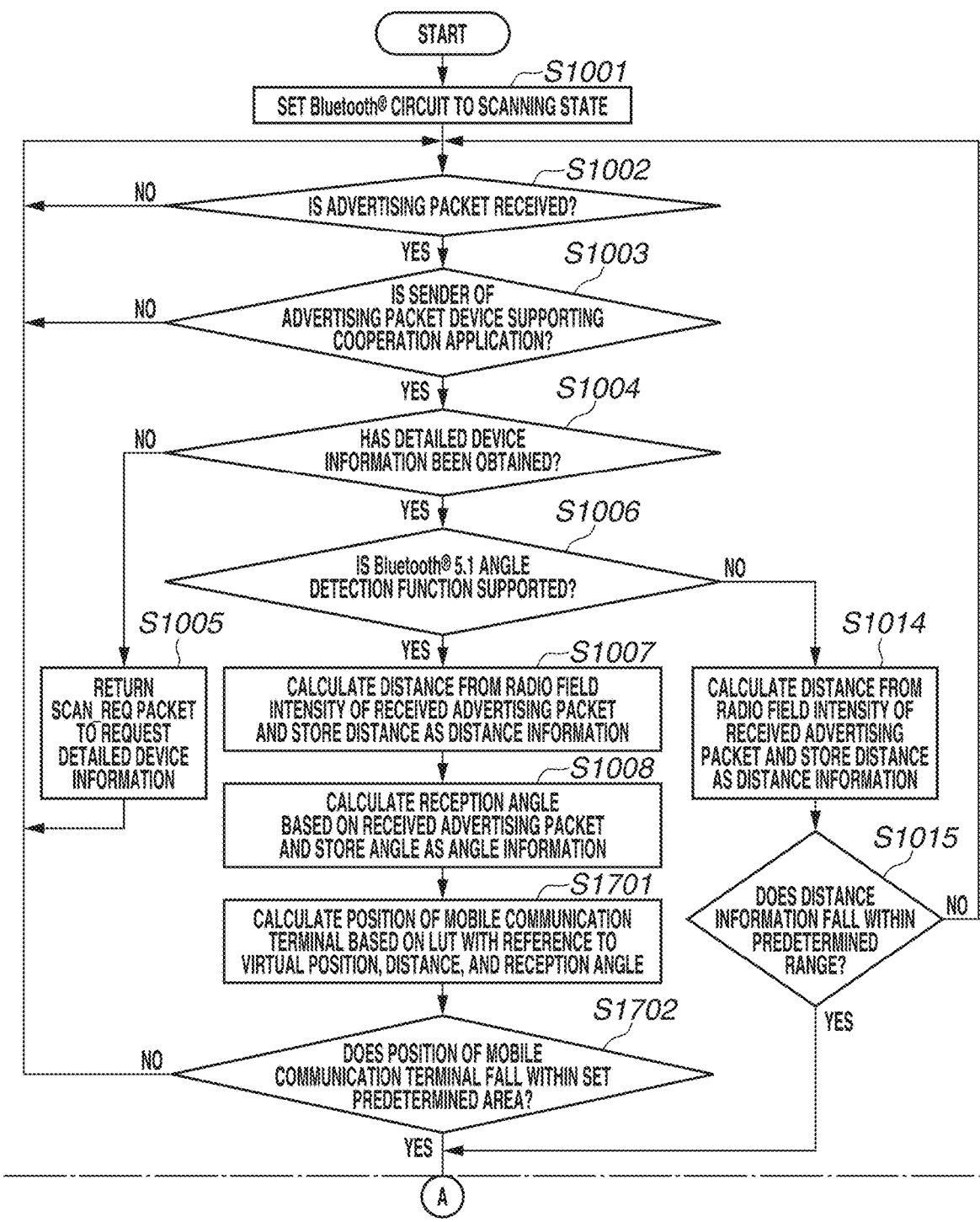
FIGS. 17A and 17B are a flowchart illustrating the processing performed by the image forming apparatus according to the second exemplary embodiment.
Figure 17B:
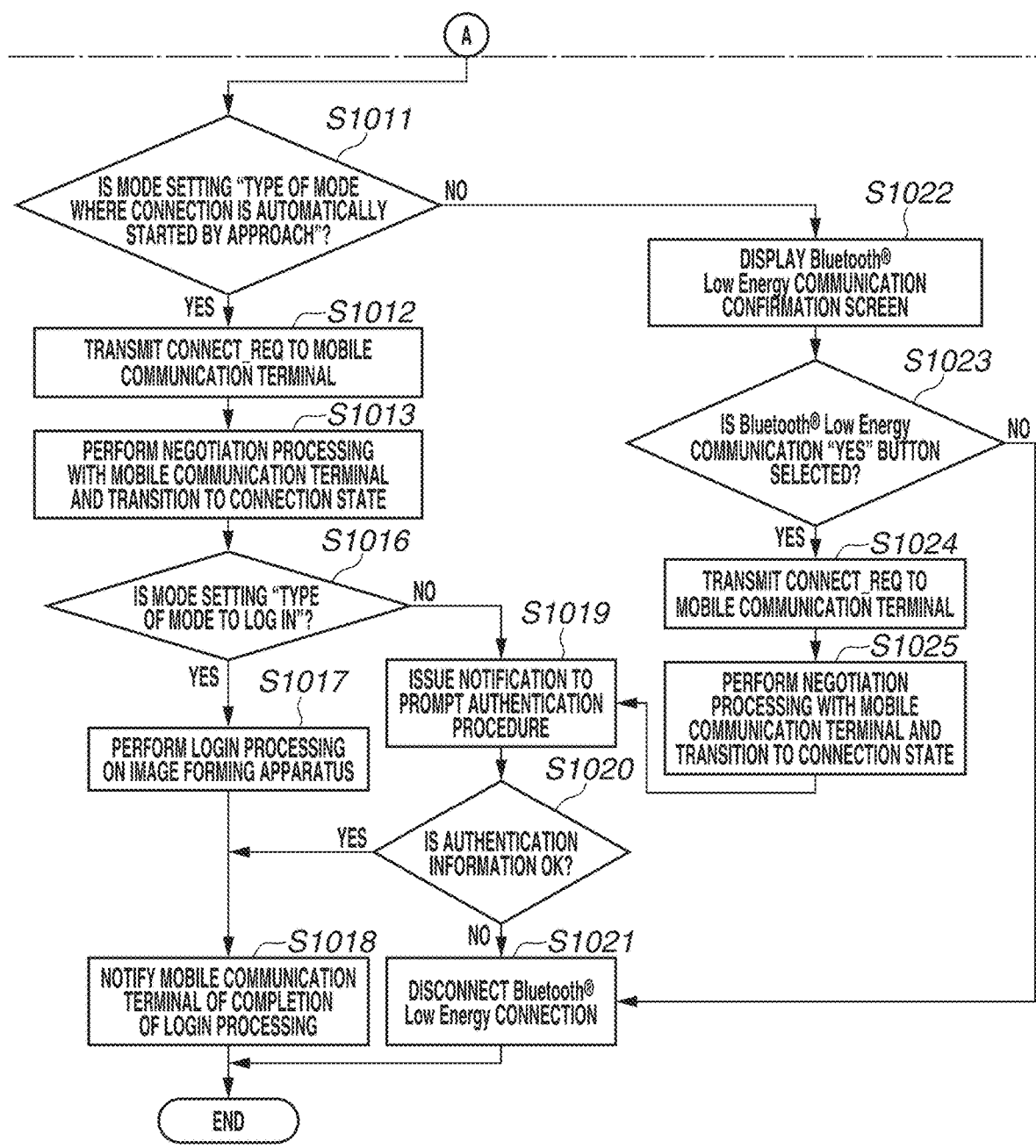

The processing of steps S1601 and S1602 corresponds to that of steps S1701 and S1702 in FIGS. 17A and 17B. FIGS. 17A and 17B are a flowchart illustrating the processing of the image forming apparatus 20 according to the second exemplary embodiment. The controller 200 of the image forming apparatus 20 obtains the ID of the mobile communication terminal 10 when obtaining detailed device information from the mobile communication terminal 10. If the image forming apparatus 20 and the mobile communication terminal 10 are already calibrated, the calibration information about the mobile communication terminal 10 is stored in the storage 207 in association with the ID.

The controller 200 then generates an LUT with reference to the virtual position based on range information stored in advance (e.g., "+0 cm to +10 cm" and "−8° to +2°"), information about the physical position, and information about the virtual position. If there is calibration information stored in association with the ID of the mobile communication terminal 10, the controller 200 makes a correction with reference to the virtual position. The controller 200 stores the generated LUT in the RAM 205 of the image forming apparatus 20. In steps S1701 and S1702, the controller 200 uses the LUT in determining whether to establish the Bluetooth® Low Energy communication between the image forming apparatus 20 and the mobile communication terminal 10. Alternatively, the controller 200 may store the LUT with reference to the virtual position in the storage 207 so that the LUT can also be used at a subsequent activation timing.

<Notes>

As described above, in the present exemplary embodiment, the mobile communication terminal 10 and the image forming apparatus 20 determine the timing to start establishing the Bluetooth® Low Energy communication based on the reception angle θ and the radio field intensity of the advertising packet received by the image forming apparatus 20, and the LUT with reference to the virtual position. In the present exemplary embodiment, the use of the communication establishment area with reference to the virtual position makes it possible to use a special communication establishment area, for example, communication is not established if the mobile communication terminal 10 is too close to the Bluetooth® circuit 21.

While FIG. 16 is described by using "approach to log in" as an example, "approach to log in" may be rephrased with "approach to connect" or "touch to log in".

A third exemplary embodiment is characterized in that a Bluetooth® circuit 21 is located on the rear side of an image forming apparatus 20, and that a detection area (communication establishment area) of limited angles and distances with a specific position on the front side of the image forming apparatus 20 as the center is used. In other words, the third exemplary embodiment describes a method where the Bluetooth® circuit 21 does not need to be located at a reference position of the detection area.

The configuration and processing of the third exemplary embodiment are in part common with those described in the second exemplary embodiment. A similar configuration and processing are thus denoted by the same reference numerals. Detailed descriptions thereof will be omitted.

<Detection Area>

In the third exemplary embodiment, like the second exemplary embodiment, the Bluetooth® circuit 21 is arranged at a position illustrated in FIGS. 14A, 14B, and 14C. In addition, like the second exemplary embodiment, the communication establishment area is formed at a position away from the Bluetooth® circuit 21. The third exemplary embodiment has different characteristics from the second exemplary embodiment in the shape of the detection area.

Figure 20A:
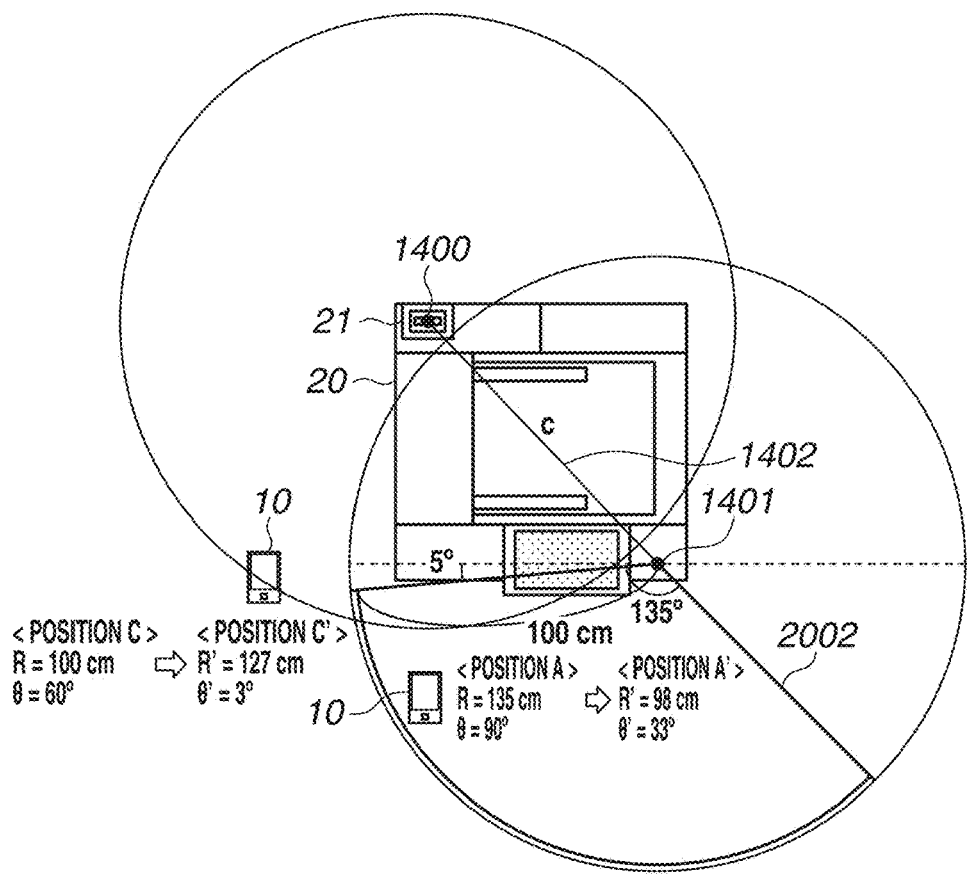
FIGS. 20A, 20B, and 20C are diagrams respectively illustrating a communication establishment area, a method for calculating the communication establishment area, and the method for calculating the communication establishment area, according to the third exemplary embodiment.
Figure 20B:
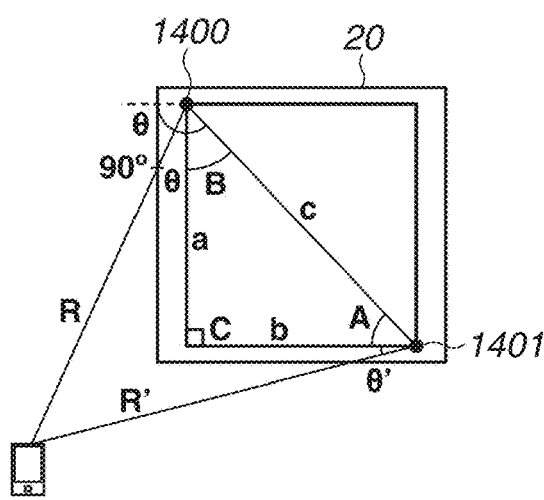
Figure 20C:
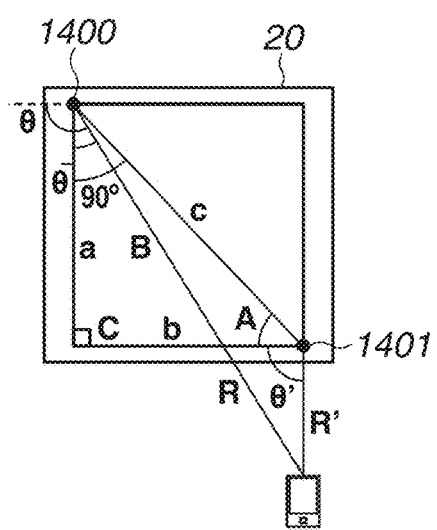

FIG. 20A is a diagram illustrating the communication establishment area according to the third exemplary embodiment. Like FIGS. 14A to 14C, the position of the Bluetooth® circuit 21 in this case will be referred to as a physical position 1400, and a position away from the physical position 1400 as a virtual position 1401. In the present exemplary embodiment, a sectorial area surrounded by the solid line with the virtual position 1401 as the center serves as a communication establishment area 2002. The communication establishment area 2002 is an area having a shape similar to that of the communication establishment area 1300 described with reference to FIG. 13A.

<Calculation of Corrected Distance and Corrected Angle>

In the present exemplary embodiment, calculation is performed to convert the distance R and the reception angle θ with the physical position 1400 of the Bluetooth® circuit 21 of the image forming apparatus 20 as a center into a corrected distance R' and a corrected angle (corrected reception angle) θ' with the virtual position 1401 as a center. Such a conversion (correction conversion) is performed by a program running on the image forming apparatus 20.

Depending on the detected reception angle θ, the correction conversion formulas are different depending on the reception angle θ:

(if $0° \leq \theta < 90°$)

$$R' = \sqrt{R^2 + c^2 - 2*R*c*\cos(90° - \theta + B)}$$

$$\theta' = \arcsin\left(\frac{R*\sin\theta - a}{\sqrt{R^2 + c^2 - 2*R*c*\cos(90° - \theta + B)}}\right), \text{ and}$$

(if $90° \leq \theta \leq 180°$)

$$R' = \sqrt{R^2 + c^2 - 2*R*c*\cos(B - \theta + 90°)}$$

$$\theta' = \arcsin\left(\frac{R*\cos(\theta - 90°) - a}{\sqrt{R^2 + c^2 - 2*R*c*\cos(B - \theta + 90°)}}\right).$$

The corrected distance R' and the corrected reception angle θ' can be expressed as described above. All the variables used in the calculation, i.e., the distance R, the reception angle θ, a side "a", a side "c", and an angle B, are values obtained by a processing procedure to be described below.

While the triangular functions are used here as a method for converting the distance R and the reception angle θ into the corrected distance R' and the corrected angle θ', the triangular functions are just an example. Other methods may be used to perform the above-described conversion.

<Differences in Use Sequence and Control Procedure>

Figure 18:
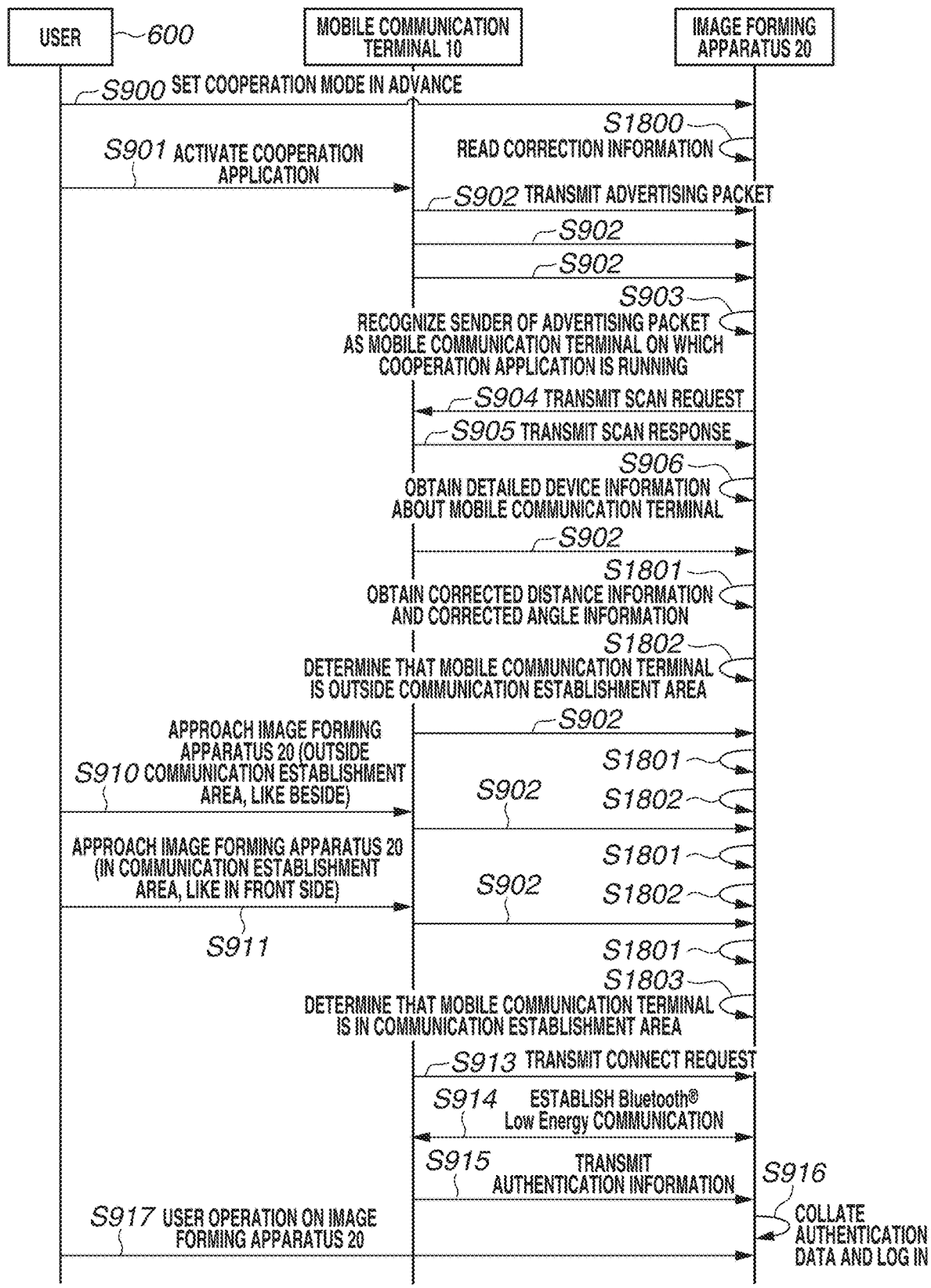
FIG. 18 is a sequence diagram illustrating an overall procedure of operations of the user, the mobile communication terminal, and the image forming apparatus according to the third exemplary embodiment.

The use sequence and the control procedure of the image forming apparatus 20 and the mobile communication terminal 10 according to the third exemplary embodiment are similar to those of the second exemplary embodiment except in characteristic portions. Thus, only differences will be described here in detail. Detailed descriptions of other redundant portions will be omitted. FIG. 18 is a sequence diagram illustrating an overall procedure of operations of the user 600, the mobile communication terminal 10, and the image forming apparatus 20 according to the third exemplary embodiment.

In step S900, the user 600 sets in advance a cooperation mode for the case where the mobile communication terminal 10 enters a specific area, on the operation panel 26 of the image forming apparatus 20. In step S1800, the image forming apparatus 20 reads threshold information corresponding to the set cooperation mode and correction information such as the physical position 1400 and the virtual position 1401 from the ROM 206.

Figure 19A:
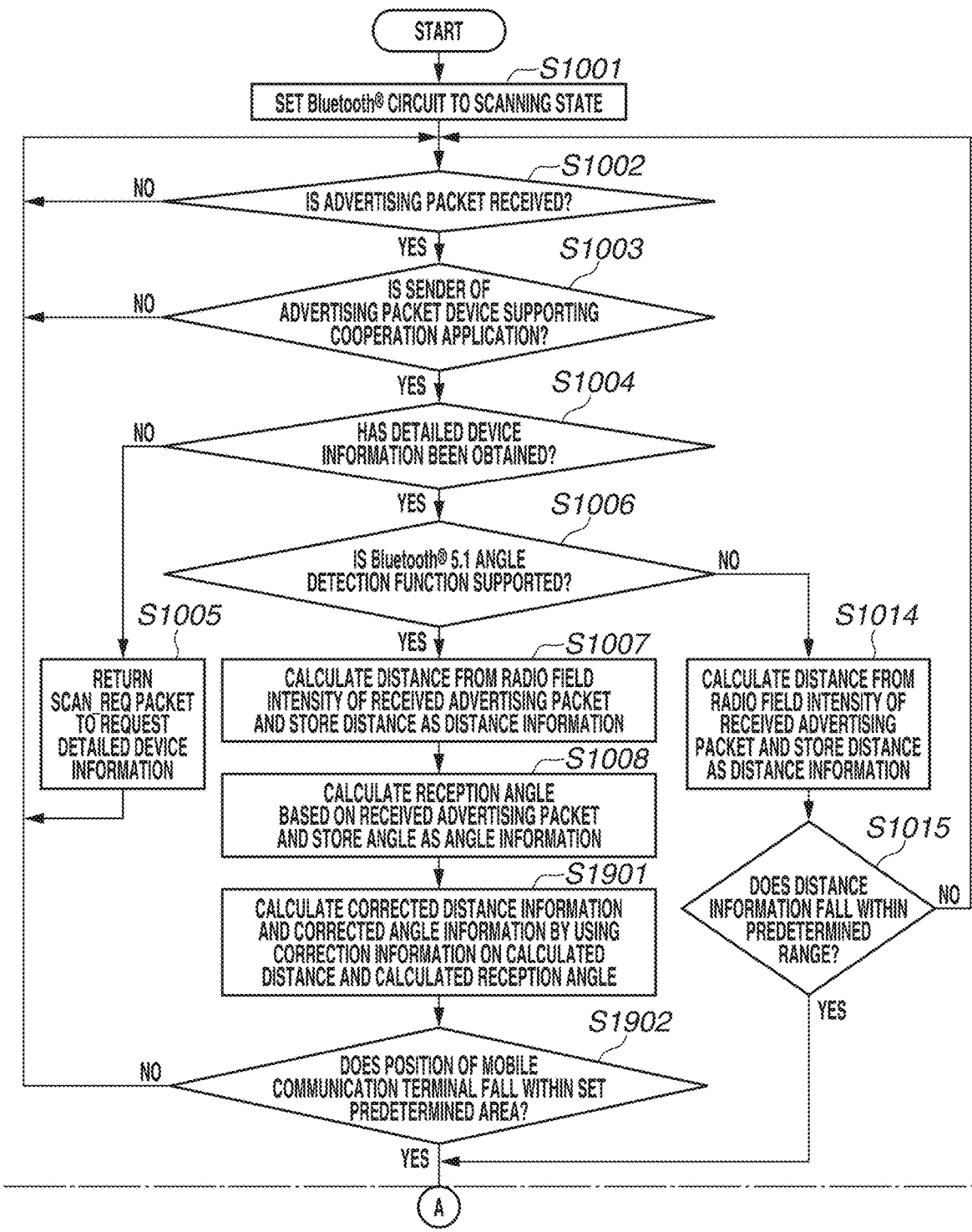
FIGS. 19A and 19B are a flowchart illustrating the processing performed by the image forming apparatus according to the third exemplary embodiment.
Figure 19B:
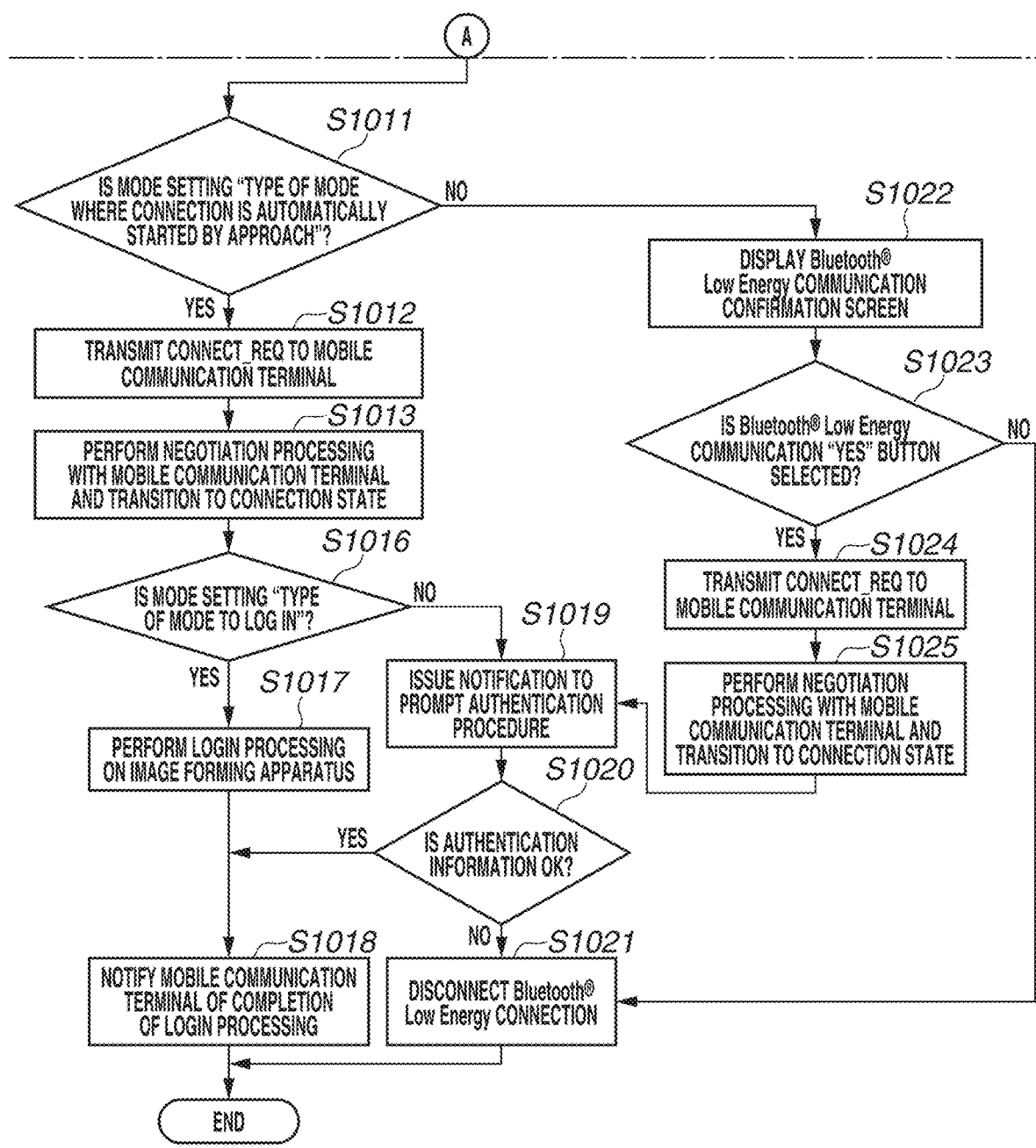

Suppose that the user 600 holding the mobile communication terminal 10 then stands at a distance from the image forming apparatus 20. In such a state, in step S901, the user 600, who wants the image forming apparatus 20 and the mobile communication terminal 10 to cooperate, operates the mobile communication terminal 10 and gives an instruction to activate the cooperation application. In response to the instruction, the mobile communication terminal 10 activates the cooperation application. In step S902, the activated cooperation application continues to transmit an advertising packet at regular intervals until the Bluetooth® Low Energy communication is established (communication establishment). In such a state, the image forming apparatus 20 receives an advertising packet from the mobile communication terminal 10. In step S903, the image forming apparatus 20 recognizes the advertising packet as a packet from a corporation target apparatus (apparatus on which the cooperation application is running). In step S904, the image forming apparatus 20 transmits a scan request to the mobile communication terminal 10. In step S905, the image forming apparatus 20 receives a scan response from the mobile communication terminal 10. As a result, in step S906, the image forming apparatus 20 obtains detailed device information about the mobile communication terminal 10. Then, in step S902, the image forming apparatus 20 receives an advertising packet, and obtains the radio field intensity and the reception angle from the received advertising packet. In step S1801, the image forming apparatus 20 obtains corrected distance information and corrected angle information by performing calculations using the information about the read correction information in addition to the obtained radio field intensity and reception angle. The processing of step S1801 corresponds to that of step S1901 in FIGS. 19A and 19B. FIGS. 19A and 19B are a flowchart illustrating the processing of the image forming apparatus 20 according to the third exemplary embodiment. In step S1901, the controller 200 calculates the corrected distance information and the corrected angle information by using the correction information on the distance R calculated in step S1007 and the reception angle θ calculated in step S1008.

In steps S1802 and S1803, the image forming apparatus 20 determines whether the mobile communication terminal 10 is in the communication establishment area by using the above-described information and the LUT. The processing of steps S1802 and S1803 corresponds to that of step S1902 in FIGS. 19A and 19B. In step S1902, the controller 200 determines whether the mobile communication terminal 10 has entered the predetermined area by using the corrected numerical values. FIG. 20A illustrates the threshold area for the determination. The thresholds for determining to establish connection are as follows. Such threshold information is stored in the image forming apparatus 20 in advance.

$$R' \leq 100 \text{ cm, and } 5° \leq \theta' \leq 135°.$$

For example, by the above-described correction, position C in FIG. 20A is corrected into a position of R'=127 cm and θ'=3°, which does not satisfy the condition (threshold information). In step S1802, the mobile communication terminal 10 is thus determined to be outside the specific area for communication establishment. If the calculated corrected values do not fall within the range of the condition (NO in step S1902), the processing returns to step S1002. The controller 200 maintains the scanning state and continues to repeat the position determination.

Suppose that, in step S911 after step S910, the user 600 moves the mobile communication terminal 10 to in front of the image forming apparatus 20, for example, to position A in FIG. 20A (same position as in FIG. 13A). In such a case, since the Bluetooth® circuit 21 is located at the physical position 1400, the position expressed by the distance R and the reception angle θ here is R=135 cm and θ=90°. The calculation based on the above-described correction conversion derives R'=98 cm and θ'=33°. These values are the same as those obtained at position A of FIG. 13A.

In FIG. 20A, the corrected values at position A are R'=98 cm and θ'=33°. Thus, position A satisfies the condition of R'≤100 cm and 5°≤θ'≤135°. In step S1803, the mobile communication terminal 10 is thus determined to be in the communication establishment area for establishing communication. The processing then proceeds to step S1011 of FIGS. 19A and 19B to establish communication. The subsequent processing is similar to that of FIG. 9. The overall procedure according to the present exemplary embodiment has been described above.

<Notes>

As described above, in the present exemplary embodiment, the mobile communication terminal 10 and the image forming apparatus 20 determine the timing to start establishing the Bluetooth® Low Energy communication in the following manner. Specifically, the mobile communication terminal 10 and the image forming apparatus 20 determine the timing based on the reception angle θ and the radio field intensity of the advertising packet transmitted from the mobile communication terminal 10, and the corrected distance R' and the corrected angle θ' determined by calculation. In this way, in the present exemplary embodiment, the area derived by calculation with reference to the virtual position 1401 can be used as the communication establishment area. This enables detection of the positional relationship between the mobile communication terminal 10 and the image forming apparatus 20 as if the Bluetooth® circuit 21 is located on the front side of the image forming apparatus 20, even if the Bluetooth® circuit 21 is not arranged on the front side of the image forming apparatus 20.

In the present exemplary embodiment, whether to establish communication is determined based not on the distance with reference to the physical position 1400 but on the distance with reference to the virtual position 1401. This enables communication establishment even if the mobile communication terminal 10 is located at position A of FIG. 20A. Position A of FIG. 20A is at a distance not to establish communication, if the distance is a distance with reference to the physical position 1400 of the Bluetooth® circuit 21. However, the mobile communication terminal 10 can be treated as a communication establishment target by making the correction with reference to the virtual position 1401. By contrast, if the mobile communication terminal 10 is located at position C of FIG. 20A, communication is not established. Position C of FIG. 20A is at a distance to establish communication, if the distance is a distance with reference to the physical position 1400 of the Bluetooth® circuit 21. However, the mobile communication terminal 10 at such a position can be handled as the target not to establish communication by making the correction with reference to the virtual position.

While FIG. 18 is described by using "approach to log in" as an example, "approach to log in" may be rephrased with "approach to connect" or "touch to log in".

While the positional relationship between the physical position 1400 and the virtual position 1401 is expressed in terms of a triangle, any data format or configuration that the cooperation application can handle may be used without limitation. Examples include coordinates, vectors, and three-dimensional applications.

The threshold information (e.g., "R'≤100 cm and 5°≤θ'≤135°") may be information set by the user afterward, instead of information registered in the image forming apparatus 20 in advance. The setting may be made through the operation panel 26, or received from the mobile communication terminal 10.

In the first exemplary embodiment, the reception angle (AoA) method is used to determine a relative positional relationship between the image forming apparatus 20 and the mobile communication terminal 10. By contrast, in a fourth exemplary embodiment, a radiation angle (angle of departure (AoD)) method is used to determine a relative positional relationship between the image forming apparatus and the mobile communication terminal. More specifically, radio waves transmitted from a plurality of antennas of the mobile communication terminal are received by a single antenna of the image forming apparatus, and the relative positional relationship is determined by using the received radio waves.

The configuration and processing according to the fourth exemplary embodiment are similar to those described in the first exemplary embodiment except for the above-described method. The similar configuration and processing are thus denoted by the same reference numerals. A detailed description thereof will be omitted.

<Bluetooth® Circuit of Mobile Communication Terminal>

A Bluetooth® circuit 10011 is an antenna module unit (wireless communication IF) including a controller based on the Bluetooth® standards. The Bluetooth® circuit 10011 supports the Bluetooth® Low Energy communication method according to Bluetooth® 5.1, and supports a function of detecting the direction of the image forming apparatus 20 by the Bluetooth® Low Energy communication. The Bluetooth® circuit 10011 includes a plurality of antennas so that the radiation angle (direction) of the radio waves transmitted from the mobile communication terminal 10 can be detected.

FIG. 24B is a block diagram illustrating a configuration of the Bluetooth® circuit 10011 included in the mobile communication terminal 10. The Bluetooth® circuit 10011 is mounted on the mobile communication terminal 10 and performs wireless communication according to the Bluetooth® standards (mainly related to Bluetooth® Low Energy) with the image forming apparatus 20 to control input and output of data to/from the CPU 101. While a Bluetooth® circuit 10021 (see FIG. 24A) includes a single antenna, the Bluetooth® circuit 10011 includes a plurality of antennas. The Bluetooth® circuit 10011 includes an IC chip 10110 and Bluetooth® Low Energy antennas 115, 116, 117, and 118, which are arranged on a substrate 119. The functions of a host IF control unit 111, a Bluetooth® Low Energy baseband unit 112, an RF control unit 113, and an RF switch 114 are integrated on the IC chip 10110.

The RF control unit 113 performs radio wave modulation and demodulation processing for RF communication in performing the Bluetooth® Low Energy communication with the image forming apparatus 20.

The Bluetooth® Low Energy antennas 115, 116, 117, and 118 are antennas formed to perform wireless communication. The mobile communication terminal 10 can communicate with the image forming apparatus 20 by using the Bluetooth® Low Energy antennas 115, 116, 117, and 118. Further, the Bluetooth® Low Energy antennas 115, 116, 117, and 118 are pattern antennas patterned on the substrate 119, and adjusted to have antenna characteristics for performing the 2.4-GHz band Bluetooth® Low Energy communication.

To support the function of detecting the direction of the image forming apparatus 20, the Bluetooth® circuit 10011 supports the Bluetooth® Low Energy communication method according to Bluetooth® 5.1.

<Bluetooth® Circuit of Image Forming Apparatus>

The Bluetooth® circuit 10021 is an antenna module unit (wireless communication IF) including a controller based on the Bluetooth® standards. The Bluetooth® circuit 10021 performs communication according to the IEEE 802.15 standards and supports the Bluetooth® Low Energy communication method according to Bluetooth® 5.1. The Bluetooth® circuit 10021 includes a single antenna.

FIG. 24A is a block diagram illustrating a configuration of the Bluetooth® circuit 10021 included in the image forming apparatus 20. The Bluetooth® circuit 10021 is mounted on the image forming apparatus 20 and performs wireless communication according to the Bluetooth® standards (mainly related to Bluetooth® Low Energy) with the mobile communication terminal 10 to control input and output of data to/from the main SoC 201. As described above, the Bluetooth® circuit 10021 supports the Bluetooth® Low Energy communication method according to Bluetooth® 5.1. The Bluetooth® circuit 10021 includes an IC chip 10051 and a Bluetooth® Low Energy antenna 46, which are arranged on a substrate 49. In FIG. 24A, the Bluetooth® Low Energy antenna 46 is illustrated in three-pronged shape. However, such a representation is employed for the sake of convenience in distinguishing the Bluetooth® Low Energy antenna 46 from solid lines in the diagram, and the Bluetooth® Low Energy antenna 46 does not need to actually have a three-pronged shape. The functions of a host IF control unit 41, a Bluetooth® Low Energy baseband unit 42, and an RF control unit 43 are integrated on the IC chip 10051.

<Antenna and Shield>

Figure 25C:
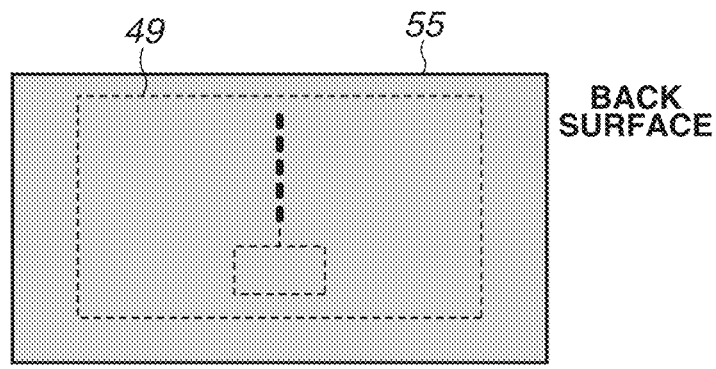
FIGS. 25A, 25B, 25C, and 25D are diagrams respectively illustrating a surface of the Bluetooth® circuit substrate, an upper surface of the Bluetooth® circuit substrate, a back surface of the Bluetooth® circuit substrate, and a relationship between radio waves and a shield.
Figure 25B:
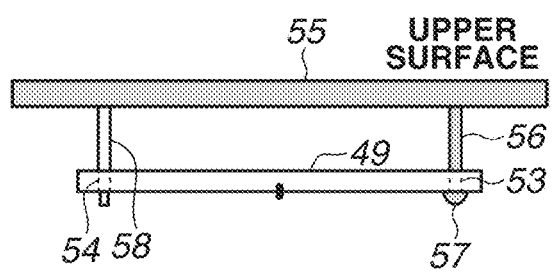
Figure 25D:
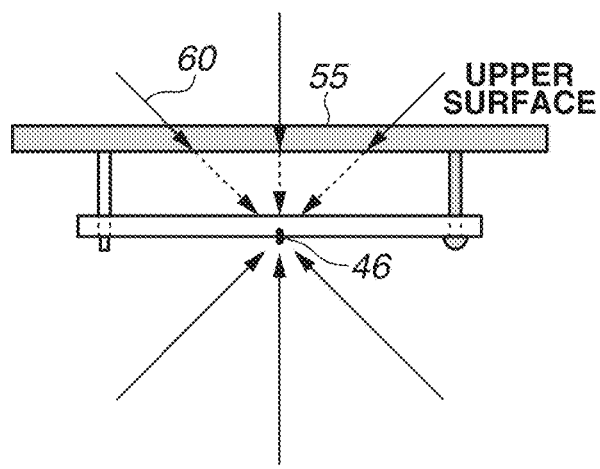
Figure 25A:
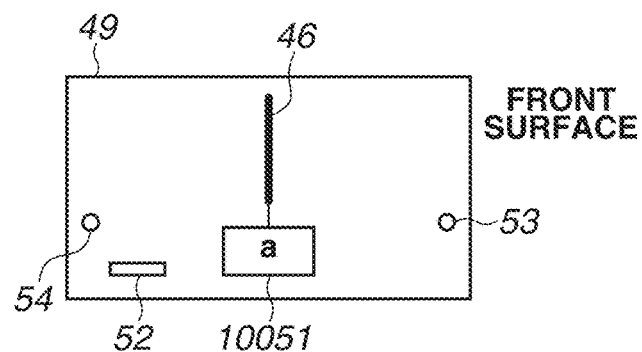

Next, a relationship between the Bluetooth® Low Energy antenna 46 and a shield of the Bluetooth® circuit 10021 will be described. As described above, the Bluetooth® circuit 10021 includes a single antenna. As illustrated in FIG. 25A, the Bluetooth® Low Energy antenna 46 is formed as a wiring pattern on the substrate 49. FIG. 25A is a diagram illustrates the front surface of the Bluetooth® circuit substrate (substrate 49). FIG. 25B is a diagram illustrating the upper side of the Bluetooth® circuit substrate. FIG. 25C is a diagram illustrating the back surface of the Bluetooth® circuit substrate. FIG. 25D is a diagram illustrating a relationship between radio waves and a shield.

A mechanism for preforming direction detection (details will be described below) according to the Bluetooth® standards is thus provided by using a single antenna. The Bluetooth® Low Energy antenna 46 is connected to the IC chip 10051. In addition, a connector 52 to which a cable 80 (see FIG. 8) can be connected to establish an IF connection with the controller 200 is arranged on the substrate 49 of the Bluetooth® circuit 10021. The connector 52 is connected to the host IF control unit 41 of the IC chip 10051.

A metal plate 55 functions as a shield member for blocking radio waves transmitted from the Bluetooth® Low Energy antennas 115, 116, 117, and 118.

<Communication Establishment Processing>

Communication establishment processing according to the fourth exemplary embodiment is substantially the same as that described in the first exemplary embodiment with reference to FIG. 7. In the fourth exemplary embodiment, the processing of step S701 represents a set of processes where each of the Bluetooth® Low Energy antennas 115, 116, 117, and 118 transmit an advertising packet. The same applies to steps S702, S705, S706, and S707.

In the fourth exemplary embodiment, the scan request transmitted in step S703 does not include information about a distance d between a plurality of antennas.

The image forming apparatus 20 in the scanning state 70 can obtain the radiation angle θ by calculating the direction of the mobile communication terminal 10 from the advertising packets.

The mobile communication terminal 10 may obtain the radiation angle θ calculated by the image forming apparatus 20 through communication.

<Direction Detection>

Figure 26:
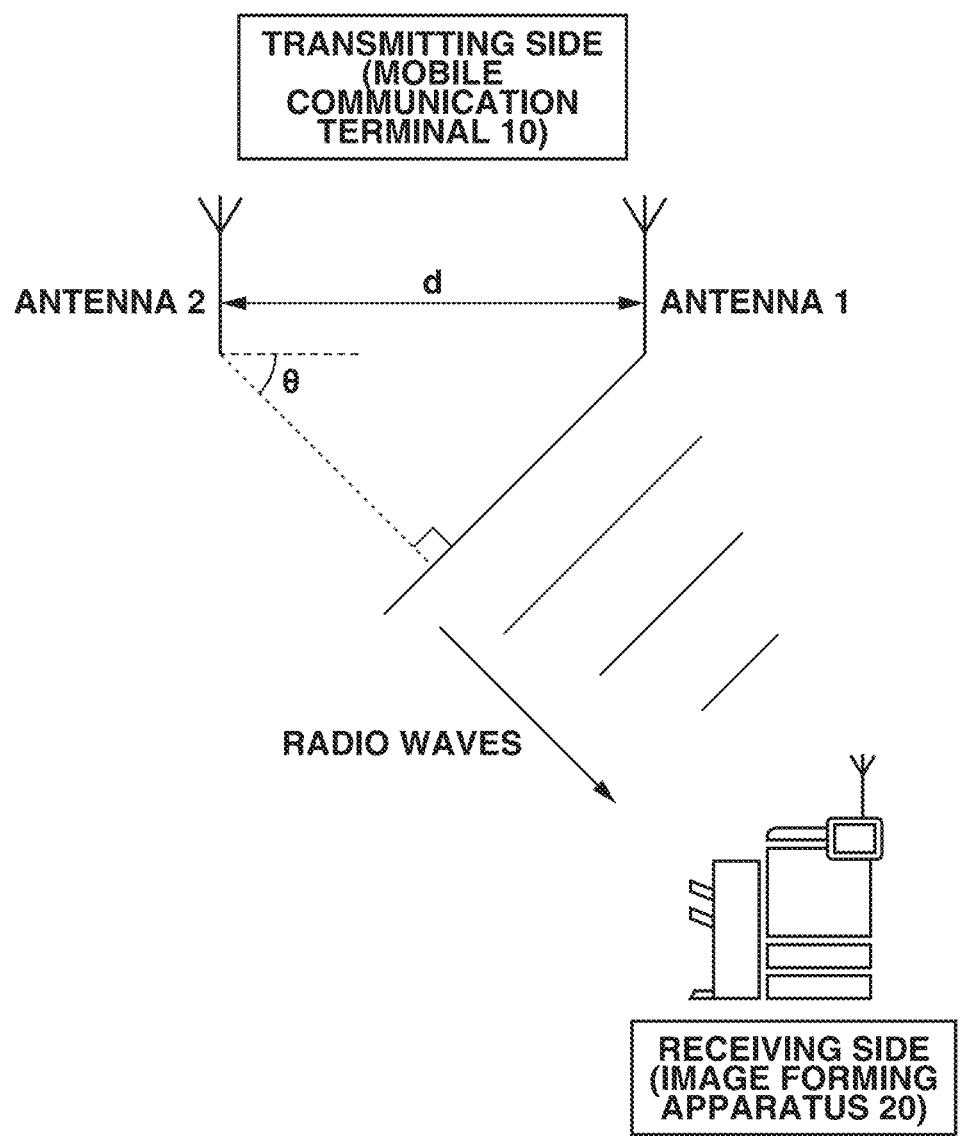
FIG. 26 is a diagram illustrating the direction detection by Bluetooth® Low Energy.

Next, a method for direction detection using a plurality of antennas will be described. A method for transmitting the Bluetooth® Low Energy communication radio waves from a transmitting side with a plurality of antennas and receiving the radio waves with a single antenna to detect direction will be described with reference to FIG. 26. FIG. 26 is a diagram illustrating Bluetooth® Low Energy direction detection. In FIG. 26, the transmitting side of the radio waves corresponds to the Bluetooth® circuit 10011 of the mobile communication terminal 10. The receiving side of the radio waves corresponds to the Bluetooth® circuit 10021 of the image forming apparatus 20. This method is a radiation angle detection method called AoD or direction of departure (DoD). The positional relationship between the two devices is expressed by a radiation angle θ. While the Bluetooth® circuit 10011 uses four antennas, the following description will be given by using two antennas 1 and 2 for ease of description.

Suppose initially that the mobile communication terminal 10 serving as the transmitting side transmits advertising packets (advertisement packets) at regular intervals. In this case, the mobile communication terminal 10 serving as the transmitting side sequentially switches antennas 1 and 2 while transmitting advertising packets. As a result, two types of radio waves, i.e., radio waves transmitted from antenna 1 and radio waves transmitted from antenna 2 arrive at the image forming apparatus 20 serving as the receiving side. Since antennas 1 and 2 are arranged at a distance from each other, the distance between antenna 1 and the image forming apparatus 20 is different from that between antenna 2 and the image forming apparatus 20. This causes a slight difference between the time for the radio waves transmitted from antenna 1 to arrive at the image forming apparatus 20 and the time for the radio waves transmitted from antenna 2 to arrive at the image forming apparatus 20. The slight difference in time can be detected as a phase difference when the image forming apparatus 20 receives the radio waves. Assume that the distance between antennas 1 and 2 is d, the radiation angle of the radio waves transmitted from antennas 1 and 2 is θ, and the wavelength of the radio waves is λ. The following relationship holds.

$$\psi = (2\pi d^* \cos(\theta))/\lambda,$$

where ψ is the above-described phase difference.

The radiation angle θ of the radio waves is thus expressed as follows.

$$\theta = \arccos((\psi \lambda)/(2\pi d)).$$

In this way, the positional relationship between the transmitting side and the receiving side of the radio waves can be determined as the radiation angle θ if the radio waves transmitted from the plurality of antennas are received by the single antenna and the phase difference between the received plurality of types of radio waves can be accurately detected. To determine an accurate phase difference, antennas 1 and 2 desirably have equivalent radio wave characteristics. For such a reason, the Bluetooth® Low Energy antennas 115 to 118 are configured to have equivalent radio wave characteristics as described above. To determine an accurate phase difference, the radio waves transmitted from antenna 1 and the waves transmitted from antenna 2 are desirably direct waves arriving at the single antenna of the receiving side straight through the same propagation path. Whether the plurality of types of radio waves received by the image forming apparatus 20 have propagated through the same propagation path (are direct waves) can be determined, for example, by comparing the reception intensities of the radio waves.

The above-described calculation uses the distance d between antennas 1 and 2 of the transmitting side and the wavelength λ of the radio waves. If the image forming apparatus 20 calculates the radiation angle θ, such parameters are desirably to be obtained in advance. The information about the distance d and the wavelength λ may be included in the advertising packets (or response to a scan request) transmitted from the mobile communication terminal 10.

The following description will be given on the assumption that the radiation angle θ can be obtained. The radiation angle θ can be calculated by the RF control unit 43 in the IC chip 10051 based on the specifications of the Bluetooth® standards. The controller 200 simply needs to obtain radiation angle information output from the Bluetooth® circuit 10021. Alternatively, the radiation angle θ may be calculated by the controller 100.

<Antenna Layout>

In the fourth exemplary embodiment, the Bluetooth® circuit 10021 is arranged in a front area near the operation panel 26 like that illustrated in FIG. 8 according to the first exemplary embodiment.

<Detection Area>

In the fourth exemplary embodiment, like the first exemplary embodiment, the communication establishment area 1300 illustrated in FIG. 13A is used.

<Use Sequence>

In the fourth exemplary embodiment, like the first exemplary embodiment, whether to establish communication for "approach to log in", "approach to connect", or "touch to log in" is determined based on a relative positional relationship between the image forming apparatus 20 and the mobile communication terminal 10. The angle information used in the fourth exemplary embodiment is based on the AoD method.

<Control Procedure of Mobile Communication Terminal>

In the fourth exemplary embodiment, the mobile communication terminal 10 is controlled like that illustrated in FIG. 11 according to the first exemplary embodiment. Note that the SCN_RESP data includes information about the distance d between the plurality of antennas.

<Control Procedure of Image Forming Apparatus>

In the fourth exemplary embodiment, the image forming apparatus 20 is controlled like that illustrated in FIGS. 10A and 10B according to the first exemplary embodiment. Assume that the angle information used in the fourth exemplary embodiment is based on the AoD method. In the first exemplary embodiment, in step S1008, the image forming apparatus 20 obtains angle information calculated from the phase data on the advertising packets received by the plurality of antennas of the image forming apparatus 20 and antenna information, and stores the angle information. However, in the fourth exemplary embodiment, the image forming apparatus 20 obtains angle information calculated from phase data on the plurality of advertising packets received by the single antenna of the image forming apparatus 20 in the same period but at different timings and antenna information, and stores the angle information.

In the second exemplary embodiment, the reception angle (AoA) method is used to determine the relative positional relationship between the image forming apparatus 20 and the mobile communication terminal 10. On the other hand, in a fifth exemplary embodiment, the radiation angle (AoD) method is used to determine the relative positional relationship between the image forming apparatus and the mobile communication terminal. More specifically, radio waves transmitted from a plurality of antennas of the mobile communication terminal are received by a single antenna of the image forming apparatus, and the relative positional relationship is determined by using the received radio waves.

The basic configuration and processing according to the fifth exemplary embodiment are similar to those described in the second exemplary embodiment. The processing and configuration related to the above-described method are similar to those of the fourth exemplary embodiment. Thus, the similar configuration and processing are denoted by the same reference numerals. Detailed descriptions thereof will be omitted.

<Antenna Layout>

In the fifth exemplary embodiment, like the second exemplary embodiment, the Bluetooth® circuit 10021 is arranged at the position illustrated in FIGS. 14A, 14B, and 14C. In other words, the Bluetooth® circuit 10021 is arranged on the rear side of the image forming apparatus 20. Such a position will be referred to as a physical position 1400. In the present exemplary embodiment, the specific area to perform pairing for the Bluetooth® Low Energy communication is controlled so that its center is located on the front side of the image forming apparatus 20. Such a position will be referred to as a virtual position 1401. The physical position 1400 and the virtual position 1401 are arranged with a diagonal distance 1402 from each other.

<Detection Area>

Like the second exemplary embodiment, the fifth exemplary embodiment uses the distance R detected from the radio field intensity and the radiation angle θ detected by angle detection. The distance R and the radiation angle θ are calculated with the physical position 1400 of the Bluetooth® circuit 10021 of the image forming apparatus 20 as the center. The determination for communication establishment is made by using a LUT and threshold information corresponding to the communication establishment area near the virtual position 1401.

<Use Sequence>

In the fifth exemplary embodiment, like the second exemplary embodiment, whether to establish communication for "approach to log in", "approach to connect", or "touch to log in" is determined based on the relative positional relationship between the image forming apparatus 20 and the mobile communication terminal 10. Assume that the angle information used in the fifth exemplary embodiment is based on the AoD method.

<Control Procedure of Image Forming Apparatus>

In the fifth exemplary embodiment, the image forming apparatus 20 is controlled like that illustrated in FIGS. 17A and 17B according to the second exemplary embodiment. Assume that the angle information used in the fifth exemplary embodiment is based on the AoD method. In the second exemplary embodiment, in step S1008, the image forming apparatus 20 obtains angle information calculated from the phase data on the advertising packets received by the plurality of antennas of the image forming apparatus 20 and the antenna information, and stores the angle information. On the other hand, in the fifth exemplary embodiment, the image forming apparatus 20 obtains angle information calculated from the phase data on the plurality of advertising packets received by the single antenna of the image forming apparatus 20 in the same period but at different timings and the antenna information, and stores the angle information.

In the third exemplary embodiment, the reception angle (AoA) method is used to determine the relative positional relationship between the image forming apparatus 20 and the mobile communication terminal 10. On the other hand, in a sixth exemplary embodiment, the radiation angle (AoD) method is used to determine the relative positional relationship between the image forming apparatus and the mobile communication terminal. More specifically, radio waves transmitted from a plurality of antennas of the mobile communication terminal are received by a single antenna of the image forming apparatus, and the relative positional relationship is determined by using the received radio waves.

The basic configuration and processing according to the sixth exemplary embodiment are similar to those described in the third exemplary embodiment. The processing and configuration related to the above-described method are similar to those of the fourth exemplary embodiment. Thus, the similar configuration and processing are denoted by the same reference numerals. Detailed descriptions thereof will be omitted.

<Detection Area>

In the sixth exemplary embodiment, as described in the third exemplary embodiment, the determination for communication establishment is made by using the communication establishment area 2002 illustrated in FIG. 20A.

<Calculation of Corrected Distance and Corrected Angle>

In the present exemplary embodiment, calculation is performed to convert the distance R and the radiation angle θ with the physical position 1400 of the Bluetooth® circuit 10021 of the image forming apparatus 20 as the center into a corrected distance R' and a corrected angle (corrected radiation angle) θ' with the virtual position 1401 as the center. Such a conversion is performed by the cooperation application running on the mobile communication terminal 10. Assume that the angle information used in the sixth exemplary embodiment is based on the AoD method.

<Use Sequence>

In the sixth exemplary embodiment, like the third exemplary embodiment, whether to establish communication for "approach to log in", "approach to connect", or "touch to log in" is determined based on the relative positional relationship between the image forming apparatus 20 and the mobile communication terminal 10. Assume that the angle information used in the sixth exemplary embodiment is based on the AoD method.

<Control Procedure of Image Forming Apparatus>

In the sixth exemplary embodiment, the image forming apparatus 20 is controlled like that illustrated in FIGS. 19A and 19B according to the third exemplary embodiment. Assume that the angle information used in the sixth exemplary embodiment is based on the AoD method. In the third exemplary embodiment, in step S1008, the image forming apparatus 20 obtains angle information calculated from the phase data on the advertising packets received by the plurality of antennas of the image forming apparatus and the antenna information, and stores the angle information. In the sixth exemplary embodiment, the image forming apparatus 20 obtains angle information calculated from the phase data on the plurality of advertising packets received by the single antenna of the image forming apparatus 20 in the same period but at different timings and the antenna information, and stores the angle information.

OTHER EXEMPLARY EMBODIMENTS

The present invention is not limited to the above-described exemplary embodiments. Various modifications (including organic combinations of the exemplary embodiments) can be made based on the gist of the present invention, and such modifications are not intended to be excluded from the scope of the present invention. In other words, all configurations obtained by combining the above-described exemplary embodiments and modifications thereof are also included in the present invention.

The exemplary embodiments of the present invention can be implemented by processing of supplying a program for implementing one or more functions of the above-described exemplary embodiments to a system or an apparatus via a network or a recording medium, and reading and executing the program by one or more processors in a computer of the system or apparatus. A circuit for implementing one or more of the functions (e.g., an application specific integrated circuit (ASIC)) may be used for implementation.

Figure 13B:
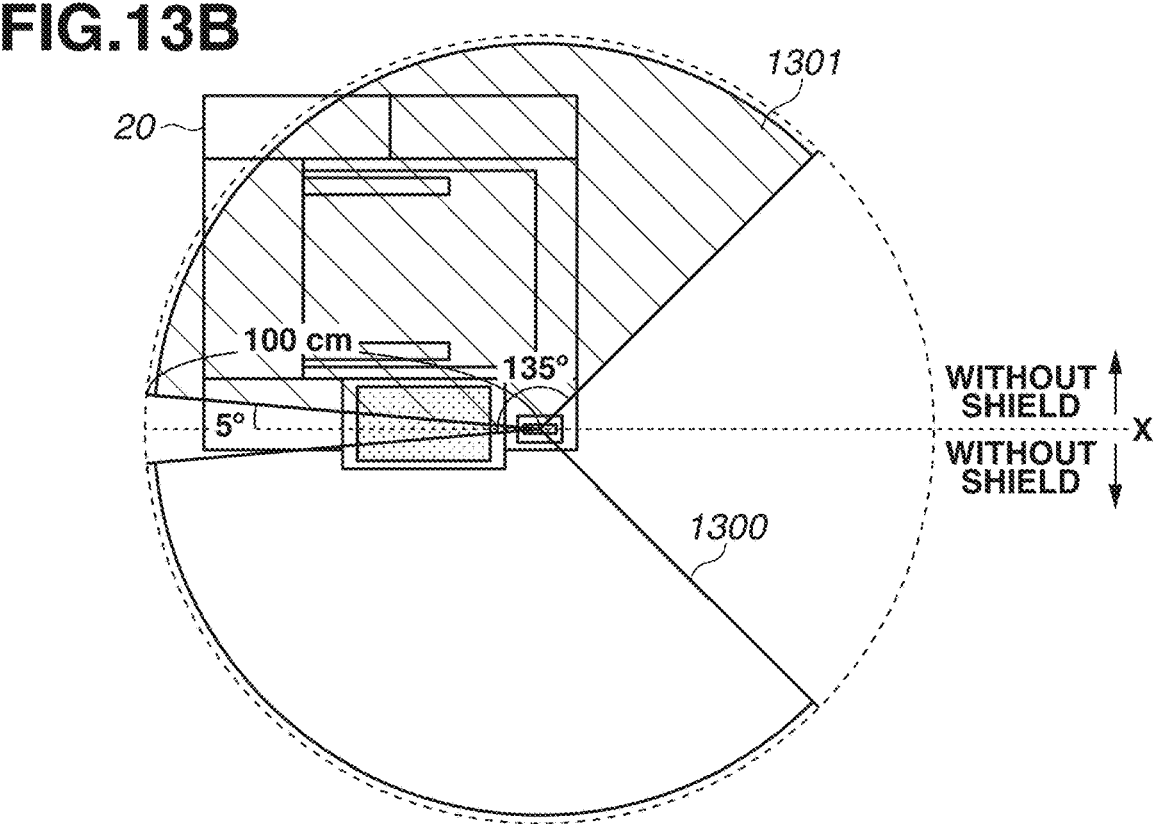

As described with reference to FIG. 5C, the first to third exemplary embodiments are based on the configuration that the backside of the substrate 49 is covered with the metal plate 55. If the metal plate 55 is not configured to shield the area where the antennas 45 to 48 are arranged, another communication establishment area is formed. FIG. 13B illustrates a state where another communication establishment area is formed. FIG. 13B is a diagram illustrating communication establishment areas in a mirror-imaged configuration. In FIG. 13B, a sectorial communication establishment area 1301 indicated by diagonal lines is formed in addition to the communication establishment area 1300. The communication establishment area 1301 is formed at a mirror-imaged position ($-135° \leq \theta \leq -5°$) of the communication establishment area 1300 with reference to an imaginary line X extending in the direction of arrangement of the antennas 45 to 48. The communication establishment area 1301 results from the arrival of incoming radio waves from behind the substrate 49, including the radio waves represented by the arrows 60 in FIG. 5D, at the antennas 45 to 48. In the first to third exemplary embodiments, the communication establishment based on the detection area is implemented with high precision by preventing the occurrence of such a mirror-imaged communication establishment area. However, such a configuration is not necessarily indispensable. For example, the communication establishment area 1301 is mostly located on the main body of the image forming apparatus 20, and the user hardly enters the communication establishment area 1301. The backside of the substrate 49 therefore does not need to be covered with the metal plate 55 if the communication establishment area 1301 can be ignored.

In the first to third exemplary embodiment, the scan response is described to include the wavelength $\lambda$ of the radio waves. However, this value can be obtained from the frequency information about the advertising packets and therefore does not necessarily need to be included in the scan response.

In the first to third exemplary embodiments, the communication establishment processing of the Bluetooth® Low Energy communication is described to be performed once the mobile communication terminal 10 is determined to have entered the communication establishment area. However, the communication establishment processing of the Bluetooth® Low Energy communication may be performed based on a plurality of determination results. For example, the moving direction of the user holding the mobile communication terminal 10 may be determined from a plurality of determination results, and the communication establishment processing of the Bluetooth® Low Energy communication may be performed based on the fact that the image forming apparatus 20 is located in the moving direction.

Figure 22:
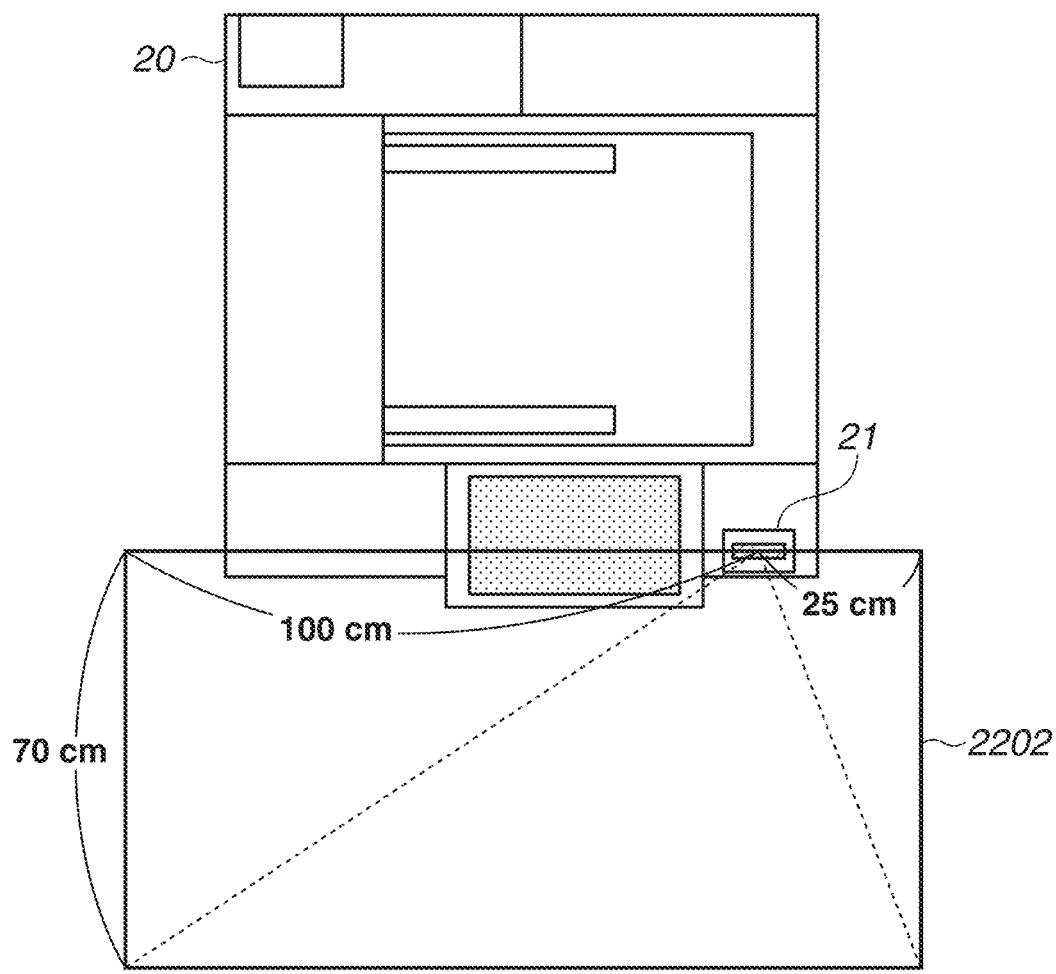
FIG. 22 is a diagram illustrating a communication establishment area according to another exemplary embodiment.

In the third exemplary embodiment, the example in which the communication establishment area determined by calculation with reference to the virtual position is used is described. Such a communication establishment area determined by this calculation may be applied to an area with reference to the physical position of the Bluetooth® circuit 21. For example, as illustrated in FIG. 22, conditions may be set so as to provide a rectangular communication establishment area 2202. FIG. 22 is a diagram illustrating a communication establishment area according to another exemplary embodiment. Such a rectangular communication establishment area in front of the image forming apparatus 20 is useful, for example, in an environment where a plurality of image forming apparatuses is arranged in a juxtaposition.

In the first to third exemplary embodiments, the device information about the image forming apparatus 20 is handled as information included in the scan response. For example, the advertising packet includes device information (simplified), device-identifying data such as an address and an UUID, an RSSI, and a Tx Power Level. The scan response includes device information (detailed), detailed model information, application-supported functions, application-specific data, the wavelength $\lambda$ of the radio waves, and an advertising transmission interval. However, part or all of the device information to be transmitted in the scan response may be included into the advertising packet if there are no issues with the transfer capacity.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication system comprising a communication apparatus and a communication terminal configured to wirelessly communicate with each other,
wherein the communication terminal includes a first wireless communication interface including a plurality of antennas, and
wherein the communication apparatus includes:
an operation panel disposed on a front side of the communication apparatus,
a second wireless communication interface including a single antenna with a shield member for blocking a radio wave, and
one or more controllers configured to function as:
a unit configured to obtain angle information and field intensity information based on a result of reception of a plurality of radio waves, by the single antenna, transmitted from the plurality of antennas; and
a unit configured to transmit an establishment request for wireless communication to the first wireless communication interface via the second wireless communication interface based on the angle information and the field intensity information satisfying a predetermined condition,
wherein a position of the shield member and a parameter of the predetermined condition are prescribed so that, in a case where the communication terminal is positioned in an area on a rear side of the communication apparatus, the establishment request is not to be transmitted, and that, in a case where the communication terminal is positioned in a predetermined area on the front side of the communication apparatus, the establishment request is to be transmitted.

2. The communication system according to claim 1, wherein at least one radio wave transmitted by the first wireless communication interface includes information about an address and/or a universally unique identifier (UUID) for identifying the communication apparatus.

3. The communication system according to claim 1, wherein the communication terminal includes a unit configured to obtain distance information based on the field intensity information.

4. The communication system according to claim 1, wherein information indicating the predetermined condition is stored in the communication apparatus in advance.

5. The communication system according to claim 1, wherein information indicating the predetermined condition is information indicating an area to start establishing connection.

6. The communication system according to claim 1, wherein position information about positions of the single antenna and a reference position for an area to start establishing communication is stored in the communication apparatus in advance.

7. The communication system according to claim 6, further comprising a unit configured to obtain distance information and angle information with reference to the reference position, based on the field intensity information, the angle information, and the position information.

8. The communication system according to claim 6, wherein the shield member is arranged on one side of a substrate on which the single antenna is arranged.

9. The communication system according to claim 8, wherein the one side is a side opposite to the reference position.

10. The communication system according to claim 6, wherein a member including a target mark is provided near the reference position.

11. The communication system according to claim 10, wherein the communication apparatus includes a near-field communication (NFC) unit configured to perform NFC communication, and
wherein the NFC unit is arranged near the member including the target mark.

12. The communication system according to claim 1, wherein the communication terminal is configured to transmit user authentication information to the communication apparatus via the established wireless communication.

13. The communication system according to claim 1, wherein the plurality of antennas includes four antennas.

14. The communication system according to claim 1, wherein the communication apparatus includes a third wireless communication interface configured to support a Wi-Fi standard,
wherein the communication terminal includes a fourth wireless communication interface configured to support the Wi-Fi standard, and
wherein the communication terminal is configured to exchange information, used for connecting the third and fourth wireless communication interfaces, between the communication apparatus and the communication terminal via the established wireless communication.

15. The communication system according to claim 14, wherein the communication terminal is configured to transmit print data to the communication apparatus after connection between the third and fourth wireless communication interfaces is established.

16. The communication system according to claim 14, wherein the communication apparatus includes a reading device configured to read a document, and
wherein the communication apparatus is configured to transmit an image read by the reading device to the communication terminal after connection between the third and fourth wireless communication interfaces is established.

17. The communication system according to claim 14, wherein the communication terminal is configured to store calibration information.

18. A communication apparatus configured to communicate wirelessly with a communication terminal including a first wireless communication interface including a plurality of antennas, the communication apparatus comprising:
an operation panel disposed on a front side of the communication apparatus;
a second wireless communication interface including a single antenna with a shield member for blocking a radio wave; and one or more controllers configured to function as:
a unit configured to obtain angle information and field intensity information based on a result of reception of a plurality of radio waves, by the single antenna, transmitted from the plurality of antennas, and
a unit configured to transmit an establishment request for wireless communication to the first wireless communication interface via the second wireless communication interface based on the angle information and the field intensity information satisfying a predetermined condition,
wherein a position of the shield member and a parameter of the predetermined condition are prescribed so that, in a case where the communication terminal is positioned in an area on a rear side of the communication apparatus, the establishment request is not to be transmitted, and that, in a case where the communication terminal is positioned in a predetermined area on the front side of the communication apparatus, the establishment request is to be transmitted.

19. A method for controlling a communication apparatus configured to communicate wirelessly with a communication terminal, the communication terminal including a first wireless communication interface including a plurality of antennas, and the communication apparatus including an operation panel disposed on a front side of the communication apparatus and a second wireless communication interface including a single antenna with a shield member for blocking a radio wave, the method comprising:
obtaining angle information and field intensity information based on a result of reception of a plurality of radio waves, by the single antenna, transmitted from the plurality of antennas; and
transmitting an establishment request for wireless communication to the first wireless communication interface via the second wireless communication interface based on the angle information and the field intensity information satisfying a predetermined condition
wherein a position of the shield member and a parameter of the predetermined condition are prescribed so that, in a case where the communication terminal is positioned in an area on a rear side of the communication apparatus, the establishment request is not to be transmitted, and that, in a case where the communication terminal is positioned in a predetermined area on the front side of the communication apparatus, the establishment request is to be transmitted.

* * * * *